(12) United States Patent  
Collart et al.

(10) Patent No.: US 8,775,647 B2
(45) Date of Patent: *Jul. 8, 2014

(54) METHOD AND SYSTEM FOR USE IN COORDINATING MULTIMEDIA DEVICES

(75) Inventors: Todd Collart, Los Altos, CA (US); Allan Lamkin, San Diego, CA (US)

(73) Assignee: Deluxe Media Inc., Burbank, CA (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/842,001

(22) Filed: Jul. 22, 2010

(65) Prior Publication Data

US 2010/0293598 A1 Nov. 18, 2010

Related U.S. Application Data

(63) Continuation-in-part of application No. 12/332,238, filed on Dec. 10, 2008, now Pat. No. 8,060,631.

(60) Provisional application No. 61/012,753, filed on Dec. 10, 2007.

(51) Int. Cl.
*G06F 15/16* (2006.01)
*G06F 15/173* (2006.01)

(52) U.S. Cl.
USPC ............................. 709/229; 709/228; 709/230

(58) Field of Classification Search
USPC ....................................................... 709/229
See application file for complete search history.

(56) References Cited

U.S. PATENT DOCUMENTS

| | | |
|---|---|---|
| 5,530,469 A | 6/1996 | Garfinkle |
| 5,898,919 A | 4/1999 | Yuen |
| 6,061,719 A | 5/2000 | Bendinelli et al. |
| 6,326,982 B1 | 12/2001 | Wu et al. |
| 6,446,130 B1 | 9/2002 | Grapes |
| 7,032,235 B2 | 4/2006 | Pelkey et al. |
| 7,146,632 B2 | 12/2006 | Miller |

(Continued)

FOREIGN PATENT DOCUMENTS

| | | |
|---|---|---|
| EP | 1524582 | 4/2005 |
| JP | 10042050 | 2/1998 |

(Continued)

OTHER PUBLICATIONS

Final Office Action from U.S. Appl. No. 12/332,238 mailed Mar. 18, 2011.

(Continued)

*Primary Examiner* — Shaq Taha
(74) *Attorney, Agent, or Firm* — Fitch, Even, Tabin & Flannery LLP

(57) ABSTRACT

Some embodiments of the present invention provide methods for use in playing back content. Some of these methods access a content package comprising media content to be locally played back; detect, as defined by the content package, whether a remote secondary device is available with which a connection can be established; determine whether an authorization to establish the connection has been confirmed; establish, when the authorization is confirmed, a communication connection; determine, as instructed by the content package and when the communication with the secondary device is established, whether one or more commands are received from the secondary device; and implement, as instructed by the content package and when it is determined that the one or more commands are received from the secondary device, the one or more commands in controlling playback experience of the media content.

15 Claims, 19 Drawing Sheets

(56) References Cited

U.S. PATENT DOCUMENTS

| | | | |
|---|---|---|---|
| 7,194,758 | B1 | 3/2007 | Waki et al. |
| 7,392,393 | B2 | 6/2008 | Taki |
| 7,792,756 | B2 | 9/2010 | Plastina et al. |
| 7,796,190 | B2 | 9/2010 | Basso et al. |
| 7,805,373 | B1 | 9/2010 | Issa et al. |
| 2002/0068558 | A1 | 6/2002 | Janik |
| 2002/0162121 | A1 | 10/2002 | Mitchell |
| 2003/0005135 | A1 | 1/2003 | Inoue et al. |
| 2003/0174818 | A1 | 9/2003 | Hazenfield |
| 2004/0031063 | A1 | 2/2004 | Satoda |
| 2004/0044532 | A1 | 3/2004 | Karstens |
| 2004/0103032 | A1 | 5/2004 | Maggio |
| 2005/0015796 | A1 | 1/2005 | Bruckner et al. |
| 2005/0108026 | A1 | 5/2005 | Brierre et al. |
| 2005/0210101 | A1 | 9/2005 | Janik |
| 2005/0246747 | A1 | 11/2005 | Braun |
| 2005/0262542 | A1 | 11/2005 | DeWeese et al. |
| 2005/0278771 | A1* | 12/2005 | Hassell et al. ............... 725/134 |
| 2005/0289139 | A1 | 12/2005 | Takashima et al. |
| 2006/0089820 | A1 | 4/2006 | Yu et al. |
| 2006/0095472 | A1 | 5/2006 | Krikorian et al. |
| 2006/0123246 | A1* | 6/2006 | Vantalon et al. ............. 713/189 |
| 2006/0174308 | A1 | 8/2006 | Fuller et al. |
| 2006/0190559 | A1 | 8/2006 | Lim |
| 2006/0195887 | A1 | 8/2006 | Shusman |
| 2006/0206563 | A1 | 9/2006 | Van De Sluis |
| 2006/0235801 | A1 | 10/2006 | Strom |
| 2007/0077784 | A1 | 4/2007 | Kalayjian et al. |
| 2007/0180485 | A1 | 8/2007 | Dua |
| 2008/0109556 | A1* | 5/2008 | Karlberg .................... 709/231 |
| 2008/0244676 | A1 | 10/2008 | DaCosta |
| 2009/0059512 | A1 | 3/2009 | Lydon et al. |
| 2009/0150553 | A1 | 6/2009 | Collart et al. |
| 2009/0228919 | A1 | 9/2009 | Zott et al. |
| 2010/0293598 | A1 | 11/2010 | Collart et al. |
| 2012/0030366 | A1 | 2/2012 | Collart |

FOREIGN PATENT DOCUMENTS

| | | |
|---|---|---|
| JP | 2004013611 | 1/2004 |
| JP | 2005260322 | 9/2005 |
| JP | 2007266881 | 11/2007 |
| WO | 03087961 | 10/2003 |
| WO | WO-2005057346 | 6/2005 |
| WO | 2006103577 | 10/2006 |
| WO | WO-2009076474 | 6/2009 |

OTHER PUBLICATIONS

Australian Patent Office; First Examination Report issued in Australian Patent Application No. 2008335095; Issued Aug. 14, 2012; 3 Pages.

Examiner Interview Summary for U.S. Appl. No. 12/332,238 mailed May 19, 2011.

Examiner Interview Summary for U.S. Appl. No. 12/332,238 mailed Jun. 29, 2011.

Examiner Interview Summary from U.S. Appl. No. 11/692,063 mailed Mar. 1, 2010.

Examiner Interview Summary from U.S. Appl. No. 11/692,063 mailed Jul. 12, 2010.

Final Rejection from U.S. Appl. No. 11/692,063 mailed Apr. 13, 2010.

Non Final Office Action from U.S. Appl. No. 11/692,063 mailed Apr. 29, 2009.

Non-Final Office Action from U.S. Appl. No. 11/692,063 mailed Nov. 25, 2009.

Notice of Allowance for U.S. Appl. No. 12/332,238 mailed Jun. 29, 2011.

Dacosta; U.S. Appl. No. 11/692,063 filed Mar. 27, 2007.

International Search Report and Written Opinion of the International Searching Authority for PCTUS2008086287 mailed Jun. 24, 2009.

Collart, Todd, U.S. Appl. No. 12/332,238, filed Dec. 10, 2008.

Non Final Office Action from U.S. Appl. No. 12/332,238 mailed Sep. 29, 2010.

USPTO; Non-Final Office Action issued in U.S. Appl. No. 11/692,063; Mailed Nov. 8, 2011; 16 Pages.

USPTO; Final Office Action issued in U.S. Appl. No. 11/692,063; Mailed Mar. 13, 2012; 16 Pages.

USPTO; Non-Final Office Action issued in U.S. Appl. No. 13/253,887; Mailed Mar. 27, 2013; 14 Pages.

Extended European Search Report for EP Application No. 08860403.8 mailed from the European Patent Office on Jun. 28, 2013.

First Office Action for Japanese Patent Application No. 2010-538140 mailed from the Japan Patent Office on Jul. 16, 2013 (8596-86984-JP).

Notice of Allowance from U.S. Appl. No. 13/253,887 mailed Sep. 16, 2013.

Bluetooth—The Universal Radio Interface for Ad Hoc, Wireless Connectivity Jan. 1, 1998.

USPTO; Notice of Allowance issued in U.S. Appl. No. 13/253,887; Mailed Nov. 8, 2013; 7 Pages.

* cited by examiner

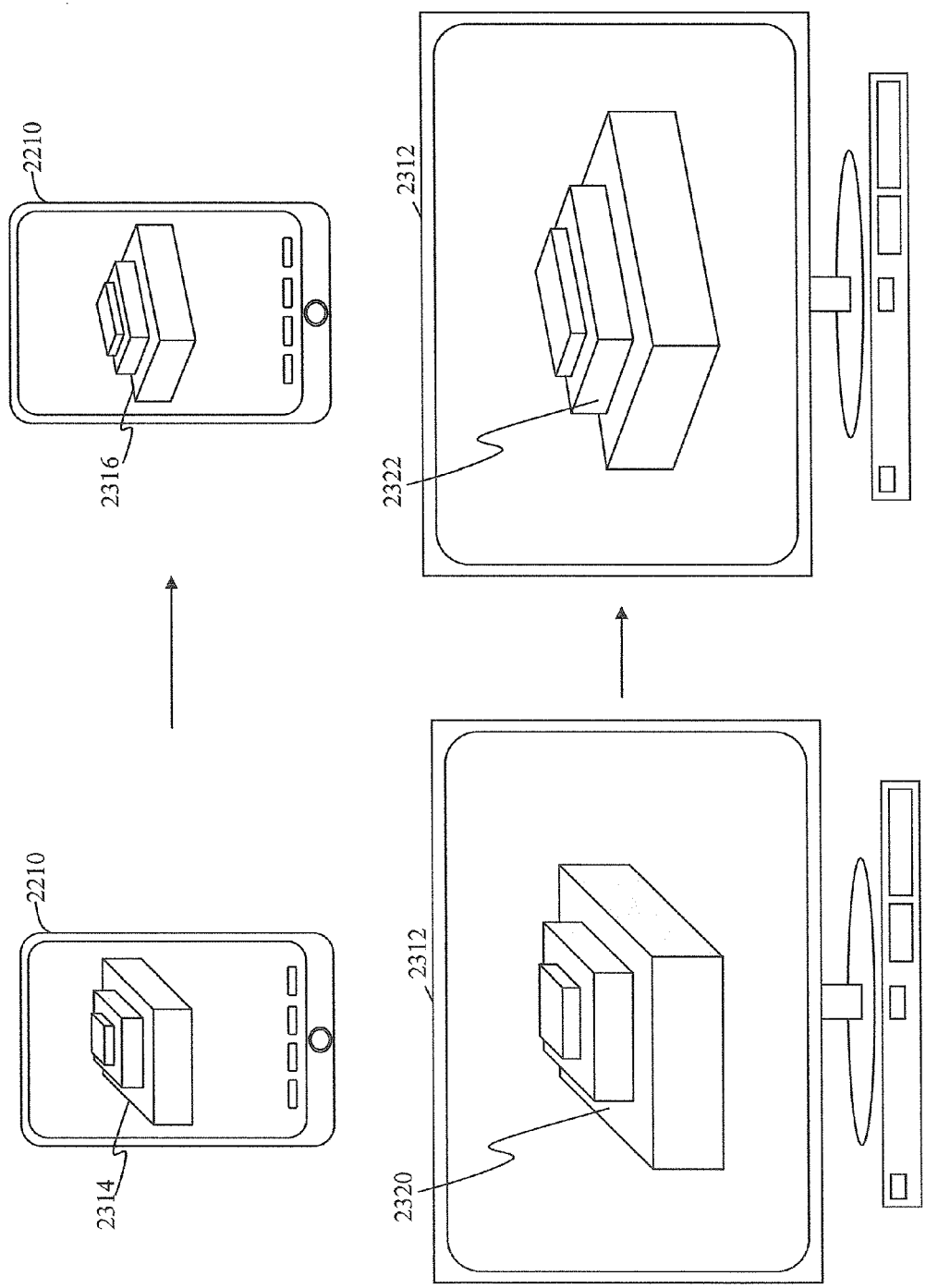

METHOD AND SYSTEM FOR USE IN COORDINATING MULTIMEDIA DEVICES

PRIORITY CLAIM

This application is a Continuation-In-Part of U.S. patent application Ser. No. 12/332,238, filed Dec. 10, 2008, by Collart et al., entitled METHOD AND SYSTEM FOR USE IN COORDINATING MULTIMEDIA DEVICES, which claims the benefit of U.S. Provisional Application No. 61/012,753, filed Dec. 10, 2007, by Collart et al., entitled METHOD AND SYSTEM FOR USE IN COORDINATING MULTIMEDIA DEVICES, both of which are incorporated herein by reference in their entirety.

FIELD OF THE INVENTION

The present invention relates generally to playback devices, and more particularly to coordinating the operation of a playback device.

BACKGROUND

Over the last several decades the distribution of content, such as multimedia content, images, video, music and other such content, has increased tremendously. There are a number of different formats for distributing content as well as a number of different mediums upon which content can be stored. Over the last few decades digital recordings of content has become the preferred mode of storing content according to some applications.

Access to and distribution of content has additionally become relatively easy and quick. As such, users are capable of accessing large amounts of digital data from locally stored content or remotely stored content.

SUMMARY OF THE EMBODIMENTS

The present embodiments advantageously provide for methods, apparatuses, and systems for use in accessing content. Some embodiments provide methods for use in playing back content. These methods access, locally at a primary device, a content package, where the content package comprises multimedia content and instructions to broadcast information relevant to the multimedia content; determine whether the content package instructs that information should be broadcasted; extract, from the content package and in response to determining that the content package instructs that the information should be broadcasted, information to be broadcasted; implement the instructions from the content package to broadcast the information; and broadcast, from the primary device in accordance with the instructions of the content package, the information to the secondary device.

Some additional embodiments provide methods for use in extending a playback experience of multimedia content. These methods establish, locally through a secondary device, a cooperation and connection with a remote primary device accessing a content package, wherein the content package comprising multimedia content, and wherein the connection provides a communication path between the secondary device and the primary device; receive, at the secondary device, a broadcast broadcasted from the primary device; extract, from the broadcast, an instruction to be implemented by the secondary device, where the instruction is defined in the content package, and where the instruction instructs the initiation of an application; identify the application instructed to be initiated; and activate, locally at the secondary device, the application where the application corresponds to the content package.

Still further, some embodiments provide methods of extending a playback experience. These methods detect, at a secondary device, a broadcast communicated from a primary device playing back multimedia content from a content package, where the broadcast comprising broadcast information relevant to the multimedia content being played back by the primary device; extract the broadcast information from the broadcast; access, in response to extracting the broadcast information, a remote source; and acquire, from the remote source, additional content relevant to the multimedia content being played back by the primary device.

Additional embodiments comprise systems providing playback of content. These systems comprise non-transitory, tangible computer readable storage medium with a content package recorded on the storage medium; where the content package comprises multimedia content to be played back by a primary device accessing the content package; and a broadcast application to be implemented by the primary device such that the primary device when implementing the broadcast application broadcasts information relevant to the multimedia content being played back by the primary device.

Some embodiments further provide methods of extending a playback experience. These methods receive, at a primary device, a content package, where the content package comprises: multimedia content to be played back by the primary device, and a broadcast application to be implemented by the primary device; play back the multimedia content; and initiate the broadcast application such that the primary device when implementing the broadcast application broadcasts information relevant to the multimedia content being played back by the primary device.

Still further, some embodiments provide non-transitory, tangible computer readable storage mediums with a content package recorded on the storage medium. The content packages comprise: multimedia content to be played back by a primary device; and executable instructions comprising a broadcast application, wherein the broadcast application when executed by the primary device causes the primary device to broadcast information relevant to the multimedia content being played back by the primary device.

Additionally, some embodiments provide methods of expanding a playback experience beyond a primary device. These methods comprise accessing locally at a primary device a content package comprising: multimedia content to be played back at the primary device, and a broadcast application; determining whether a communication link is known to be established between the primary device and a remote secondary device; playing back a first portion of the multimedia content in response to determining that the communication link is established; and implementing the broadcast application and broadcasting information to the secondary device, where the information is specific to the first portion of the multimedia content and directs the secondary device to provide access to a first additional content that is dependent upon the information.

A better understanding of the features and advantages of the present invention will be obtained by reference to the following detailed description of the invention and accompanying drawings which set forth an illustrative embodiment in which the principles of the invention are utilized.

BRIEF DESCRIPTION OF THE DRAWINGS

The above and other aspects, features and advantages of the present invention will be more apparent from the following more particular description thereof, presented in conjunction with the following drawings wherein:

FIG. 23 shows a simplified block diagram representation of navigation control on the secondary device that can cause actions at the primary device.

Figure 1:
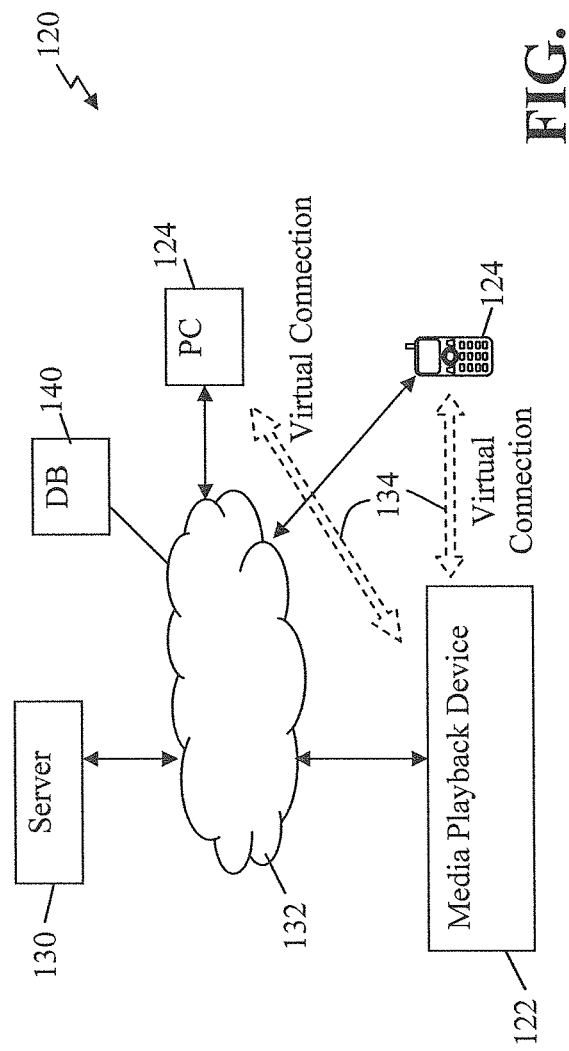
FIG. 1 depicts a simplified block diagram of a system according to some embodiments where media devices are coordinated.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The present embodiments provide methods and systems for use in providing access to content and coordinating media devices. For example, a secondary media device can be coordinated with a primary media device so that content accessed or inputted through the secondary device is relevant to and/or associated with content accessed or played back through the primary device. The coordination, in part, allows a user to take advantage of the benefits and functionalities provided through the secondary device that are generally not available through the primary device or not as easily utilized through the primary device, while maintaining a coordination between the primary and secondary devices. For example, televisions (TV) typically do not include a keyboard, and supplying alphanumeric characters to the TV can be difficult (e.g., using a remote control with limited buttons, using a virtual keyboard through a remote control, or other such non-user friendly interfaces). Alternatively, a computer typically has a keyboard that allows a user to quickly and accurately type out alphanumeric characters. In some implementations, the present embodiments coordinate the TV with a computer so that the user can take advantage of at least the keyboard of the computer to enter alphanumeric characters that can be forwarded for, at least, display on the TV (and/or to other multimedia devices and/or users as fully described below). Entries or actions performed at the secondary device provide a virtual command or control that is communicated through the coordination to be utilized by the primary device.

In some implementations the cooperation is based on a content package played back through the primary device and further is established through a user account, profile and/or an authentication. For example, both primary and secondary devices can register and/or log in to a common profile or account, for example, through a distributed communication network in association with the content package. Once both devices are logged-in to the same account a cooperation can be established and maintained between the two devices. The cooperation, in some instances, is maintained while the two devices continue to be logged-in to the same profile. In some embodiments, a virtual connection or link is established allowing content and/or commands to be communicated to one or both of the devices and/or between the devices, and/or additional content associated with content being accessed at a primary device can be forwarded to the second cooperated device. For example, an action taken at the secondary device can provide a virtual event that can be provided to the primary device. Even a single key stroke, including simply typing a letter (e.g., "A") can define a virtual event that can be utilized by the primary device. Content accessed through the secondary device can be dependent on the content package played back through the primary device and/or the portion of content being accessed from the content package. The content package provides some of the functionality for the cooperation. Further, the cooperation allows an interconnectivity and content dependent interface providing additional functionality and user input modality and capabilities that generally are not available through the primary device or are more cumbersome to utilize through the primary device.

The content package is authored with the knowledge that a secondary device may be present such that the secondary device can cooperate with the primary device to provide added functionality, enhance playback experience, provide an interactive experience and/or a shared experience with other users. The content package in some implementations includes programming that activates the playback device to establish the cooperation and/or connection. The cooperation between devices can be established through various methods and typically employs security conditions to limit access. For example, a consumer identifier (registration for example), which can contain aspects to specify how and with what secondary devices can be cooperate, can be stored locally on the playback device and/or accessed from a server. In some specific examples, the content package can include on-disc content that is BD-Live aware. The playback device can then associate the disc with a server experience and therefore with the secondary device. Some implementations further use the AACS Online APIs to determine, for example, volume ID, player ID, serial ID (BCA/PMSN) and/or other such parameters and can use one or more of these for association, or in combination with registration information to secure the connection, and in some instances guarantee a single instance combination (e.g., one primary display).

The content package is authored with the functionality to establish, or is authored to receive updates that would allow the content package to establish, one or more virtual connections and/or direct connection with one or more secondary devices. In some instances, the connections are established through a third party (e.g., an Internet service or server). Additionally or alternatively, the content package can be authored, or updated, to establish a direct connection with one or more secondary devices without requiring a third party intermediary, for example, through some shared password, device ID, key or the like. The established connection provides the ability to extend the content package experience beyond the primary device. For example, the content package can be authored to take advantage of BD Touch to allow a direct cooperation between a primary device and one or more secondary devices. Further, a primary device may establish one or more direct connections with one or more secondary devices, and simultaneously establish one or more virtual connections 134 with one or more other secondary devices. Through one or more connections established between two or more devices in accordance with the authored or updated content package, the content package experience (e.g., playback of a movie or music, playing of a game, viewing other multimedia or data, and the like) can be extended beyond the primary device.

There are many benefits to authoring content (whether physical media such as DVD, HD DVD, Blu-ray, etc., or an electronic version of the content such as content streamed over a network) with knowledge that there could be a secondary device. This allows the content in physical or electronic form to better take advantage of the secondary device, and to perform, scale and/or alter playback differently depending on with a secondary device is present. By way of example, the lack of a secondary device can cause the authored content (e.g., a Blu-ray disc) to instruct the primary playback device to display an interactive feature over the playing multimedia content (e.g., Blu-ray movie) on the primary device. Alternatively in some instances, when a secondary device is available, the same Blu-ray disc (BD) can be authored such that the primary device detects the cooperation or linking of the secondary device and enables the same interactive feature to instead be displayed on the secondary device. As a result, the interactive feature does not take up valuable display real estate on the primary device or interfere or cover the displayed movie when undesirable. This provides more flexibility and control to the content developers and/or owners that previously did not exist.

The cooperation between the primary and secondary devices can be activated by the content package, the user operating the primary device, the user operating the secondary device (where in many instances the same user may be operating both, but different users can be cooperated once securities and/or authorizations are established), a remote device (e.g., a remote server) and/or other such cooperation or combinations of cooperation. With some applications, the content package attempts to establish, or instructs the user to establish, the relationship as soon as possible in the content package (e.g., on-disc) experience, which allows the use of the functionalities provided by the secondary device sooner rather than later. In many applications, cooperation and/or registration information (such as in local storage) may have already been established and/or is quickly obtained, and can be automatically used for association with the secondary device. For example, a user can register once, and then that information is retained for future use. In establishing the cooperation the content package instructs and/or playback device attempts to determine availability of a secondary device and/or server connectivity and/or availability early in the playback experience to facilitate the cooperation and/or notify a user to establish cooperation. In other instances, the content package directs the playback device to transmit a communication or broadcast in attempts to determine whether one or more secondary devices are available with which the cooperation can be established.

As identified above, in many instances it is desirable to cooperate the primary and secondary devices early and/or as soon as possible relative to the playback experience. This cooperation can be activated by programming in the content package or the playback device, or triggered by the server or secondary device (for example, by monitoring for an availability of the secondary device and then notifying the disc playback of its availability, a generically available on-disc (or downloaded) BD-J application to take advantage of the secondary device (if available), and the like). Similarly, feedback may be provided to the primary device that a secondary device is available. Once the connection is established the playback device may, in some instances, be able to take advantage of the capabilities of the secondary device, additional content can be provided to the secondary device, additional content may be received from the secondary device and the like. Additionally, the content package, upon detecting and/or establishing the cooperation between the two or more devices, can identify or be informed (e.g., from the server or the secondary device) of the cooperation, and allows the primary display to be adapted based on the secondary device being available. The content package can provide this functionality through code within the content package or retrieved from a server, e.g., BD-Java code, that has the functionality to detect the connection and take advance of the connection. As described above and further below, in some instances the content package is Blu-ray compliant, such as a Blu-ray disc, and as such utilizes and takes advantages of the functionalities provided through the Blu-ray specifications, including Blu-ray Disc specification, Multimedia Home Platform (MHP), Globally Executable MHP (GEM), Home Audio Video Interoperability (HAVi), and JavaTV, all of which are incorporated herein by reference.

As introduced above, the playback experiences with the cooperation of a secondary device can also be tailored on a user account basis. Some embodiments support multiple accounts per player (e.g., mom, dad, son, daughter) and/or users so that the experience can be adjusted depending on a viewer. Further, the accounts can be portable to different playback devices and not restricted to a single location or device. This allows users to access or log-in to their user account from other compatible players and/or locations. Some of the benefit this provides is that users can take their preferences, personalization, and the like with them from player to player.

FIG. 1 depicts a simplified block diagram of a system 120 according to some embodiments where media devices 122, 124 are coordinated. The system 120 comprises a first or primary device 122 and one or more secondary devices 124 that are cooperated through a remote service or server 130 through a distributed network 132. As an example, the primary device 122 can be a TV, playback device coupled with a TV, a gaming device a computer, or the like, and a secondary device can be a computer, a wireless phone, personal digital assistant, a gaming device or other relevant devices. The primary and secondary devices can be substantially any relevant consumer electronic device capable of cooperating as described below. The server 130 communicates over the distributed network 132 with both the primary device 122 and the secondary device 124 to, in some embodiments, provide the coordination between the primary and secondary devices, where, in some instances, a virtual communication connection or link 134 is established between the primary device 122 and the secondary device(s) 124. Additionally in some instances, one or more remote data storage devices and/or databases 140 can connect with the distributed network 132 and be accessed by the primary device 122, secondary device 124, and/or server 130.

Based on the content being accessed through the primary device 122, the server 130, in some implementations, can provide relevant content to the secondary device once the primary and secondary devices 122, 124 are cooperated or linked. The relevant content can be retrieved from the primary device 122, supplied directly from the server 130, accessed from a remote storage or database 140, and/or authorized to be accessed from a third party source (not shown). Additionally or alternatively, based on content provided to and/or accessed by the secondary device 124 the server 130 can forward relevant content to the secondary device 124 and/or the primary device 122. For example, when a movie or program is being watched through the primary device 122, the server is informed of the program or movie and can forward content relevant to the program or movie to the secondary device 124.

Similarly, the server 130 can receive content received by and/or generated at the secondary device 124 and provide some or all of the received content to the primary device 122 to be displayed and/or used in controlling the primary device 122. For example, the primary device can be a set-top-box configured to receive broadcast, satellite and/or cable provided content that is forwarded to be displayed on a TV, and the secondary device 124 can be a computer that the user is utilizing to participate in an online chat session, such that the server forwards the chat text from the secondary device 124 to the primary device 122 (set-top-box) that forwards the text to be displayed on the accompanying TV. As another example, one or more virtual entries, which can include a key stroke, text, replies, commands (e.g., a skip) and/or other relevant events, can be entered by a user into the secondary device 124 that are forwarded through the server 130 to the primary device 122 where the primary device implements the received virtual entry, e.g., command (e.g., by skipping forward in content displayed through the primary device 122). As such, the server provides accurate routing of commands, content, supplemental content and the like. In some instances, the server comprises a messaging service used in routing communications, commands, content and the like. The server, in some embodiments, can maintain a database of devices and the cooperation between devices, and can use this database in routing by maintaining source and destination information. Numerous different device pairs and/or groups of devices can be independently cooperated through the server 130, and the communications with these pairs or groups can be maintained separate by the server. It is noted that the server 130 is depicted in FIG. 1 as a single block, however, it will be appreciated that the server may be a single device or multiple devices distributed over the network 132 that would in concert distribute the workload to establish the cooperation between devices while supporting thousands to hundreds of thousands or more of cooperated pairs of devices or groups of devices at a time.

Figure 2A:
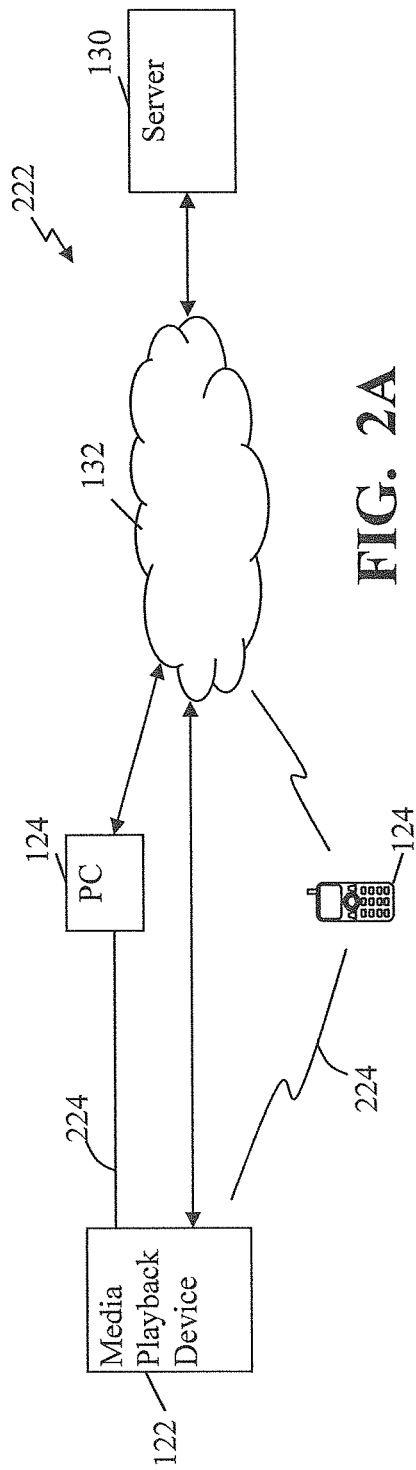
FIG. 2A depicts simplified block diagram of a system according to some embodiments to provide coordination between media devices.

FIG. 2A depicts simplified block diagram of a system 220 according to some embodiments to provide coordination between media devices. Similar to the system 120 of FIG. 1, the system 220 includes a first or primary media device 122, one or more secondary devices 124 and a server 130 communicationally coupled with one or both the primary device 122 and the secondary device(s) 124 through a distributed network 132. In this embodiment, however, a secondary device 124 can directly communicate through direct communication links or connections 224 with the primary media device 122. These direct connection 224 can be wired, optical, wireless or other such relevant links (e.g., twisted wire pair, radio frequency (RF), infrared (IR), Wi-Fi, Bluetooth and the like). The server 130 in part can provide coordination and/or authorization to the primary device and/or the secondary device(s) so that content can be communicated, received and/or accurately utilized (e.g., decrypted) as fully described below.

Figure 2B:
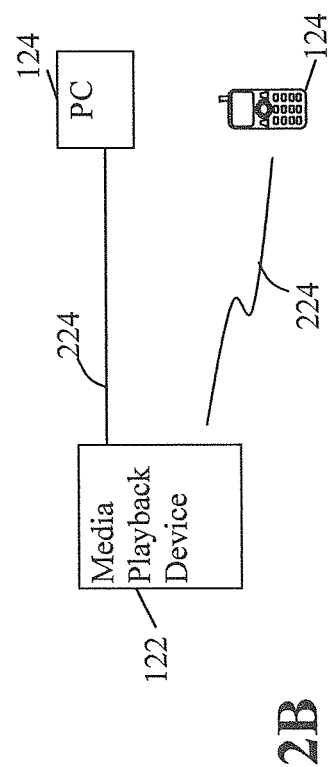
FIG. 2B depicts a simplified block diagram of a system according to some embodiments to provide coordination between media devices.

FIG. 2B depicts a simplified block diagram of a system 220 according to some embodiments to provide coordination between media devices. In these embodiments, the primary device 122 is in direct communication with one or more secondary devices 124. Authentication and/or some other handshaking can be established directly between the primary device 122 and a secondary device 124. A server 130 or other third party is not needed to establish the cooperation or to relay communications between the primary and secondary devices. Once the two devices have established an authorized cooperation, communication can be implemented directly between the primary device 122 and the secondary device 124. Again, the link or communication between the primary device 122 and the secondary device 124 can be over wired, optical, wireless or other such relevant links (e.g., twisted wire pair, radio frequency (RF), infrared (IR), Wi-Fi, Bluetooth, cellular and the like).

Figure 3:
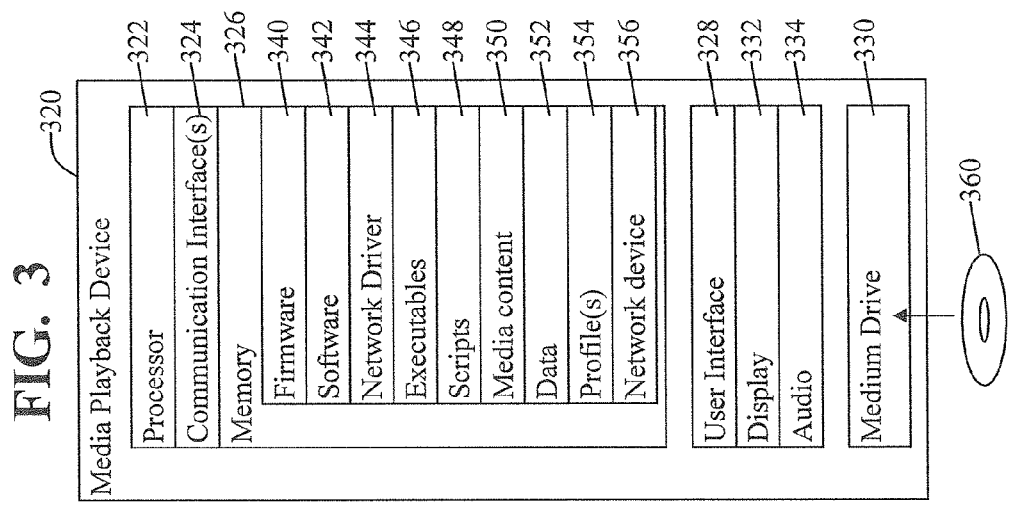
FIG. 3 depicts a simplified block diagram of a media playback device that can be implemented in the systems of FIGS. 1 and 2 as the first or primary device.

FIG. 3 depicts a simplified block diagram of a media playback device 320 that can, for example, be implemented in the systems 120, 220 as the first or primary device 122. The media playback device 320 includes one or more processors or controllers 322, one or more communication interfaces 324, one or more memory or computer readable storage 326, user interface 328 and other relevant components such as internal communication links and/or buses (not shown), and the like. Some media playback devices 320 further optionally include relevant components for use in playing back content, such as medium drive 330, a display 332, audio system (e.g., one or more speakers) 334, and other relevant components.

The media playback device 320 can be substantially any relevant playback device such as, but not limited to, a set-top-box, a TV, a disc player (e.g., Blu-ray, high-definition digital versatile disc (HD-DVD), digital versatile disc (DVD), compact disc (CD), etc.), audio player, computer, portable media player, an electronics gaming device and/or other consumer electronic device programmed with executable instructions to establish and utilize the cooperation with a secondary device 124 as described above and further below. The processor(s) 322 can be one or more microprocessors, minicomputers or other such processing devices or combinations of devices configured to access and implement the playback of the multimedia content, and in some instances provide functional control of the system. In some embodiments the processor 322 includes video and/or audio processing functionality, such as decoders, encoders and the like; however, the video and/or audio processing functionality can be implemented through separate devices cooperated with the processor 322 such that at least some of the processing of content is initiated by the processor 322 instructing other processing devices to perform specific aspects of the content processing. Additionally, in some instances, the processor 322 includes communication functionality and/or directs additional devices to process received communications (e.g., communications from over the network 132, from a remote control device, and other such communications) as well and transmit communications.

The communication interfaces 324 provide interfaces, ports, connections, antenna and the like through which the media playback device 320 can communicate with other remote devices and/or communication networks. These communication interfaces can include interfaces such as, but not limited to, a parallel port, an IEEE 1394 serial port, a game port, a USB port, an IR interface, RF interfaces, antenna or other such interfaces.

The memory 326 is coupled with the processor 322 and typically includes one or more non-transitory, tangible processor and/or computer-readable media accessed by at least the processor 322 and can include volatile and/or nonvolatile media, such as RAM, ROM, EEPROM, flash memory or other memory technology. The memory can store firmware 340, software 342, network or communication drives 344, executables 346, scripts 348, media content 350, data 352, profiles and/or account information 354, network device ID and/or address 356 and the like.

The user interface 328 allows the user to interact with the media playback device 320 and can include substantially any relevant interface, such as physical buttons, an optical or radio communication interface for communicating with one or more remote controls and other such user interfaces. The medium drive 330 receives a portable storage medium 360 and allows the processor 322 or other relevant components of the media playback device 320 to access content stored on the medium 360. The portable medium can be substantially any portable computer readable medium, such as a disc, flash memory and other such memory. The display 332 can be substantially any relevant display such as, but not limited to, a cathode ray tube display, a liquid crystal display (LCD), plasma display panel, light emitting diode display, and other relevant displays. Similarly, the audio 334 can be substantially any relevant audio drive, device and/or system, such as one or more speakers, speaker drivers and the like.

Figure 4:
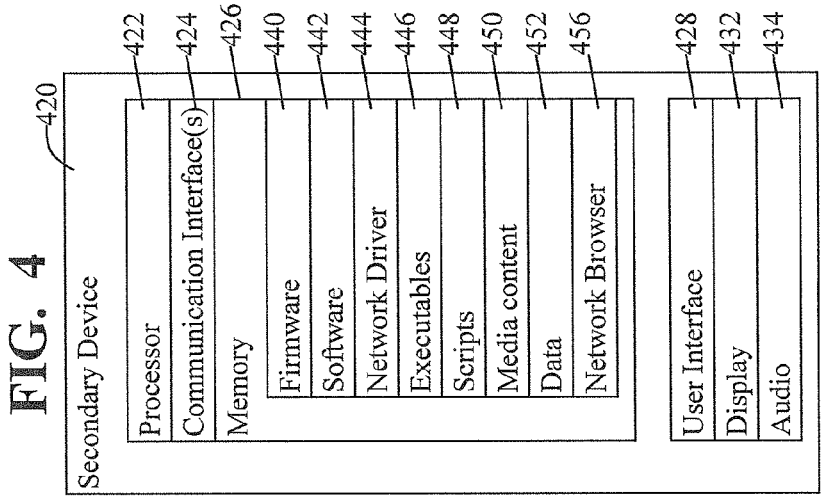
FIG. 4 shows a simplified block diagram of an example secondary media device that can be utilized in the systems of FIGS. 1 and 2 in coordinating with a primary device.

FIG. 4 shows a simplified block diagram of an example secondary media device 420 that can be utilized in the systems 120, 220 in coordinating with a primary device 122. As introduced above, the secondary device can be substantially any relevant secondary device having multimedia and/or data entry capabilities that can be coordinated with the primary device 122. Some examples of the secondary device can include a computer, laptop, wireless phone, personal digital assistant (PDA), audio player, video player, electronic gaming players, other consumer electronic devices, and other such devices or combinations of devices.

In some instances, the secondary media device 420 can include one or more processors or controllers 422, one or more communication interfaces 424, one or more memory or computer readable storage 426, user interface 428 and other relevant components such as internal communication links and/or buses (not shown), and the like. Some secondary media devices 420 further optionally include relevant components for use in displaying and/or playing back content, such as a display 432, audio system (e.g., one or more speakers) 434, and other relevant components. Some embodiments optionally my have a memory port and drive (not shown) to receive portable memory, such as a disc, memory stick or the like.

The processor(s) 422 can be one or more microprocessors, minicomputers or other such processing devices or combinations of devices. In some embodiments the processor 422 includes video and/or audio processing functionality, such as decoders, encoders and the like; however, the video and/or audio processing functionality can be implemented through separate devices cooperated with the processor 422. The communication interfaces 424 provide interfaces, ports, connections, antenna and the like through which the secondary media device 420 can communicate with other remote devices and/or communication networks. These communication interfaces can include interfaces such as, but not limited to, a parallel port, an IEEE 1394 serial port, a game port, a USB port, an IR interface, RF interfaces, antenna or other such interfaces.

The memory 426 is coupled with the processor 422 and typically includes one or more processor and/or computer-readable media accessed by at least the processor 422 and can include volatile and/or nonvolatile media, such as RAM, ROM, EEPROM, flash memory or other memory technology. The memory can store firmware 440, software 442, network or communication drives 444, executables 446, scripts 448, media content 450, data 452, a network browser 456, user profile information and the like.

The user interface 428 allows a user to interact with the secondary media device 420 and can include substantially any relevant interface, such as physical buttons, a touch screen, graphical user interface displayed on a display, pointing device (e.g., mouse, trackball, stylus, etc.) and other such user interfaces. The display 432 can be substantially any relevant display such as, but not limited to, a liquid crystal display (LCD), light emitting diode display, and other relevant displays. Similarly, the audio 434 can be substantially any relevant audio drive, device and/or system, such as one or more speakers, speaker drivers, headphone jack and driver, and the like.

Figure 5:
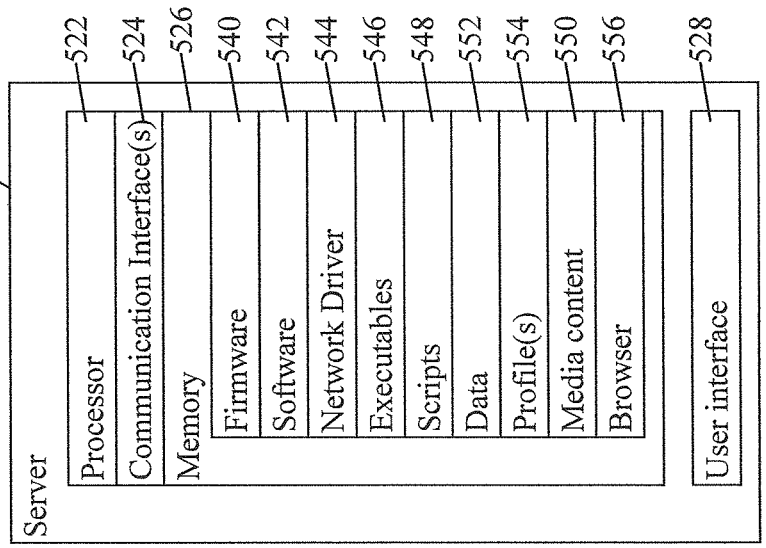
FIG. 5 depicts a simplified block diagram of a network device or server according to some embodiments that can be incorporated into the systems of FIGS. 1 and 2 and communicate over the distribute network with the primary device and the secondary device to coordinate the two devices.

FIG. 5 depicts a simplified block diagram of a network device or server 130 according to some embodiments that can communicate over the distribute network 132 with the primary device 122 and the secondary device 124 to coordinate the two devices. The server can be implemented through a computer or other data processing device and includes one or more processors or controllers 522 and one or more communication interfaces 524. Some embodiments optionally include one or more local memory or computer readable storage 526, user interface 528 (which may include a display and/or audio) and other relevant components such as internal communication links and/or buses (not shown), and the like.

The processor(s) 522 can be one or more microprocessors, minicomputers or other such processing devices or combinations of devices. In some embodiments the processor 422 includes video and/or audio processing functionality, such as decoders, encoders and the like; however, the video and/or audio processing functionality can be implemented through separate devices cooperated with the processor 522. The communication interfaces 524 provide interfaces, ports, connections, antenna and the like through which the server 130 can communicate with the primary device 122 and secondary device 124. Additionally in some instances, the interface provides communication with remote data storage devices 140. These communication interfaces can include interfaces such as, but not limited to, a parallel port, an IEEE 1394 serial port, a USB port, an IR interface, RF interfaces, antenna or other such interfaces.

The memory 526 is coupled with the processor 522 and typically includes one or more processor and/or computer-readable media accessed by at least the processor 522 and can include volatile and/or nonvolatile media, such as RAM, ROM, EEPROM, flash memory or other memory technology. The memory can store firmware 540, software 542, network or communication drives 544, executables 546, scripts 548, media content 550, data 552, profiles and/or account information 554, a network drive and/or browser 556 and the like.

As described above, the server 130 coordinates the primary device 122 and a secondary device 124. In coordinating the primary and secondary devices commands, multimedia content, data, text or the like that is relevant to content on one of the primary or secondary devices can be forwarded to the other of the secondary or primary device. In some representative examples, media content played back at the primary device 122, for example from a portable medium 360, can be identified and content relevant to the identified media content can be communicated to the secondary device 124 or from the secondary device to the primary device 122. For example, when a primary device 122 is playing back a movie from a portable storage medium 360, the primary device 122 can forward a content identification (ID) of the movie to the server. Based on the identified movie, the server can locate additional or supplemental content that is relevant to the identified movie and cause that supplemental content to be forwarded to the secondary device 124. Similarly, the secondary device 124, in some instances, can forward additional content (e.g., content received from a third party over a chatroom service) to the server that is relevant to the identified movie, and the server can forward the additional content to the primary device 122 to be displayed by the primary device, for example, in a sub-window or on a small portion of the display.

In some instances, the media content, for example played back by the primary device 122, is part of a media package that includes one or more media content along with metadata, one or more content identifications, authentications, access keys and/or passwords, authorizations, supplemental content and the like or combinations thereof. The primary device 122 and/or server 130 can utilize the additional data of the content package in determining whether to cooperate the primary device 122 with the secondary device 124, determine whether there is data and/or content to be supplied to the secondary device 124, and/or other such interactions as further described below.

Figure 6:
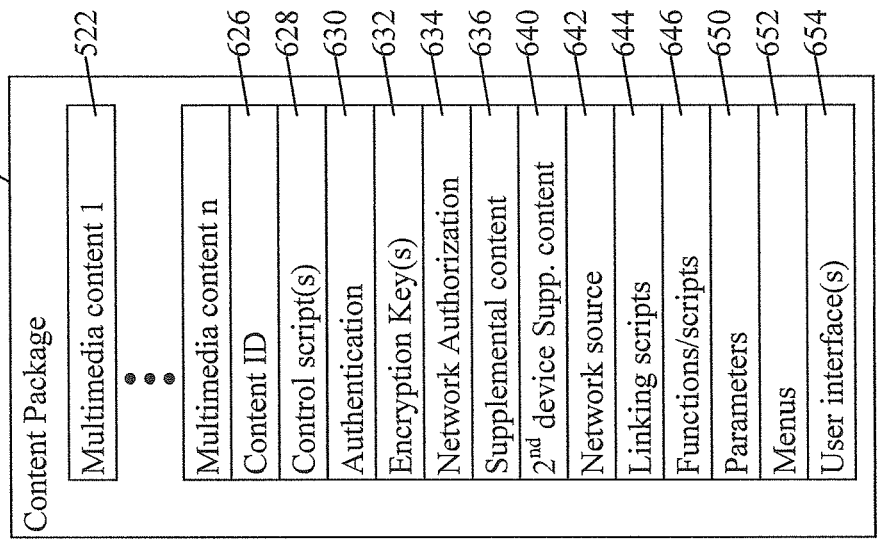
FIG. 6 shows a simplified representation of a content package according to some implementations that can be utilized by, for example, a primary device of FIGS. 1 and 2.

FIG. 6 shows a simplified representation of a content package 620 according to some implementations. The content package 620 includes one or more multimedia content 622 that is to be played back to the user, and one or more content and/or content package ID 626. In some embodiments, the content package optionally includes, one or more control scripts or logic 628, one or more authentications 630, keys 632, passwords, authorizations 634, supplemental content 636, content 640 to be communicated to another device (e.g., to the secondary device 124 for playback and/or display), identity and/or network address 642 of one or more network sources and/or servers 130, linking script 644, additional functions and/or scripts 656, parameters 650, menus 652, graphical user interfaces 654, and other relevant data. The content package 620 can be a physical medium (e.g., Blu-ray disc, HD-DVD, DVD, etc.), streamed content received from over the distributed network 132 or other network, broadcasted content (whether broadcasted wirelessly or over a cable line), pay-per-view, or other such media package.

The multimedia content 622 of the content package 620 can be substantially any multimedia content to be played back such as, but not limited to, video, audio, text, image, picture, graphics and other such content or combinations of content. For example, the content package 620 can comprise a movie and accompanying content and data stored on a portable storage medium 360, where a first multimedia content can be the video and audio of the movie, and a second multimedia content can be video and audio of a trailer for a movie to be released in the future. Again, substantially any multimedia content can be part of a content package 620, and a content package can include multiple multimedia content 622.

In some embodiments, the content ID 626 is an identifier of the content package 620. In some instances, the content ID 626 comprises multiple IDs that identify one or more of the multimedia content 622, the supplemental content 636 and/or coordinated device supplemental content 640. The content ID can be one or more titles, a defined numerical and/or alpha-numerical sequence, an ID or serial number of a portable storage medium (e.g., stored in a burst cut area of the medium), a content source ID or address (e.g., Internet address), content owner and/or distributor ID, description of a subject of content, identified actors, directors or producers, identification of related content and/or content packages, other identifiers and/or combinations of such identifiers. The one or more content ID 626 can be used in identifying the content package 620, and can be forwarded to the server 130 and/or secondary device 124 as part of the establishment of the cooperation between the primary device 122 and the secondary device 124.

In some embodiments, the one or more content control scripts 628 provide, in part, the functionality to log into a user account and allow the playback device when implementing a content control script to detect the presence of a secondary device 124 cooperated with the primary device 122. The control scripts 628 can further identify the content package 620 as a content package with the capability to provide for the cooperation between devices. In some instances, one or more of the control script 628 operate to cause the content package to be a trigger detected by the primary device 122 and/or server to activate the log-in and/or cooperation between a secondary device 124, and may cause further control logic to be forwarded from the server to the primary device in implementing the cooperation. The controls script(s) provides operational intelligence to the primary device 122 to allow the primary device to accurately utilize the content package 620, such as determining whether polling is need in communicating with the server or whether a socket can be established. For example, a control script can provide for the activation of a socket to allow a direct authentication and/or connection between the primary device 122 and the secondary device 124.

The authentication(s) 630 can be used in authenticating the media playback device (e.g., primary device 122), the content package 620, the multimedia content 622 and/or the secondary device 124. As an example, the authentication 630 may authenticate the medium disc 360 as a valid and legal disc, and not a pirated or unauthorized duplicated copy of a medium (for example based on a serial number or other identifier, which may be recorded to a burst cut area (BCA)). Based on the authentication 630 a user may have access to supplemental content 636, secondary device supplemental content 640, supplemental content and/or new content accessible from the server 130, database 140 or other source, access to coupons or rights to other content (e.g., other movies distributed by the same studio as the current movie being accessed), rights to download and/or participate in electronic games, rights to additional features or information about one or more of the multimedia content 622, graphics associated with one or more of the multimedia content 622, rights to perform personalization of displayed content and/or functionality provided by the medium 360, and other such authorization and/or combinations of authorization. The encryption key or keys 632 or other such assess rights (e.g., password, tokens, pins or the like) can grant the user with access to protected content. These keys, when included, can provide additional security to multimedia content 622 and/or provide further authentication of valid content.

The network authorization 634 can provide the primary or secondary device 122, 124 with rights to access sources of additional and/or supplemental content, such as through the server 130 and/or database 140 or other third party sources. Supplemental content 636 can optionally be included in the content package 620 to provide the user with additional content, features, games, programs, benefits and/or information. In some instances, the supplemental content is not accessible until authenticated, which can provide users with an incentive to obtain (e.g., through purchasing a medium or purchasing streaming content) valid content. The secondary device supplemental content 640 can include content that is to be forwarded to a secondary device 124 when present and cooperated with the primary device 122, and can be substantially any additional supplemental content, features, programs and the like.

As introduced above with some embodiments, a virtual connection, link or cooperation is established between primary and secondary devices 122, 124 as dictated in some implementations according to the content package 620. A linking script 644 is optionally provided in the content package providing the functionality to the primary device 122 to access the server and implement the log-in and establish the link. Typically, the primary devices 122 have the capability to access the network 132 but typically do not include the functionality needed to establish the connection with the server 130, log-in to the server or to establish the link with the secondary device 124. The linking script 644 is implemented by the primary device 122 to activate the linking between the primary and secondary device.

The content package 620 can provide further functionality to the primary device through one or more additional functions and/or scripts 646 that can be implemented by the primary device. The menus 652 and/or user interfaces 654 can be employed by the primary device, and which menu and/or user interface that is used can depend on a state of the primary device and/or whether a virtual link or cooperation has been established with a secondary device 124. Further, one or more of the menus 652 or user interfaces 654 can be forwarded to the secondary device to provide the secondary device with menus and/or user interfaces that are specifically relevant to the content package 620 and the multimedia content 622. Additionally or alternatively, the server can provide user interfaces, menus and/or content to the secondary device dependent on the content package 620. As a result, the user interfaces and menus available through the secondary device 124 are dependent upon and affected by the content package 620 and/or what is occurring at the primary device 122.

To provide this functionality, some embodiments leverage user registration, player ID, volume ID, serial ID as mechanisms for identifying the local media/user; network APIs inherent in the BD specifications can be utilized to establish online connections (e.g., for players determined to be internet capable, which typically means at least a profile 2.0 capable in the case of BD). Further, a permission file, such as a permission request file (PRF) for BD, can be used to define URLs to which initial connects can be established, but these can then be updated over the internet after the initial connection is established. Further, the content package, such as BD disc, downloaded content or other relevant package includes appropriate software that initiates an online connection, which for example can compensate for an inability to network-enable a disc in the field. Once a playback device has established a connection with a server, the server can take over or transfer the connection to another server to take over and dynamically generate a user interface or provide additional functionality. In some instances, the content package is defined in advance (e.g., software authored on disc) to control the experience and/or control the experience in combination with control from a server based on the availability of a secondary device. For example, the content package can include programming that allows the content package when implemented by the primary device 122 to control or at least partially control the secondary device 124. Typically, the content package allows for the cooperation with the secondary device 124 and/or utilizes the server to cooperate with, and in some instances control, the secondary device based on information provided by that content package (e.g., timing, content, queries, requests, code, executables, data, instructions, etc.). For example, similar to a disc volume ID or serial number, a secondary device can have or be given one or more identifiers, and then the server can arbitrate as to who has access (or limited authorized devices, for example, to limit to a brand or single cooperating or partnered third party).

As identified above and further below, the content package can be stored on a portable storage medium, such as an optical disc (e.g., Blu-ray Disc); however, the content package can be transferred from another device and/or received over the Internet (e.g., streamed content package). The functionality provided by a streamed content package typically can provide the same functionality as a content package recorded on a medium. In some instances, for example, due to limitations on bandwidth, storage and/or functionality capabilities of a device receiving the streamed content some functionality may be limited, however, this limitation is typically due to the device receiving the content package. Once a streamed content package is downloaded, the playback device utilizes the content package to provide the described functionality. In some implementations, the playback device uses content transferred or streamed over the Internet or from some other device, and performs a Virtual File System (VFS) update and reloads the downloaded assets as if they were actually coming from a disc. In connecting with a server, the content package (e.g., stored on an optical disc) directs, through code, the playback device to establish the connection with a server, for example, using a polling mechanism (where disc polls/communicates with server every x seconds to pass data back and forth), a socket connection can be directly established between disc and player or other relevant connections. The secondary device, in some implementations, can similarly be cooperated.

Further, the virtual link 134 or cooperation between the primary and secondary devices 122, 124 is implemented, in some embodiments, through a user account or profile 554. In some instances, both the primary and secondary devices access the server 130 and are identified as being associated with the same or a single entity, user or consumer. The virtual link 134 can be used to dictate what is displayed on the secondary device 124 based, for example, on content being played back at the primary device 122. Additionally in some implementations, the virtual link 134 allows information to be communicated to the secondary device 124 and/or between the primary and secondary devices 122, 124 indicating, for example, a need to upgrade the primary device (or vice versa). Further as introduced above, the secondary device 124 may, in some instances, establish a supplemental network communication connection that is different than the connection (whether virtual or real) between secondary device 124 and primary device 122 that allows the secondary device to communicate with third parties, third party servers and/or third party databases, for example, allowing a user to participate in a chat session and/or retrieving content through the secondary device.

Some embodiments, as introduced above with FIG. 2, allow a direct connection 224 to be established between the primary device 122 and the secondary device 124. In some implementations the direct connection 224 is established after the link or cooperation is established between the primary device 122 and the secondary device 124, allowing the primary and secondary devices to directly communicate (e.g., Bluetooth, Wi-Fi, wired or the like). The communication between the primary and secondary devices may employ a code or identifier in each communication, which might include a key, password, a pin number, a token or other authentication, a device ID, or the like, to distinguish the communication and allow the receiving device to confirm the origin and/or authentication of the communication. The token (e.g., alphanumeric string) can be issued to a primary device 122 that logs into the server, and using the same token through the secondary device the server can confirm the relationship between the two devices. In other instances, a socket can be established over the link 224 between the primary device 122 and the secondary device 124 following an authentication. This allows the primary and secondary devices to directly establish a cooperation and directly communicate to provide the cooperated playback experience.

By cooperating the primary and secondary devices, the secondary device 124, for example, can be utilized to perform functions that are not available or not readily or easily available through the primary device 122. For example, the secondary device 124 can implement a search over the network 132 for content and selecting content such that the selected content is then forwarded to and played back on primary device 122. As a further example, a user can participate through the secondary device 124 in a quiz or poll, and based on input and/or one or more answers entered or selected through the secondary device 124 subsequent content is displayed and/or played back through the primary device 122. Similarly, the secondary device 124, for example, may provide different types of navigation that are not available through the primary device 122 and/or not easily implemented through an interface of the primary device, such as standard remote control.

In some embodiments, the primary device 122 operates differently when a link or cooperation has not been established with a secondary device 124, than when a link or cooperation has not been established. For example, the primary device 122 may display supplemental content through the primary device 122 when a secondary device is not linked, and instead forwards the supplemental content to the secondary device 124 when the secondary device is linked. Additionally or alternatively, some features and/or content may not be available through the primary device 122 when the secondary device 124 is not linked with the primary device. For example, upgrades to content and/or the primary device 122 may not be available when the secondary device 124 is not linked. As a further example, when a link is not established between the secondary device 124 and the primary device 122, a user may not be able to interact with a source of additional content or may not be able to participate in a quiz or poll, and as such, cannot receive instructions and/or additional content in response to the participation.

Figure 7:
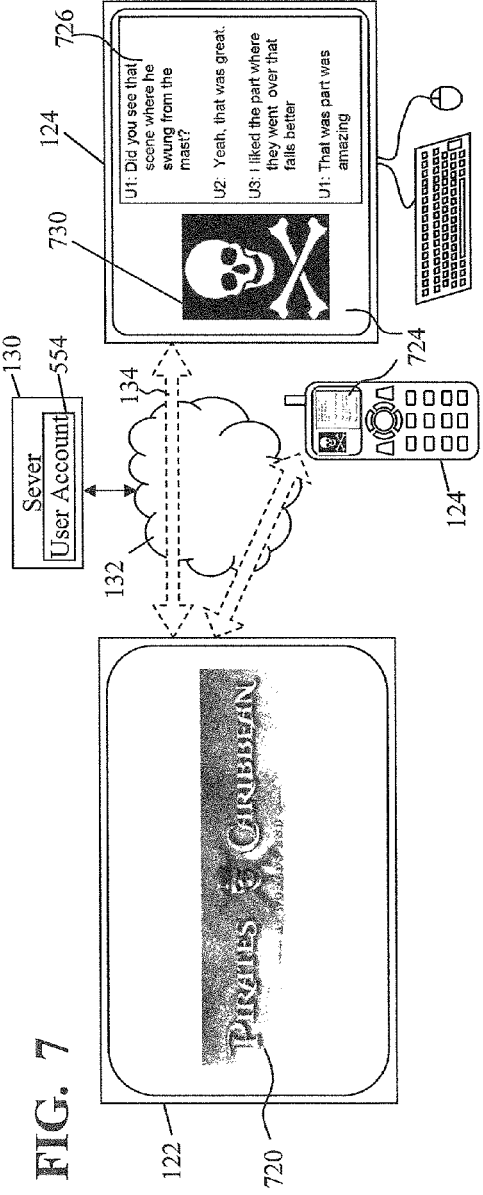
FIG. 7 depicts a simplified representation of the virtual connection or link established between a primary device and a secondary device of FIGS. 1 and 2 in accordance with some embodiments, and a representative cooperation between the primary and secondary devices through the virtual link.

FIG. 7 depicts a simplified representation of the virtual link 134 established between a primary device 122 and a secondary device in accordance with some embodiments, and a representative cooperation between the primary and secondary devices 122, 124 through the virtual link. The primary device 122 (e.g., a multimedia playback device such as set-top-box, TV, disc player or the like) provides access to and/or playback of content 720, such as playing back a movie recorded on a portable storage medium 360. Further, the primary device 122 communicates over the network 132 with the server 130 allowing the primary device 122 to register and/or log-in to a user account or profile 554. Similarly, the secondary device 124 (e.g., computer, wireless phone, PDA or the like) communicates over the network 132 with the server 130 to register and/or log-in to the same user account 554. Once each of the primary and secondary devices 122, 124 have logged-in to the user account 554, the server cooperates the two devices and establishes the virtual link 134 between the primary device 122 and the secondary device 124 such that content, commands and/or data can be communicated between the primary and secondary devices, and/or the secondary device is provided with authorization to access services and/or content 724 associated with the multimedia content 720 accessed through the primary device 122. Further, the secondary device 124 can display content 724 relative to the multimedia content being accessed. For example, the secondary device 124 can display a graphical representation 730 of the multimedia content 720 being played back through the primary device 122 (e.g., a representation of the movie being played back on the primary device 122).

In the example depicted in FIG. 7, a user employs the secondary device 124 to access a chat session and/or an instant messaging session associated specifically with the multimedia content 720 played back through the primary device 122 where a chat window 726 is provided to display the chat exchanges. Logging-in through the server 130 to the user account 554 provides, in part, the secondary device with the content ID to allow the secondary device to accurately access the chat or instant messaging session relevant to the content being accessed at the primary device. Additionally in some instances, the server 130 confirms that both devices 122, 124 are associated with the single user account 554 and provides authentication and/or authorization to the secondary device 124 to access the service and/or content 724 directly associated with the multimedia content 720 being played back through the primary device 122. In accessing the chat or instant messaging service, in this example, the user through the secondary device 124 is able to communicate with third party users similarly authorized to access the chat or instant messaging service.

Figure 8:
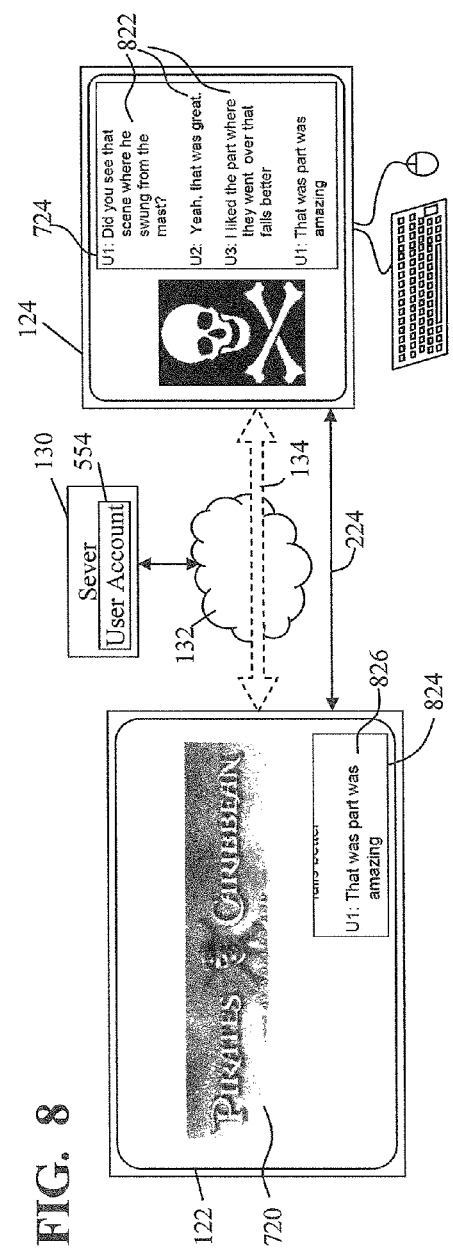
FIG. 8 depicts a simplified representation of the virtual connection, similar to that of FIG. 7, established between a primary device and a secondary device in accordance with some embodiments with a representative cooperation between the primary and secondary devices through the virtual connection.

FIG. 8 depicts a simplified representation of the virtual link 134, similar to that of FIG. 7, established between a primary device 122 and a secondary device 124 in accordance with some embodiments with a representative cooperation between the primary and secondary devices 122, 124 through the virtual link 134. In this representation, content is forwarded from the secondary device 124 to the primary device 122, through a direct connection 224 or through the server 130, to be displayed on the primary device 122 in cooperation with the multimedia content 720. For example, as content entries 822 in a chat or instant messaging session are received or entered at the secondary device 124 directly related to the multimedia content 720 played back at the primary device 122, the secondary device forwards the content entries 822 to the primary device 122 that in turn displays at least a portion of content entries 824, for example, in a sub-window 826. As such, some or all of the content 724 at the secondary device 124 that corresponds with the multimedia content 720 played back on the primary device 122 is additionally displayed on primary device 122.

The supplemental content from the secondary device 124 can be synchronized and/or coordinated with the media content playing back in the playback device, for example through polling or a socket. Additionally or alternatively, a common clock (e.g., on the server 130) can be used to synchronize the experience, where synchronization information (such as one or more timecodes, chapter points or other such codes) can be passed to both devices 122, 124 and then used with a timing model. Another option is to use the primary device 122 or information retrieved from the content being accessed and played back by the primary device (e.g., content recorded on a portable storage medium) as the master timing, and then forwarding or broadcasting synchronization information (e.g., timecode, location, etc.) to the secondary device 124. In this latter situation, compensation for network lag may be provided, for example when such lag can be measured, estimated and/or determined, and then adjustments to timecodes or other relevant information can be implemented based on this lag compensation. Further, the primary device 122 can broadcast information to the secondary device 124 that the secondary device can utilize, for example, to acquire additional information about the content being played back at the primary device, supply to the secondary device 124 information and/or content relevant to the content being played back and/or a particular portion of the content being played back (e.g., based on timing, timecodes, locations within the content, or other such information), provide commands to control the content being displayed at the secondary device, and other such interactions between the primary device 122 and the secondary device 124. The broadcast can be issued over the virtual connection 134, or over a direct connection 224 such as through a socket (e.g., through code in the content package or on the primary device) that can be utilized to provide the direct connection 224 between the primary device 122 and the secondary device 124, without the need to connect between a server 130 or other third party or without a remote source intervention. Further, the broadcast information can be broadcasted over wired or wireless communication and can be subscribed to by the secondary device 124. In some instances the broadcast can be communicated over a relatively short range wireless communication such as Bluetooth, Wi-Fi or other relatively short range wireless communication technologies that have effective ranges of typically less than about 1000 feet, and in some instances less than 300 feet, while other embodiments may employ longer range wireless communication techniques, such as cellular, satellite or other such wireless communication. In other embodiments the primary device can establish a socket with a local area network and broadcast over the local area network. For example, the primary device 122 can establish a connection or socket that allows the primary device to accept connections with one or more secondary devices 124.

In some implementations, the primary device 122 initially identifies a network address of the primary device (e.g., a local network address on a local area network). The identification of the network address can be achieved in one of several different methods. For example, the primary device 124 can create a socket over the distributed network 132 to a remote source or server 130 to retrieve a network address. In some instances, this remote source may be a predefined source whose access is stored at the primary device 122, specified on the portable storage medium 360 or obtained from another remote source. The predefined source can then provide the primary device 122 with a network address. The primary device 122, in some embodiments, as part of starting up a relevant application (e.g., the pocket BLU™ service) to communicate with a secondary device registers a corresponding service on a remote source or server 130. Once the service has been registered on the network, the primary device then begins to accept incoming socket connections on the local network. The request to register the service on the primary device 122 can include information that can be evaluated and/or utilized at the remote source or server 130. This information can include, for example, a title of a portable storage medium 360 or content on the portable storage medium, a title identification (e.g., alphanumeric string, title, etc.), an identification of an organization associated with the portable storage medium being accesses (e.g., read from an id.bdmv), a primary device identification, a volume identification for the portable storage medium 360, a Pre-recorded Media Serial Number (PMSN) of the portable storage medium (e.g., retrieved from a burst cut area (BCA)), a current menu language, capabilities of the application, a key, token or challenge that can be used in authentication (e.g., a random string, which may be randomly generated every time an application is run on a primary device), or other such information or combinations of such information.

In other implementations, a device controlling a local network can provide the primary device 122 with a local network address. Alternatively, a default network address known at the primary device 122 (e.g., a static IP address) can be utilized. In yet other embodiments, a local application or API (e.g., get local IP address or other relevant API) is activated that acquires a network address without accessing the remote source or server 130 over the distributed network 132. Alternatively, the primary device 122 can obtain the network address through other methods as are known in the art.

Once the primary device 122 has a network address the primary device can establish a server socket on the primary device that allows code on the primary device to accept incoming connections from other devices, including from one or more the secondary devices 124, and identifies a port associated with that server socket. With the combination of the server socket, port and network address the primary device 122 can publish a service on the local network or over the distributed network 132 broadcasting and/or announcing that the primary device 122 is available on the network at the specific network address and port with which secondary devices 1224 can connect. This broadcast or announcement may include additional information that can be used by the secondary device 124 and/or a user of the secondary device. For example, the additional information may provide an identification of the portable storage medium 130 and/or content on the portable storage medium being accessed by the primary device 122 (e.g., title, organization ID, disc ID, and/or other such information), timing information, authentication information and/or other relevant information. Further, the announcement can be a standard network announcement or similar to a standard announcement, such as a standard multicast DNS (Domain Name System) service announcement and/or DNS based service discovery. Typically, the primary device 122 activates, as part of the announcement or in response to the announcement, a thread running on the primary device itself that accepts incoming connections.

In response to detecting the announcement the secondary device 124 can then look for a service type associated with the announcement. In some instances, one or more secondary devices 124, capable of establishing a connection with the primary device 122 and taking advantages of the features provided, have knowledge of a specific service type that they attempt to identify. For example, secondary devices 124 configured with pocket BLU™ may include instructions and/or code to look for a specific service type that is a pocket BLU™ service. The secondary device 124 can respond to the announcement and the primary device 122 can establish the connection, and in some instances attempts to authenticate each connection individually.

In providing a communication application to communicate between the primary device and the secondary device (e.g., a pocket BLU application or other such application), some embodiments provide a reference or access to one or more connection libraries, plug-in libraries and/or properties (e.g., a connection.jar relative to a connection library, a plugin.jar relative to plug-in library that may be combined into the application jar and provides access to the connection library as well as thread synchronization (where the library may depend non a framework used), a properties file (which may be stored at a designated location (e.g., BDMV/JAR/###), and/or other such information). The properties file may define parameters to: disable or enable connection with a secondary device, which can be checked as part of an initialization prior to establishing a connection, a stop index, or other such properties. Other objects or functions may also be included to support the communication application. For example, one or more functions can be defined to implement commands specific to the communication application and/or functions provided through the communication application. For example, a stop command or index may be provide that causes a playback to stop and jump to a predefined content or point in the play list or index table. In some instances, a movie object can be defined and associated with a title number in the index table.

The connection between the primary device 122 and the one or more secondary devices 124 can be established in other methods. For example, as described above a virtual connection or link 134 can be established. In other implementations, the primary device 122 can establish a connection and/or socket through a UPnP (Universal Plug and Play). In yet some other instances, the primary device 122 does not have to know its network address, and instead, a predefined port on the primary device can be utilized that secondary devices 124 are pre-programmed or supplied with to allow the secondary devices to try and connect with that specific port (e.g., a secondary device may send a broadcast over a local network in attempts to connect with a primary device 122 running an appropriate service). Alternatively, in some embodiments a socket can be established the other way around with the secondary device 124 establishing the socket. For example, a secondary device 124, with knowledge of its network address, can initiate a broadcast and allow the primary device 122 to connect with the secondary device. This socket can, for example, be implemented in a similar way as described above but in the opposite direction. In this instance, the primary device 122 typically does not have to know its network address. In yet other embodiments, the connection may manually be established between a primary device 122 and one or more secondary devices 124 (e.g., manually notifying and/or entering in to each device to tell each device where to find the other device).

In some implementations, the broadcast distributed by the primary device 122 can be a generic broadcast with basic information, such as a content identification, timecodes (e.g., periodic timecodes, timecodes based on trigger events or other such timing or combinations of timing), location, chapter points or other such generic information. The broadcasting can, in some instances, be implemented using a generic, standard or predefined protocol. For example, Bonjour or zero-configuration networking from Apple™, Rendezvous™ from Tivo™ or other similar applications and/or protocols can at least in part be used. The secondary device 124 can then take advantage of the information provided and implement one or more applications operating on the secondary device or that can be acquired by the secondary device to utilize the information for substantially any relevant purpose. As such, the majority if not substantially all of the computational and/or processing functionality employed to obtain additional information and/or otherwise enhance the user's experience associated with the content being played back through the primary device 122 can be implemented at the secondary device 124, thus allowing the primary device 122 to be relatively basic or does not need to continually be updated. Instead, the secondary device 124 can acquire new functionality and/or applications that provide a variety of functionalities to utilize the information broadcasted by the primary device 122. For example, the primary device can be a simple optical disc player that broadcasts, over the socket to the secondary device, an identification of content being accessed (e.g., a movie title, a game title and/or version, and other such identifiers) and in some instances can broadcast other basic information, such as timecodes, scene number, chapter number, selected fields, game field, game level, a coordinate location within a game environment, a song title, a verse number and other such information. The secondary device could be a cellular phone or a wireless smart phone that can acquire one or more different applications with varying functionalities that can utilize the information, such as obtain passwords to access secret levels of a game, obtain additional information about an actor in a scene being played back, obtain a trailer to a sequel to the movie being viewed through the primary device 122, obtain access to purchase merchandise associated with the content, purchase movie tickets for a sequel currently playing at a movie theater, purchase tickets to a concert for the band playing the music currently being listened to through the primary device 122, activate a game on the secondary device (e.g., a trivial game about the movie, director, producers and/or actors), obtain ringtones, obtain wallpaper displays, access to a clip library video ringtones, and other such applications. Again, the one or more secondary devices have functionality beyond communicating and interacting with the primary device, and typically have a main functionality that is different than communicating with the primary device, such as communicating with other individuals through other secondary devices and/or other telephones; providing access to the Internet; providing calendaring; providing a user with access to email; data, information and/or computational processing; playing back multimedia content; and other such functionality or combinations of such functionality.

In some embodiments, the primary device 122 may simply broadcast an identification of the content, such a movie title or code that identifies content. Based on this simple information the secondary device 124 can access a remote source to acquire additional information about the content being accessed by the primary device 122, obtain applications to interact with other sources of content and/or participate in an interactive experience (e.g., chat, instant messaging, playing a game, and the like) and other such applications. Further, the secondary device 124 may be able to forward commands to the primary device 122 to control access to and/or playback of the content being accessed by the primary device. As one example, based on an identification of a movie being accessed by the primary device 122, a secondary device may be able to access a remote source, such as an Internet Movie Database (IMBD) Application, to acquire information about the movie, such as obtaining an indexing of each scene within the movie where a certain actor is present. The secondary device 124 may display this index and allow the user to select one or more of the entries of the index. Based on a selection the secondary device can communicate commands to the primary device (e.g., over a direct connection 224 or over the virtual link 134) that directs the primary device to jump to and initiate playback of the one or more scenes selected on the secondary device by the user. The capability to allow the primary device 122 to receive communications is described above and further below, which may be implemented, for example, through a listening application recorded on the medium 360 being accessed by the primary device. In other embodiments, the secondary device 124 may be able to "tag" or mark (e.g., bookmark) a portion of content being played back at the primary device and/or the secondary device (e.g., based on the timing information provided by the primary device or other information provided by the primary device in response to receiving an indication of the marking). Furthermore, the secondary device may be able to distribute this information, for example as a link or other information from the content being played back at the primary device 124 (e.g., timecodes or the like) to create links that can then be accessed by the primary device 122 or utilized by other users (e.g., another user accessing the same content through a different primary device). In some instances, the link or relevant information may be made available through social networking (e.g., Twitter, Facebook or the like). For example, a favorite scene can be shared through Twitter.

Other relatively basic or generic information can be communicated to the secondary device to allow the secondary device 124 to enhance the playback experience. For example, a simple remote source identification or Internet address may be provided to the secondary device. The secondary device can use this information to access the remote source and acquire information, applications or the like that may be utilized to enhance the playback experience.

In other embodiments, additional and/or more specific information may be broadcasted by the primary device, such as names of actors, specific codes or authorizations to access additional content, additional content or other such information. This information can similarly or alternatively be utilized by the secondary device through substantially any relevant application configured to utilize the corresponding information.

As another example, a series of optical discs (e.g., all discs produced by a distribution company) could include a broadcaster application or code (e.g., a Java or XML application). This broadcaster application can be activated by a primary device 122 playing back content from the disc to cause the primary device to broadcast status information, statistics, position, location, timing and/or other information relative to the playback of the content from the disc. This broadcasting can be continuous, periodic, intermittent, in response to events (e.g., detecting a chapter boundary), detecting predefined marker and/or other such implementations. Again, this allows the disc, in some embodiments, to be relatively basic without complicated applications or without future discs having to add additional applications because the secondary device 124 acquires and employs the applications based on the information obtained from the broadcasts containing information from the disc. This broadcasting can similarly be distributed through the server 130 or other third party to be utilized by a secondary device 124 cooperated with a primary device 122. As a result, the content package becomes the source of the broadcast that is utilized by one or more secondary devices 124.

In some implementations, the broadcast from the primary device 122 is limited to the one or more secondary devices 124 currently connected (and in some instances authenticated) with the primary device 122. The primary device 122 typically does not send out packets to every device on the network, and instead, typically broadcasts out to the one or more secondary devices 124 that have established a connection with the primary device 124 and/or have been authenticated. In other instances, however, a generic broadcast can be distributed by the primary device 122 and allows the other devices receiving the broadcast to determine whether it can take advantage of the broadcast, information and/or services identified in the broadcast. Again, one or more authentication schemes may be employed by the primary device 122, secondary device 124 and/or remote source or server 130 to restrict usage. Further, the authentication may limit a secondary device's ability to utilize the broadcast based on the secondary device 122 or credentials of the secondary device (e.g., licensing may limit functionality and/or access).

This authentication can be established between the primary device 122 and one or more secondary devices 124, which may include authentication based on information provided by a remote service or server 130. In some instances, the authentication is simply between the primary device 122 and the secondary device 124, such as providing an established password or pass code. Additionally, the portable storage medium 360 may include code that directs the primary device 122 to request specific information from a secondary device 124, such as information provided by a remote source or server 130. For example, an application being implemented on a secondary device 124 accesses a remote source or server 130 and provides some identification, registers, sets up an account or the like, and obtains a code, token, password, key or other such authentication. Upon connecting with the primary device 122 the secondary device 124 can supply the password, token, key or the like to the primary device confirming authentication. As a further example, when a connection is established between the primary device 122 and the secondary advice 124, the secondary device 124 (or application on the secondary device) can provide an authenticate command (e.g., with a specially formed token) to the primary device 122. Again, this token can be received from a remote source 130 and/or be formed at the secondary device 124 based on information from a remote source and/or information at the secondary device. In some instances, the token can be formed by taking a code, key or the like (e.g., a hash of a primary device-secondary device secret, which can be, for example, a string that is known to both the secondary device 124 and the primary device 122), together with some additional pertinent information (e.g., a secondary device identification, a challenge (which can be different for each content owner, different for each content title, different per portable storage medium 360, different for each portable storage medium registered with the remote source 130, or the like) or other such information). This allows secondary devices 124 that have knowledge of the algorithm and the primary device-secondary device secret to authenticate with a portable storage medium 360 being accessed at the primary device 122.

As described above, in some implementations the primary device 122 provides a challenge string to a remote service or server 130. The challenge can attempt to ensure that a secondary device 124 that is intending to connect to a primary device 122 has detected the service on the network. The challenge string can be used in authentication, such as in the generation of an authentication token, which may permit the secondary device to send additional commands to the primary device. Further in some implementations, the challenge string can be used by the secondary device to receive other authentications or tokens (e.g., from the primary device 122 or a remote server 130), such as a disc client token that allows the secondary device to access content hosted on one or more servers 130.

In other embodiments, there may be different classes or levels of authentication. For example, there could be one or more classes such as: a master class, a content owner class, a content title class, a portable storage medium class, and other such classes. The master class may allow a secondary device 124 to establish an authentication relative to substantially any portable storage medium 360 configured to allow the primary device 122 to cooperate with a secondary device 124 as described herein. The content owner class may allow a secondary device 124 to establish an authentication with a primary device 122 that is actively accessing a portable storage medium distributed by and/or containing content owned by the content owner. A content title class may allow a secondary device 124 to establish an authentication with a primary device 122 that is accessing a portable storage medium storing a particular content title. A portable storage medium class may limit authentication to a specific portable storage medium 360. Similarly, some authentication classes may additionally or alternatively be associated with types of secondary devices 124 and/or functionality provided by different types of secondary devices. Other classes of authentication may be established. Further, the different classes may provide and/or allow different functionalities, information, capabilities and the like.

In some instances, the master class may be implemented similar to the authentication sequence described above. Other classes of authentication may include additional or different information, and/or provide different primary device-secondary device secrets. For example, secrets formatted a certain way or including certain information or starting with a certain character or string of characters may identify a secrete as being associated with a specific level or class of authentication (e.g., the communication can include a first secret (e.g., a secret known only to the software implemented on the primary device 122 and to a remote source or server 130), a client class identification, and in some instances additional information, such as identifiers (e.g., identifiers, such as provider ID, content owner ID, studio ID, secondary device ID etc.), or other such information or combinations of such information).

The secondary device 124 or application running on the secondary device (e.g., a third party application) receives a request or instructions for authentication, and the application generates the authentication, such as described above, for example by mapping a provider ID to an authentication challenge or secret, which may be provided by a third party source or server 130, formed as described above. The application or code being implemented on the primary device 122, in response to receiving of an authentication response or authentication request from a secondary device 124 with a predefined client class, determines and/or calculates a corresponding authentication token in accordance with an algorithm corresponding to the identified authentication token, thus limiting authentication to those secondary devices 124 that have applications that can provide the appropriate secret.

Again, the functionality and/or access provided through these varying authentication classes or levels can vary. For example, access can be restricted to those third party applications operating on secondary devices 124 that have been given a token or key by a predefined remote source or server 130. Similarly, different tokens, passwords or keys can further restrict access, for example, to a specific content owner, provider or studio (e.g., based on a provider ID, studio ID, etc.). Additional security precautions can be employed in some embodiments. For example, the tokes, keys and the like may be encrypted by the secondary device 124 or supplied to the secondary device in an encrypted form. Similarly, the secondary device may encrypt some or all of the authentication communication (e.g., the class code, 3rdPartyClientPlayerSecret, or the like). This encryption can be implemented through substantially any relevant encryption, such as public and private key encryption using PKI infrastructure.

As described above, the authentication may further establish restricted usage, restrict the information, restrict the type of information and/or restrict distribution of information. Similarly, other information my result in restrictions, such as an identification of a device type of the secondary device 124.

The broadcasts and/or communications from the primary device 122 to the secondary device 124 can be initiated by the primary device in response to triggers, requests or commands. Again, triggers are not limited to instructions, commands, events and the like on portable storage medium 360 and/or in response to playing back content from the medium 360, but can include responses to inquiries, states, information returned on states, commands received from one or more secondary devices 124, requests from a secondary device, in response to a communication from a remote source or server 130, user interaction (which could occur on the primary device 122 or secondary device 124), device capability (e.g., a secondary device 124 loosing its connection, a device acquiring a new capability (e.g., in response to the secondary device accessing a remote server 130 and acquired new capability), and the like) and other such triggers.

Again, the information broadcasted can be specific to one secondary device 124, information relevant to one or more secondary devices 124, a generic broadcast or the like. Similarly, the information broadcasted can be specific information or basic information, such as a content identification, timecodes (e.g., periodic timecodes, timecodes based on trigger events or other such timing or combinations of timing), location, chapter points or other such generic information. For example, each piece of content accessed by the primary device 122, including content accessed from the directly accessed portable storage medium 360 and in some instances content obtained from a remote source, can have a content identification. This content identification can be forwarded to a secondary device 124 to help the secondary device determine what is being accessed and/or played back at the primary device and can be used to identify supplemental content and/or obtain supplemental content relevant to the content being accessed at the primary device. In some instances, the primary device can further forward additional or supplemental content to the secondary device or notify a remote source to supply supplemental content that is appropriate for the secondary device. Similarly, commands, instructions and/or calls to action based on the content can be issued. For example, a theatrical trailer may be playing back on the primary device, and a user could press a call to action that would activate an application on the secondary device 124 to allow a user to find and purchase theater tickets for the movie associated with the trailer, and/or to request more information about the content being watched through the primary device.

In some instances the broadcast and/or communications from the primary device 122 to one or more secondary devices 124 can include state information and/or can be a state broadcast. Further, some embodiments provide different information depending on different levels of state updates. For example, a secondary device 124 can be associated with a state level based on a request from the secondary device, an identification of the type of the secondary device or capabilities of the secondary device, an identification of a user or associated user account, an identification of user access, an authentication class or level, and the like or combinations thereof.

Additionally, secondary devices 124 can request different levels of state updates from the primary device 122 and/or the primary device can identify that a secondary device is to be associated with a level of state updates. In a first level, for example, a secondary device can request that no updates be distributed. In a second level, a state update is only communicated on a change of the media on the primary device 122 (e.g., playing back a movie recorded on the portable storage medium 360, then receiving a command to switch to view "deleted scenes," a broadcast can be sent out when that media change occurs). In a third level of state updates, one or more events or triggers detected and/or received at the primary device 122 initiates or triggers an update (e.g., when a playlist is started, when a playlist ends, when a particular play item is reached during playback, every time a new piece of content starts playing back, every time a piece of content ends, each time a chapter point or mark is reached, each time a user changes an active audio or subtitle stream, each time a user initiates a control of playback (e.g., rewind, fast-forward, pause, etc.), a video angle change is detected, playback is data starved, a resource is removed or withdrawn, and other such events).

In a fourth level of state updates, periodic updates are communicated (e.g., communication of state update occurs every 0.5 or 1 second, where a timer on the primary device is used to broadcast the relevant information in accordance with the defined update period). In some instances, the secondary device 124 can specify the update period (which may be based on information from the secondary device or information provided to the secondary device (e.g., from a remote source based on a device type of the secondary device), while in other instances the primary device 122 may use a default period, a period based on a device type of the secondary device, or other such factors. The periodic and/or event based updates, in part allow the primary device 122 and the one or more secondary devices 124 to maintain some synchronization during playback and/or user interaction (e.g., during playback of a game or move content). A fifth level of state updates can allow the secondary device 124 to asynchronously request a state update, for example, allowing the secondary device to request an update at substantially any appropriate time. Other levels of state updates can be specified depending on the operation and capabilities of the primary device 122 and/or secondary device 124. Further, it will be appreciated that combinations of levels can be employed, for example, depending on the type of information or update involved. As one example, a first level can be associated with a first kind of update (e.g., timing information may be associated with a periodic level to establish synchronization between devices), while a second level is associated with a second kind of updated information, while a third asynchronous level is associated with a third kind of information.

Furthermore, some information and/or features are dependent on knowledge of the current state of the primary device 122. The amount of information, and how often that information is communicated to a secondary device 124, in some implementations, may be configurable through the series of levels of state updates, e.g., set by one or more "setStatusLevel" commands from the secondary device. This setting or command can have, for example, two optional fields or headers, a "level" and a "period." The "level" configures the set of primary device events that initiate the generations of a status update. The "period" sets durations between consecutive updates and in some instances may define different durations depending on the type of update being communicated. In some instances the command may also include other fields, such as a title field that identifies the type of information for which the command is to be set. These settings or commands result in status updates being sent (e.g., periodically, asynchronously, in accordance with a schedule, etc.) to the secondary device 124. Some embodiments may employ a minimum duration (e.g., 500 milliseconds), and further some embodiments may include one or more default durations (e.g., a default duration of 1 second), which may depend on a type of update being sent. Reception at the primary device 122 of one of these commands modifying the status update settings may, in some instances, set the communications for a specific secondary device, while in other instances the command can modify the status update settings for more than one or all of the connected secondary devices and not just the secondary device that sent the command.

In response to a status trigger or request the primary device 122 communicates relevant status information to one or more secondary devices 124. This status information can be substantially any relevant status information. For example, a response may include an event type or name; a title or title number of content currently being accessed and/or played back; a current playlist identification; a current playlist type; a current chapter number; a current play item number; a duration of the current playlist (e.g., in milliseconds); a current media time in the playing playlist (e.g., in milliseconds); a playback rate (e.g., fast forward, rewind, pause, etc.); a current audio stream number; a current subtitle stream number; an identifier or flag indicating whether subtitles are active; a current user ops bitmask; or other such information or combinations of such information.

Again, the type of information and/or the triggers utilized may depend on the authentication established, the device type of the secondary device, capabilities of the primary device, tiers of service or capabilities of the secondary device, features and/or applications at the secondary device and other such factors. In some instances, there may be tiers or levels of capabilities. These tiers, for example, may be based on a user account or level purchased by a user, the capabilities of the secondary device or other such factors. For example, there may be a basic tier, an ultimate tier and a premium tier that provide progressively greater features and/or functionalities. As such, the status information and/or other information or content supplied by the primary device 122 to the secondary device 124 can depend on a relevant capability tier.

The communication between the primary device 122 and the secondary device, in some embodiments, can be achieved using a protocol known to both the primary device and the secondary device. In some implementations this protocol can be a symmetrical protocol that allows for the passing of messages between two devices. For example, the protocol can provide a peer to peer networking protocol that provides interaction between the primary device 122 and the secondary device 124 over a unidirectional or bidirectional connection. Employing bidirectional communication may allow either the primary device or the secondary device to send information, data, instructions and the like across one or more communications channels, unsolicited by the other end. For example, the secondary device 124 can be sending periodic updates (e.g., updates of accelerometer data) while the primary device 122 can initiate a request that the secondary device assume a different operation mode or display different information and/or content. Further, a peer to peer bidirectional protocol allows the communications to occur over the single communications channel. In some instances, communication and/or command identifiers or headers can be included. For example, communications transmitted between a primary device 122 and a secondary device 124 can include a communication or command identification, which in some instances could be a unique, nonzero identification (e.g., the identifier could simply be a counter incremented every time a communication or command is sent from a device). Further, some communications may further identify that a response is expected. For example, a header can include a reply expected field with a value indicating whether a reply is expected or not. Similarly, the header may additionally specify a size of data included in a data portion of a communication (e.g., a size in bytes of a payload of the communication).

The given protocol establishes the format of communications and/or data sent between the primary device 122 and the secondary device 124. In some embodiments, the protocol provides that communications are in the form of messages. The messages are composed of a message name, zero or more key-value attributes, and an optional block of unstructured data, which can include information, content, titles, timecodes and substantially any other relevant data or combinations of such data. For example, the protocol can provide for command and response messages. A command message contains a message name that identifies the message, and further includes a Command-ID attribute giving a unique identification to the message from the sending device.

Similarly, a response message can be communicated in response to a particular command message, and is identified by a message name, such as a "response" name. Further, the response message carries the same Command-ID, as well as a Status attribute. Command and/or response messages may optionally also carry other additional attributes and/or unstructured data when relevant to communicate their purpose. The protocol, in some embodiments, can further specify that when such unstructured data is present in a message a Content-Length attribute is included in the message that identifies a length of the unstructured data (e.g., a Content-Length attribute that specifies the length of the data in octets).

In some embodiments, the protocol can be some what similar to the http protocol. For example, the message name can be seen as being similar to an http command; one or more attributes may be similar to http headers; and the data may be some what similar to http content. The subject protocol, however, in some embodiments is intended as a peer to peer or persistent, peer to peer protocol. As such, in these embodiments the stream stays open across messages, and either end (e.g., primary and secondary devices) may send messages through the bidirectional stream.

Table 1 below shows an example content of a command message for accelerometer data, and Table 2 below shows an example content of a response message to the accelerometer command message of Table 1.

TABLE 1

Example Command Message

| Field | Data |
|---|---|
| Message Name: | Accelerometer-data |
| Attribute: | Command-ID: 12 |
| | X: 27.5 |
| | Y: 372.666 |
| | Z: 75.002 |

TABLE 2

Example Response Message

| Field | Data |
|---|---|
| Message Name: | Response |
| Attribute: | Command-ID: 12 |
| | Status: x |

As can be seen in the example Table 1, the command message name is specified as "Accelerometer-data," and the attributes includes a Command-ID of "12." in this example, some additional attributes are included relative to the Command-ID. The response message of Table 2 indentifies the communication as a "Response" and further includes the corresponding Command-ID "12" designating that the response message is in response to the example command message of Table 1. Further, the response message of Table 2 identifies a status.

As a specific example, when the command message of Table 1 is communicated over communication channel, that message may be formatted as follows:

accelerometer-data\r\n
Command-Id: 12\r\n
X: 27.5\r\n
Y:372.666\r\n
Z:
75.002\r\n
\r\n In this format, lines are terminated by a two character carriage return CR/LF pair (in this example "\r\n"). The message name is specified on the first line of the message, followed by zero or more attributes as described above. Each attribute can consist of the attribute name, terminated by a colon, optionally followed by some whitespace, and the attribute value. Attribute lines may be folded, where an attribute line that begins with whitespace is a continuation of the preceding attribute value (as in the "Z" attribute in this example). The attributes portion of the message is terminated by a recognized formatting, such as a zero length line (in this example, by the "\r\n\r\n" sequence). As described above, some messages may include data. The inclusion of data, in some embodiments, is identified by the presence of a Content-Length attribute with a value, usually an integral value, that specifies the length of the data (e.g., unstructured data in octets), that follow the attributes. In the above example, no data is included in the message. One or more subsequent messages can follow a message, and in some instances can begin immediately following the attribute-terminating \r\n sequence, or the specified amount of data (e.g., the n octets of data) when present. In some embodiments, the protocol may be simplified by leaving some aspects of the protocol to higher or lower level layers. For example, the protocol may not specify a means of shutting down the communications channel. This may be left to a lower layer, such as the orderly shutdown procedure as specified in TCP/IP; however, other embodiments may include a way or command of shutting down the channel. The protocol, in some embodiments, also may not specify one or more mechanisms for authentication and the like. Such mechanisms may instead be implemented by a higher level command stream running over the protocol. Other embodiments of the protocol, however do include such authentication or verification mechanisms. Further, the protocol may leave some of the naming of commands and additional attributes to higher-level users of the protocol.

The protocol can be implemented through substantially any relevant programming, such as Java, Objective-C (Obj-C) or other such programming. Further, the selected programming may be based on the devices expected to be employed as the primary devices 122 and/or secondary devices 124, for example but not limited to, BD players, iPhones, smart phones, computers, gaming devices and other such devices. Further, some programming and/or devices may allow for some functionality that other programming and/or devices may be unable to utilize. For example, some programming utilized, such as Java, may allow for the servicing of multiple connections at once (e.g., a BD player could be in simultaneous communication with multiple secondary devices (e.g., iPhones) at any given point in time), while other programming may typically expect a single connection. Similarly, some programming may allow a device to listens for and accepts incoming connections, while other programming may be limited, for example, to supporting only outgoing connections (e.g., where a device is typically expected to initiate a connection and may not accept an unsolicited connection).

Some embodiments in providing the communication between primary and secondary devices employ a communications Applications Programming Interface (API) that employs the protocol in implementing the communications. Further, in some implementations, the communications API can be categorized or broken down into multiple pieces or classes. For example, some embodiments break down the communications API in to five basic or main classes: ConnectionManager, Connection, Message, Command, and Response. Additionally, several interfaces and/or protocols can be supported, such as ICommandDelegate and ICommandHandler.

In these embodiments, the ConnectionManager class provides a primary interface for communication to peers. Below is Table 3 providing examples of some of the parameters utilized in association with the ConnectionManager class in providing the peer interface:

TABLE 3

ConnectionManager Class Parameters

| Method | Description |
|---|---|
| ConnectionManager( ) | Construct the connection manager, which will start for incoming connections on an available port. |
| void close( ) | Close the connection manager, stop listening for new connections, and close current connections. |

TABLE 3-continued

| ConnectionManager Class Parameters | |
|---|---|
| Method | Description |
| int getBoundPort( ) | Get the port number on which the connection manager is listening. |
| void sendCommand (Command) | Send the specified command to relevant connections. |
| void registerCommandHander (String commandName, ICommandHandler) | Register a handler for the given message name, such that it will be called on receipt of the message. In some instances, only one command handler may be assigned to any given message name. A command handler registered for the wildcard command name "*" may be called for commands that do not match a more specific name. |
| void unregisterCommandHandler (String commandName) | Unregister command handlers associated with the given message name. |

The Message class allows messages to carry information in messages. Again, in some embodiments the message is formatted according to: the message name, the attributes, and the data. Table 4 below providing examples of some of the parameters utilized in association with the Message (it is noted that the term "header" is used here in place of "attribute"):

TABLE 4

| Message Class Parameters | |
|---|---|
| Method | Description |
| Message( ) | Construct an empty message. |
| Message(String name) | Construct a message with the specified name. |
| Message(Message msg) | Construct a message, copied the name, headers, and data from the specified message. |
| String getName( ) | Get the name from a message. |
| void setName(String name) | Set the name for a message. |
| void clearHeaders( ) | Remove headers from the message. |
| void setHeader(String name, String value) | Set the specified header to the specified value. |
| void setHeader(String name, int value); | Set the specified header to the specified integer value. |
| String getHeader(String name) | Get the value of the header with the specified name, or null if it doesn't exist. |
| String getHeaderAsInteger(String name) | Get the value of the specified header as an Integer, or null if there is no such header. |
| Long getHeaderAsLong(String name) | Get the value of the specified header as a Long, or null if there is no such header. |
| byte[ ] getData( ) | Get the data from the message, or null if there is none. |
| void setData(byte[ ] data) | Set the specified data into the message. |
| void write(OutputStream os) | Flatten the message onto the specified stream, in the same format as sent over the wire. |
| void read(InputStream is) | Read the flattened message from the stream into the message format. |

The Command class derives from Message, and encapsulates additional information inherent to a Command. Table 5 below providing examples of some of the parameters utilized in association with the Command class:

TABLE 5

| Command Class Parameter | |
|---|---|
| Method | Description |
| Command( ) | Construct an empty command. |
| Command(String name) | Construct a command with the specified name. |

TABLE 5-continued

Command Class Parameter

| Method | Description |
| --- | --- |
| Command(Message msg) | Construct a command, copying the name, headers, Command-ID and data from the specified message. |
| void sendResponse(Response) | Send the specified response to this message. |
| void onResponse(Response response) | Called when a response to this message is received. In some implementations, such as a default implementation, if a delegate is assigned for the message, the delegate's responseReceived(Command, Response) method may be called. |
| ICommandDelegate getDelegate( ) | Get the delegate for the command, if one is assigned. |
| void setDelegate(ICommandDelegate delegate) | Set the specified delegate to the message. |
| Long getCommandId( ) | Get the command ID from the command, or null if none. |
| void setCommandId(Long commandId) | Set the specified command ID for the command, or null if none. |

The Response class derives from Message, and encapsulates additional information inherent to a Response. Table 6 below providing examples of some of the parameters utilized in association with the Response class:

TABLE 6

Response Class Parameters

| Method | Description |
| --- | --- |
| Response( ) | Construct an empty response. |
| Response(int status) | Construct a response, setting the status as specified. |
| Response(Message msg) | Construct a response, copying the name, headers, Command-ID and data from the specified message. |
| Long getCommandId( ) | Get the command ID from the response, or null if none. |
| void setCommandId(Long commandId) | Set the specified command ID for the response, or null if none. |
| int getStatus( ) | Get the status code from the response, or zero if none is found. |
| void setStatus(int status) | Set the status code on the response. |

The ICommandDelegate interface specifies an interface that is implemented by a delegate for a command. Table 7 below providing examples of a parameter utilized in association with the ICommandDelegate Interface:

TABLE 7

ICommandDelegate Parameter

| Method | Description |
| --- | --- |
| void responseReceived(Command, Response) | This method is called on the delegate when a response to the command is received. |

The ICommandHandler interface specifies an interface that is implemented by a class registering with the ConnectionManager as a command handler. Table 8 below providing examples of a parameter utilized in association with the ICommandHandler interface:

TABLE 8

ICommandHandler Parameter

| Method | Description |
| --- | --- |
| void commandReceived(Command command) | This method is called by the connection manager when the command is received. Note: if a command expects a response, it is typically the responsibility of the CommandHandler to send the response by calling the sendResponse method of the command. |

The protocol can allow the primary device 122 to broadcast communications, messages and/or commands to the secondary device 124, and in some instances can be bi-directional to allow the secondary device 124 to communicate back with the primary device 122. For example, cooperation may be established between a primary device 122 and a secondary device 124 with the secondary device attempting to identify a broadcast or publication over a communication channel, such as a local network, identifying the primary device as having the capability to establish the connection. As a specific example, the secondary device may search for a broadcast from a primary device with the following multicast Domain Name System (mDNS) information and/or attributes on a local network:

Service type: establishConnection._tcp.local
titleID: Disc ID
title: Title

In some instances, the service name is registered and is unique per-player, and may be human readable or may be converted to be human readable.

Substantially any command and/or communication can be communicated between the primary device 122 and the secondary device 124. Instructions or commands can be communicated, content can be communicated and other relevant information. As a further simple example, the secondary device 124, with the knowledge of a Disc ID provided by the primary device and that identifies a portable storage medium or content being accessed at the primary device, can be used by the secondary device 124 to obtain additional content, applications, data, information and the like. The secondary device 124, for example, may access a remote source that provides a user with additional content, where part of the additional content can be forwarded to the playback device and some of the content can be utilized at the secondary device, such as demonstration content. This demonstration content may allow the user to select one of a plurality of options, such as one of a plurality of demonstrations. The options may, for example, include a graphics demonstration (e.g., batpod demo), a game demonstration (e.g., potter demo), a data demonstration (e.g., text and/or data entry demo), a cursor demonstration, an exit or none option, and/or other such options. Upon a detecting a user selection at the secondary device the secondary device can issue a communication to the primary device regarding the selection, such as a message or command-ID of "selectDemo," and an attribute (e.g., "demo:") that identifies the selected option (e.g., one of "none," "batpod," "potter," "data," "cursor," or other such option). The primary device 122 in response to receiving this selection can activate an appropriate demonstration based on the demonstration identified in the attribute.

Further, the secondary device 124 may allow the user to interact with the demonstration and in response initiate commands, requests, instructions or the like to the primary device 122 as a result of the interaction. For example, if the "batpod" demonstration was selected the secondary device might display a graphical 3-dimensional representation of the Batmobile from the Batman movie that allows the user to alter the orientation of the view of the Batmobile. An application on the secondary device 124 can determine spin, accelerate/decelerate (so that the batpod has some inertia) or other such parameters. Based on the user's inputs to modify the view the secondary device can issue commands or information corresponding to the altered view, such as identifying a picture or video frame the corresponds to the movement, and notifying the primary device to display that corresponding frame or sequence of frames to give the appearance of movement corresponding to the user's inputs (e.g., the application on the secondary device may internally convert a predicted angular velocity into distance and then into a corresponding frame number or series of frame numbers to display at a given time to coordinate the displays on the primary and secondary devices. As a specific example, a displayImage command can be issued with attributes such as: image: (range 0.0<=image<1.0), method: "immediate" or "transition", or other such attributes. In some instances additional information about the orientation or the image being viewed may be provided. For example, details may also be displayed (e.g., by specifying x, y position or pixel coordinates) or the details option may be disabled to hide the details display. As a specific example, a "displayDetail" command may be issued with attributes: detail: (0 ... n−1) (where n is number of detail views), x: (some position to be determined to display detail view), y: (some position to be determined to display detail view); or alternatively a "hideDetail" command may be issued.

Similarly, a game or interactive demonstration may detect instructions to shift the display right, left, up, down or other such direction, and/or may detect locations of entries (e.g., where a user touches on a touch screen of the secondary device 124), such as a "spell" that instructs movement up, down, left right, etc. For example, a "spell" command may be communicated to the primary device with an "incantation" attribute with a value of one of "up," "down," "miscast," "ready" or other such attributes (where "ready" may identify that the secondary device is in a ready position.

A data demonstration example might allow a user to enter data at the secondary device to be displayed at the primary devices, such as a user filling in some fields displayed on the secondary device. The secondary device can provide an identification of the field, and the information entered in the field, which may be forwarded as updates as the user types. For example, the different fields may be "first," "last," "email," "message" and other such fields, and commands and attributes may be provided such as "enterField" command with a "Field" attribute that identifies a field to enter; a "leaveField" command with a "Field" attribute; an "updateField" command with a "Field" attribute and a "text" attribute with the text to be updated to the identified field.

As another example, a cursor demonstration may simply identify where on a display a cursor being displayed by the primary device should be positioned. In some instances, a "moveToPosition" command may be issued with an "x" attribute with an attribute value of a relative horizontal position on a screen (e.g., relative to a left edge of the screen), and a "y" attribute with an attribute value of a relative vertical position on a screen (e.g., relative to a top of the screen). Again, substantially any communications, commands, instructions, data and the like can be communicated over the communication channel in accordance with the protocol.

In still other embodiments, the secondary device can issue commands over the direct connection 224 that are implemented by the primary device 122. For example, the secondary device can display a graphic image of a car that is similarly displayed through an optical disc player primary device, and a user can use the secondary device to alter the orientation of the view of the car at the secondary device 124, and commands can be sent from the secondary device to the primary device 122 such that the primary device implements the received commands to similarly alter the displayed orientation of the displayed car. As such, the user interface of the secondary device can be utilize to interact with the primary device and control the primary device, which might include controlling the primary device in ways that typically the primary device cannot be controlled or may be difficult to implement. As another example, a secondary device 124 may display a timeline that represents playback timing of content on the primary device 122, and that can allow a user to scan or scrub through the content being played back through the primary device (e.g., a "mediaTime" command can be communicated from the secondary device to the primary device, which may contain a new media time, in milliseconds, designating a time in playback to which the primary device 122 should skip to.

Other communications can be forwarded from the secondary device 124 to the primary device 122. For example, commands can be issued from the secondary device 124 to affect playback of the multimedia content 720. Further, when more than one secondary devices 124 (e.g., multiple different users with secondary devices) are cooperated, typically through a single account, token or the like, commands can be issued to each other secondary device that in turn can forward the command to a primary device associated only with that secondary device to establish a group playback where one of the users can control playback of the multimedia content of the other users primary devices, and/or each user can input at least some control over playback. In some embodiments, each user may be logged in to multiple accounts (e.g., a user account specific to that user to cooperate the secondary device with the user's primary device, and additionally to a group account to establish a cooperation with other users' devices). In some instances, one user of the group may be the only user with the ability to control other user's primary devices, while in other implementations more than one user of the group can initiate commands to control playback. Further, because the multiple secondary devices are cooperated users can communicate, in some instances, through the secondary devices (e.g., voice call, through a chat session, etc.).

Other content can be forwarded to the primary device 122 from the secondary device 124, and in some instances the other content can be based on information or content provided by the primary device 122. Further, the functionality available through the secondary device 124 can be utilized where such functionalities may not otherwise be available through the primary device 122 or is cumbersome to utilize. For example, the secondary device 124 may provide audio, video, textual, graphical content to the primary device 122 that is captured or recorded by the secondary device (e.g., the secondary device 124 can be and/or can include a microphone (audio commentary), camera, web camera, video camera and/or other such devices or functionality). Depending on the kind of content forwarded from the secondary device 124 to the primary device 122 (or vise versa) some transcoding or formatting of content may be performed, such as transcoding content to be appropriate for playback on an HD-DVD or Blu-ray player (e.g., audio content would typically need to conform to the audio stream of the HD-DVD or Blu-ray disc, and thus transcoded to the particular codec). This transcoding can be preformed at the secondary device 124 with the knowledge of the type of device the primary device is as provided by the server 130, or performed by the server.

As a further example, the primary device 122 can forward a version number of the firmware 340, software 342 and/or script 348 to the secondary device 124. The secondary device can, utilizing the network browser 456, implement a search based on the received version number to determine whether upgrades are available for the primary device 122. When upgrades are identified the secondary device can forward the upgrades to the primary device 122 and activate an upgrade to the primary device.

The server 130 in some instances forwards communications between devices, and in some implementations further provides navigation control for the primary and/or secondary device. The navigation, in some instances, can set general parameter registers of, for example, the primary device 122. In many instances the content package 620 is registered based media, for example, many DVD, HD-DVD, Blu-ray and other media content is register based. The navigation control employs a register and/or sets registers to implement the control, separate navigation controls and/or advanced navigation metaphors. The cooperation between the primary and secondary devices can further aid in the navigation and navigation control of content available through the primary device 122, the server 130 and/or the secondary device 124. For example, a plurality of users may register their multimedia players (e.g., HD-DVD players) with the server and create a buddy list with these other users allowing the sharing of information between users. Again, the multimedia player, however, may have limited user interfaces. The users can instead utilize their respective secondary devices 124 to employ navigation of content at one or more of the primary devices 122. As a further example, user accounts can be associated in buddy lists, where the association and registration can be implemented in part through the secondary device 124, and navigation entered at a secondary device or a third party user associated with the buddy list is further reflected on the primary devices 122 of those users whose accounts are associated with the buddy list. Similarly, book marking, setting scenes, creating playlists and other such functionality can be implemented through the secondary device 124 that is linked through a user account with the primary device 122.

In achieving the virtual link 134 or cooperation between the primary device 122 and secondary devices 124, the primary and secondary devices in some instances both access and/or log-in to the same user profile or account 554. Upon both accessing the user account the server 130 established the virtual link 134.

Figure 9:
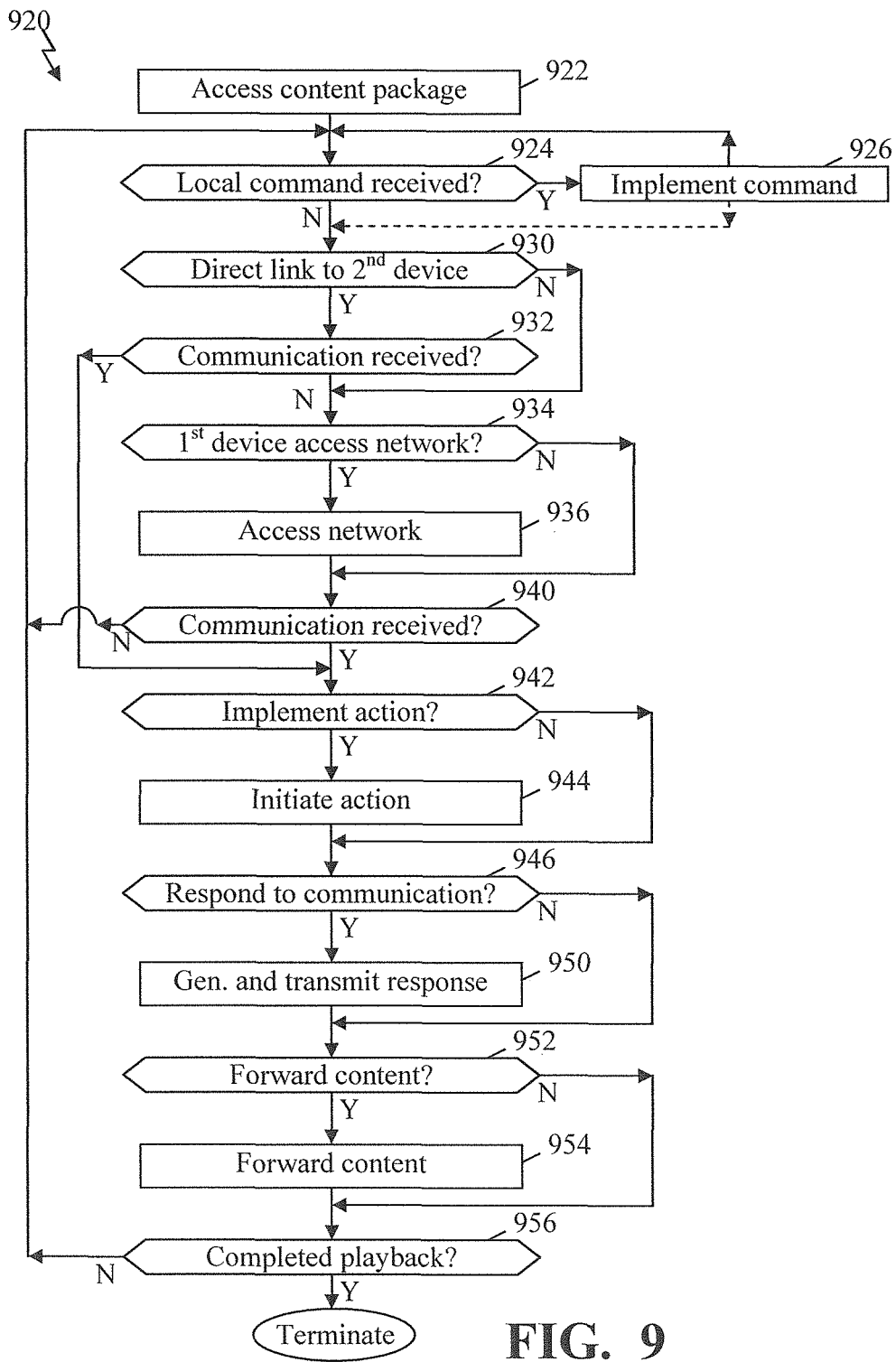
FIG. 9 depicts a simplified flow diagram of a process according to some embodiments in accessing and playing back content at the primary device.

FIG. 9 depicts a simplified flow diagram of a process 920 according to some embodiments in accessing and playing back content, such as multimedia content 720, at the primary device 122. In step 922, the primary device 122 accesses a content package 620 to access multimedia content 622, 720. In some instances, the content package is accessed from a portable storage medium 360 through the media drive 330, received as streaming content from over the distributed network 132, received from a broadcast source, and/or received or accessed through other such methods. Once the content package 620 and the multimedia content 622, 720 is accessed the process 920 advances to step 924 to determine whether a local command is received. The local command may be received by the primary device 122 from a user through, for example, a remote control or other user interface that is directly part of or directly connected (e.g., over a relatively short wireless connection, such as less than 50 feet, typically less than 30 feet and in some instances less than 20 feet) with the playback device, initiated by the local device (e.g., based on script or software instructions) or the like. Examples of local commands can include, but are not limited to, play, stop, fast forward, rewind, pause, skip forward, skip back, and other such commands. In those instances where a local command is detected step 926 is entered and the primary device 122 implements the command, typically through the processor 322. The process 920 then returns to step 924, or in some instances continues to step 930.

Step 930 is entered, in those instances where a local command is not detected (and/or following step 926 in implementing a local command), to determine whether a secondary device 124 is linked or cooperated with the primary device 122 through a direct connection 224. In those instances where a secondary device is linked, the process continues to step 932 to determine whether a communication is received from the secondary device 124. When a communication is received the process 920 skips to step 942.

In those instances where a communication is not received the process continues to step 934 where it is determined whether the primary device 122 is to access the distributed network 132. When network access is to be employed, step 936 is entered and the primary device 122 accesses the network 132 through a communication interface 324 and the network driver 344. Following step 936 and in those instances where it is determined in step 934 that network access is not to be implemented, step 940 is entered where it is determined whether a communication is received from a secondary device 124 over a virtual link 134 (or direct connection 224). When a communication is not received from the secondary device 124 the process 920 returns to step 924.

Alternatively, when a communication is received in step 932 or step 940, the process continues to step 942 where it is determined whether an action is to be implemented by the primary device 122 based on the communication. The action can include implementing a command issued by the secondary device 124, displaying content and other such actions. When action is to be taken step 944 is entered where the appropriate action is initiated. When an action is not to be taken the process continues to step 946 to determine whether to respond to the communication. When a response is to be generated step 950 is entered and an appropriate response is generated and transmitted. Following step 950 and in those instances where it is determined in step 946 that a response is not needed the process 920 continues to step 952 where it is determined whether the primary device 122 is to forward content and/or secondary device supplemental content 640 to the secondary device. Step 954 is entered when content or supplemental content is to be forwarded to the secondary device and the primary device 122 communicates over the virtual link 134 or direct connection 224 the content or supplement content 640 to the secondary device 124. The process then continues to step 956 where it is determined whether the primary device 122 has completed the playback of the multimedia content of the content package 620. In those instances where the playback has not completed, the process 920 returns to step 924 and continues the playback. Alternatively, the process 920 terminates.

The process 920 is a general process implemented by the a multimedia playback device that can be cooperated with a secondary device 124, either over a virtual link 134 or over a direct connection 224 established at least in part through authorization provided by the server 130. In some instances, when it is determined that the primary device 122 is not cooperated with the secondary device the primary device implements the playback of the multimedia content 622 differently than when the secondary device is cooperated with the primary device providing a user with a different experience depending on whether a secondary device 124 is cooperated or linked with the primary device 122. For example, in some embodiments when the secondary device is not linked with the primary device the primary device displays the secondary device supplement content 640, while the secondary device supplemental content is forwarded to the secondary device 124 when linked with the primary device. Alternatively, the secondary device content 640 may not be made available to the user when the secondary device 124 is not linked with the primary device. Further in some instances, the primary device may display one of the plurality of multimedia content (e.g., multimedia content n) of the content package 620 when the secondary device is not linked and does not provide access to the secondary device supplemental content 640; and alternatively does not provide access to the multimedia content n when the secondary device 124 is linked with the primary device 122 and instead forwards the secondary device supplemental content 640 to the secondary device to be displayed and/or played back. As a further example, when the secondary device 124 is linked with the primary device 122, the primary device can display and/or playback additional content from the secondary device 124, the primary device 122 may further reserve a portion of the display 332 to display content received from the secondary device (e.g., by displaying content in a reduced window to maintain the reserved area for the content from the secondary device), and other such differences.

Figure 10:
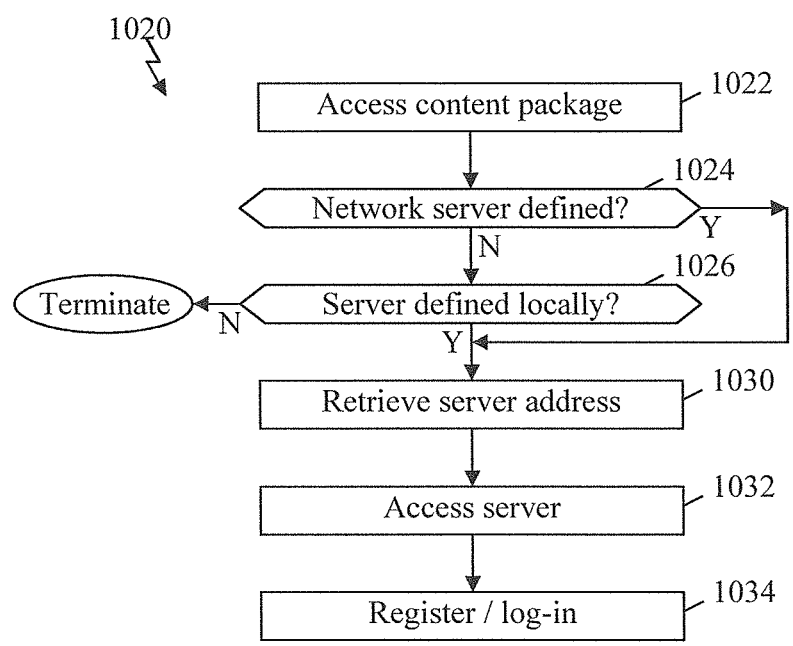
FIG. 10 depicts a simplified flow diagram of a process according to some embodiments to determine whether a first or primary device is to access the network.

FIG. 10 depicts a simplified flow diagram of a process 1020 according to some embodiments to determine whether a first or primary device 122 is to access the network 132. In some instances process 1020 is employed to implement step 934 of the process 920 of FIG. 9. In step 1022 the content package 620 is accessed. In step 1024 it is determined whether an identity and/or address 642 of a network server or source 130 is defined. In those instances where a server 130 is not defined the process continues to step 1026 to determine whether a server 130 is identified and/or the network address 356 of a server is defined locally on the primary device (e.g., in memory 326). When it is determined that a server is not identified the process 1020 terminates, and typically normal playback mode is entered where the primary device 122 provides standard playback of the media content, or in those instances where a direct connection 224 has been established with a secondary device enhanced playback is continued through the cooperation between the cooperated devices.

Alternatively, when a network server or address 642 is defined in the content package 620 or stored locally 356, the process continues to step 1030 where the network server and/or address is retrieved. In step 1032 the network server is accessed over the network 132. In step 1034 the user registers and/or logs in to a user account or profile 554. The log-in can include providing a content package ID 626, an ID of the primary device, a user name, a password, token (issued to another device with which the current device is trying to link) and/or the like, or combinations thereof. In an event that a user account does not exist at the server for the specific user, a registration process can be provided through the server or the server can redirect the user to a third party for registration.

Figure 11:
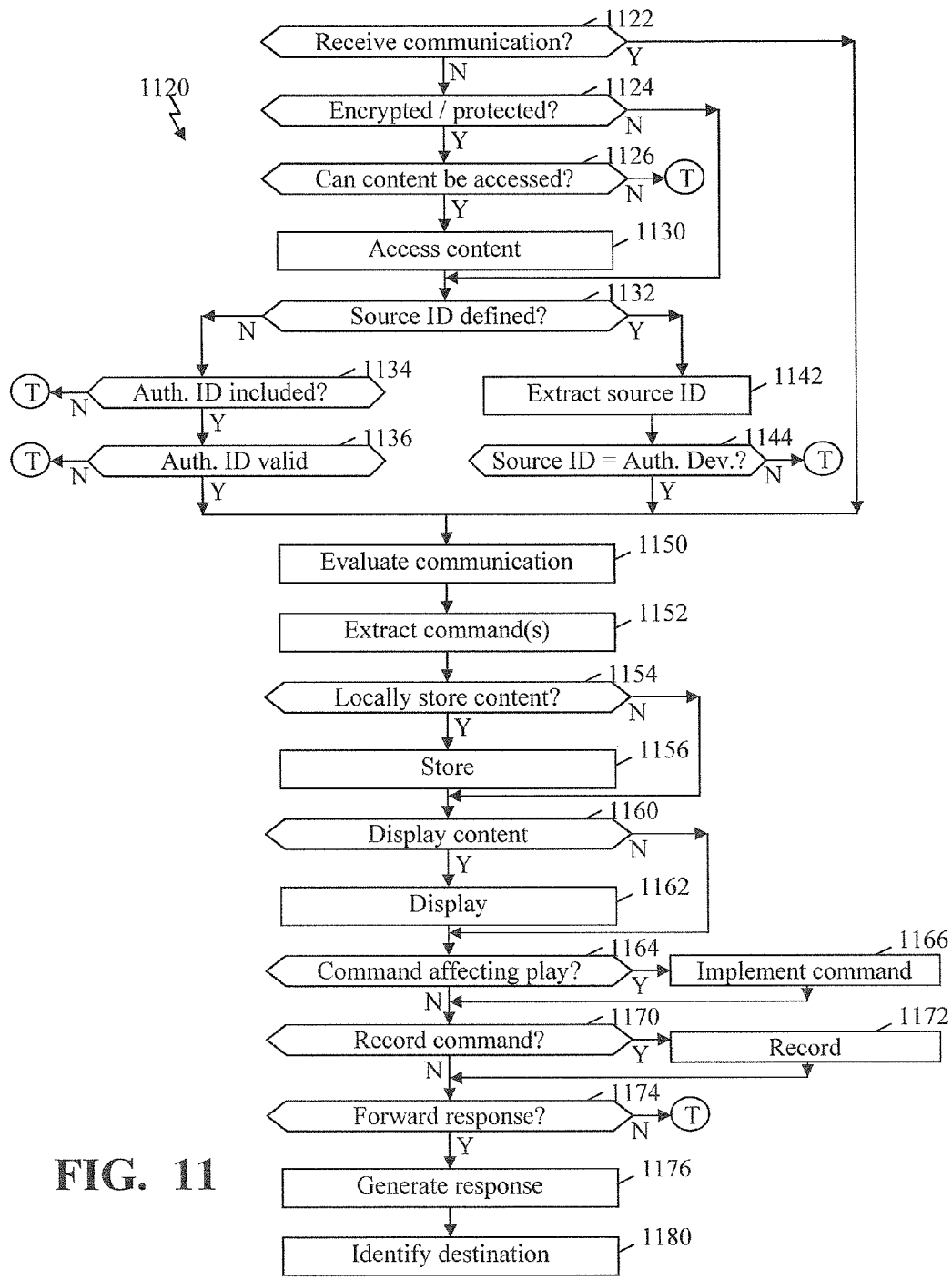
FIG. 11 depicts a simplified flow diagram of a process according to some embodiments that is implemented by the primary device in determining whether one or more actions are to be taken in response to a communication received from a secondary device.

FIG. 11 depicts a simplified flow diagram of a process 1120 according to some embodiments that is implemented by the primary device 122 in determining whether one or more actions are to be taken in response to a communication received from a secondary device 124. In some instances, the process 1120 is employed to implement the step 942 of the process 920 of FIG. 9. In step 1122 it is determined whether a communication is received from the server 130. In those instances where a communication is received from the server the process skips to step 1150. Alternatively, step 1124 is entered to determine whether a received communication contains encrypted and/or otherwise protected content. When content is not protected the process skips to step 1132.

When content is protected step 1126 is entered to determine whether the content can be accessed, for example, through the use of a password, decryption, token, pin or the like. This can include determining whether one or more decryption keys 632 are defined within the content package 620 that relate to the protected content, whether another password, tokens or key is provided by the server or the secondary device and the like. When the protected content cannot be accessed (e.g., decrypted) the process 1120 terminates. Alternatively, the decryption key or password is retrieved in step 1130 and the protected content is accessed.

In step 1132 the communication and/or content is evaluated to determine whether a source ID is defined that identifies the source of the communication. When a source ID is not defined step 1134 is entered to determine whether the communication to the primary device 122 includes an authentication ID. In those instances where there is no authentication ID the process 1120 terminates. Alternatively, the process continues to step 1136 to determine whether the authentication ID is valid. This validation can include comparing the authentication ID with authentications in the content package 620, previous authentication IDs received and the like. Additionally or alternatively, the primary device 122 may initiate a communication with the server 130 requesting verification of the authentication ID. If the authentication ID is not verified the process terminates.

When it is determined in step 1132 that the source ID is defined step 1142 is entered to extract the source ID. In step 1144 a determination is made whether the source ID corresponds with an authorized device. Similar to the authentication ID, the authorized device can be defined in the content package 620, received from the server or verified through communication with the server. In those instances where the source ID does not correspond with an authorized device the process 1120 terminates.

Following steps 1136 and 1144 when the authentication ID or the source ID are verified the process 1120 continues to step 1150 to evaluate the communication and/or content of the communication. In step 1152 one or more commands are extracted from the communication. In step 1154 it is determined whether content is to be locally stored at the primary device 122. In those instances where the content is not to be stored the process skips to step 1160. Alternatively step 1156 is entered and the content is stored.

In step 1160 it is determined whether the content in the communication is to be displayed and/or played back. The content can be substantially any content from the secondary device, and typically is relevant to the multimedia content 622 of the content package, such as additional content, chat or instant messaging content, and/or other relevant content, images, graphics, audio or the like. When the content is not to be displayed the process 1120 skips to step 1164. Alternatively, the content is displayed or played back in step 1162. The content can replace a portion of the multimedia content of the content package 620, displayed over a portion of multimedia content of the content package (e.g., in a sub-window), the size of the multimedia content is reduced to provide room on the display 332 to display the content and/or other such methods. In some instances, the communication and/or content define how the content is to be displayed and/or how the multimedia content is to be altered when displaying the content. Additionally or alternatively, code and/or instructions can be defined with the multimedia content dictating how additional content is to be rendered relative to the multimedia content, which may depend on the type of additional content and/or a source of the additional content.

In step 1164 a determination is made whether a command is present in the communication that affects the playback of the multimedia content 622 of the content package and/or the content from the communication. Command that can affect playback can include, but are not limited to, play, stop, fast forward, rewind, skip, pause and the like. When the communication does not include a command that affects playback the process skips to step 1170. In those instances where the communication does include one or more commands that affect playback step 1166 is entered where the command is implemented. In step 1170 it is determined whether a command or instruction is to be recorded at the primary device 122.

In step 1172 the command or instruction is recorded. In step 1174 it is determined whether a response is to be forwarded to the secondary device 124 and/or the server 130. The process terminates when no response is needed. Alternatively, a response is generated in step 1176 and in step 1180 a destination of the response (e.g., server ID and/or address, secondary device ID, etc.) is identified.

Figure 12:
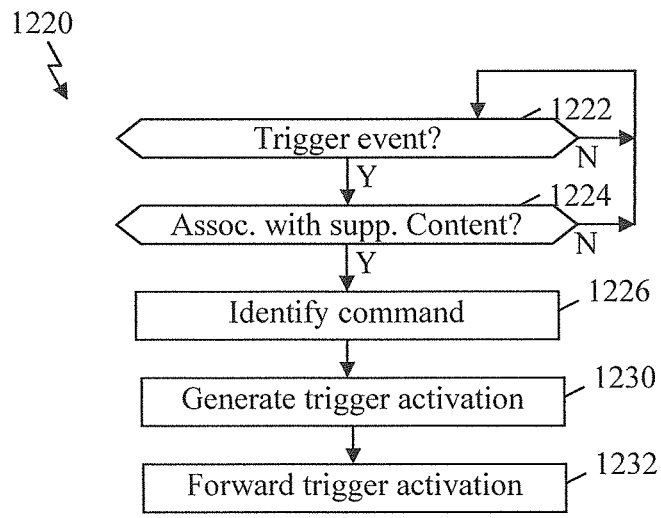
FIG. 12 depicts a simplified flow diagram of a process according to some embodiments for use in synchronizing the playback at the primary device of multimedia content of a content package with content accessible through the secondary device.

FIG. 12 depicts a simplified flow diagram of a process 1220 according to some embodiments for use in synchronizing the playback at the primary device 122 of multimedia content 622 of a content package 620 with content accessible through the secondary device 124. In some embodiments, the content displayed and/or played back at the secondary device 124 is to be synchronized according to the playback of content at the primary device 122. The process 1220 provides the synchronization in some embodiments.

In step 1222 it is determined whether a trigger event occurred at the primary device. The trigger event can include detecting a change in scene boundaries during playback of the multimedia content 622, a change in a chapter of the multimedia content 622, a detection that frame or time code of the multimedia content has been played back or passed, a change of multimedia content (e.g., from multimedia content 1 to multimedia content n), an expiration of a time threshold and/or period, a command entered by the user (e.g., through a remote control in communication with the primary device 122), an implementation or completion of a command received from the secondary device 124 or server 130, or other such triggers events. When no trigger events are detected the process 1220 waits at step 1222 for the detection of a trigger event.

In step 1224 it is determined whether the detected trigger event is associated with the supplemental content received by and/or displayed through the linked secondary device 124. The process returns to step 1222 when the trigger event is not related to the supplemental content at the secondary device 124. Alternatively, step 1226 is entered where a command associated with the trigger event is identified. In some embodiments a look up table is stored at the primary device and/or defined within the content package 620 that associates commands with trigger events. Additionally or alternatively, the trigger event can be forwarded to the server 130 where the server contains a look up table of commands associated with a trigger event. In some instances, the look up table is similarly associated with the multimedia being played back from the content package 620.

In step 1230 a trigger activation is generated that identifies a command for the secondary device 124 to implement and/or forwards content for the secondary device 124 to playback and/or display. The trigger activations can further comprise time codes, commands (e.g., play, stop, skip, fast forward, rewind), instructions to retrieve further content and/or display alternate content, and the like. In step 1232 the trigger activation is communicated from the primary device 122 to the secondary device 124. By issuing trigger activations to the secondary device 124 the content displayed through the secondary device can be synchronized with the playback of content on the primary device 122, and further the secondary device 124 is able to control the content accessed through the secondary device 124 in cooperation and/or synchronization with content played back on the primary device 122. Similar synchronization can be preformed in reverse, where similar processes are performed to synchronize the primary device based on actions, instructions, content accessed at the secondary device and other such factors. In some instances, code is provided within the content package or downloaded to work in conjunction with code defined within the content package to allow the secondary to provide control over the primary device.

In cooperating and synchronizing the two or more devices the content displayed through each device is directly associated with and played back relative to the playback at the other device. The content package 620 at a primary device playing back a movie implements the automated association of the secondary device 124 through the user account based on the knowledge of the specific movie and/or content package currently being played back, the current location of movie progress (e.g., based on time codes and/or other trigger events), and allows for the association and mimicking of content on secondary device 124.

Again the cooperation and linking between the primary and secondary devices 122, 124 is established through the server 130 that identifies that both the primary and secondary devices are to be linked. As described above, the identification that the two devices are to be linked is base, at least in some embodiments, on each device accessing a single user account 554. In some other implementations a user account is not accessed, but instead each device provides the same password, or both devices provide the same authentication. Still other implementations forward an identifier of the secondary device 124 to the primary device 122 and request that the user confirm that the two devices are to be linked, and/or an identifier of the primary device 122 is forwarded to the secondary device 124 with a request that the user at the secondary device confirm that the two devices are to be linked. Typically, however, the server 130 provides the central hub for establishing the cooperation and/or linking between the two (or more) devices.

Figure 13:
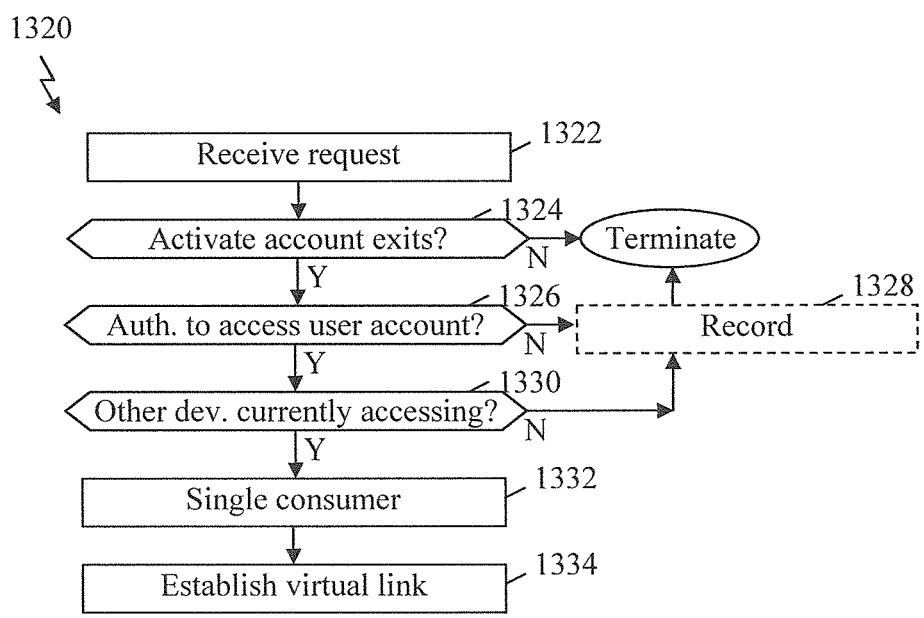
FIG. 13 depicts a simplified flow diagram of a process implemented by the server in establishing the link or cooperation between two or more devices.

FIG. 13 depicts a simplified flow diagram of a process 1320 implemented by the server 130 in establishing the link or cooperation between two or more devices. In step 1322 a request is received from a primary device 122 to access a requested first profile and/or account 554. In some instances the profile or account is associated with a user. In other instances an account may be associated with a content package 620, the primary device, a content owner or distributor and/or other such accounts. Often, the content and/or the functions available to a user is dependent on the account accessed, and the information, content and/or controls that the user can utilize is dependent on the accessed account. In step 1324 it is determined whether an active profile and/or account 554 exists for the requested account. In those instances where an active profile or account does not exist the process 1320 terminates and the user is requested to register.

When an account is active, the process continues to step 1326 to determine whether the primary device is authorized to access the user account 554. This authorization can be based on many factors, such as a primary device ID, a password provided through the primary device, whether a user and/or device is registered and/or other such factors as described above and further below. In those instances where a primary device does not have authorization to access the requested account the process 1320 terminates. Some embodiments additionally include an optional step 1328 of logging or keeping a recording of the attempted access to the requested account. By logging access and/or attempted access information can be tracked about users, devices, accounts and other relevant information for use in optimizing performance of the system 120, 220, maintaining security within the system and other such advantages.

Alternatively, when the primary device has authorization to access the account the process continues to step 1330 to determine whether another device (e.g., a secondary device 124) is currently accessing the same account. Step 1332 is entered in those instances where another device is actively accessing the same account when the user through the primary device is logged-in, and the primary device and the other device actively accessing the account are in some instances defined as a single consumer. Some embodiments optionally notify the users at each device accessing the same account prior to linking the devices, and further some embodiments request authorization to link the devices prior to linking. In step 1334 a virtual link or connection 134 is established through the account 554 between the two or more devices actively accessing the account and the devices are notified of the established cooperation. In those instances where it is determined in step 1330 that another device is not actively accessing the account the process 1320 terminates, and in some instances a log is updated in step 1328 regarding the access to the account. It is further noted that in some embodiments other processes may be activated once a user logs into an account that provides additional, supplemental and/or enhanced content, scripts, features and the like to the primary device 122 without linking the primary device to another device. The process 1320 can be repeated each time a user attempts to access an account through a device and in some embodiments more than two devices can be cooperated and/or linked.

It is noted that an account could be simply a unique user identifier. Other methods of establishing cooperation between the primary and secondary devices can be employed that do not utilize a user account when a secure and mutual association can be established. For example, a server could generate a "code" that could be entered by a consumer to associate two devices together. Additionally or alternatively, a pass code could be defined at one device and the server would establish the connection once the same or a corresponding pass code is provided by the secondary device. Further in some implementations, a temporary user account can be established by the server in response to receiving the matching or accurately related pass codes from each device. Similarly, player ID (e.g., part of BD specifications, and accessible only using AACS online APIs) can be utilized to identify the player, or a player ID could be generated. This player ID could then be transferred from player to server for association with secondary device, for example, via user registration and device registration/exchange.

As described above, by cooperating one or more devices content, commands, instructions and the like can be communicated between devices. As an example, the primary device 122 playing back multimedia content 622 from a content package 620 can once notified of the cooperation can determine whether supplemental content 640 exists within the content package 620 that may be forwarded to the secondary device 124. Similarly, by cooperating the two or more devices the server 130 can forward supplemental content to one or more of the cooperated devices.

Figure 14:
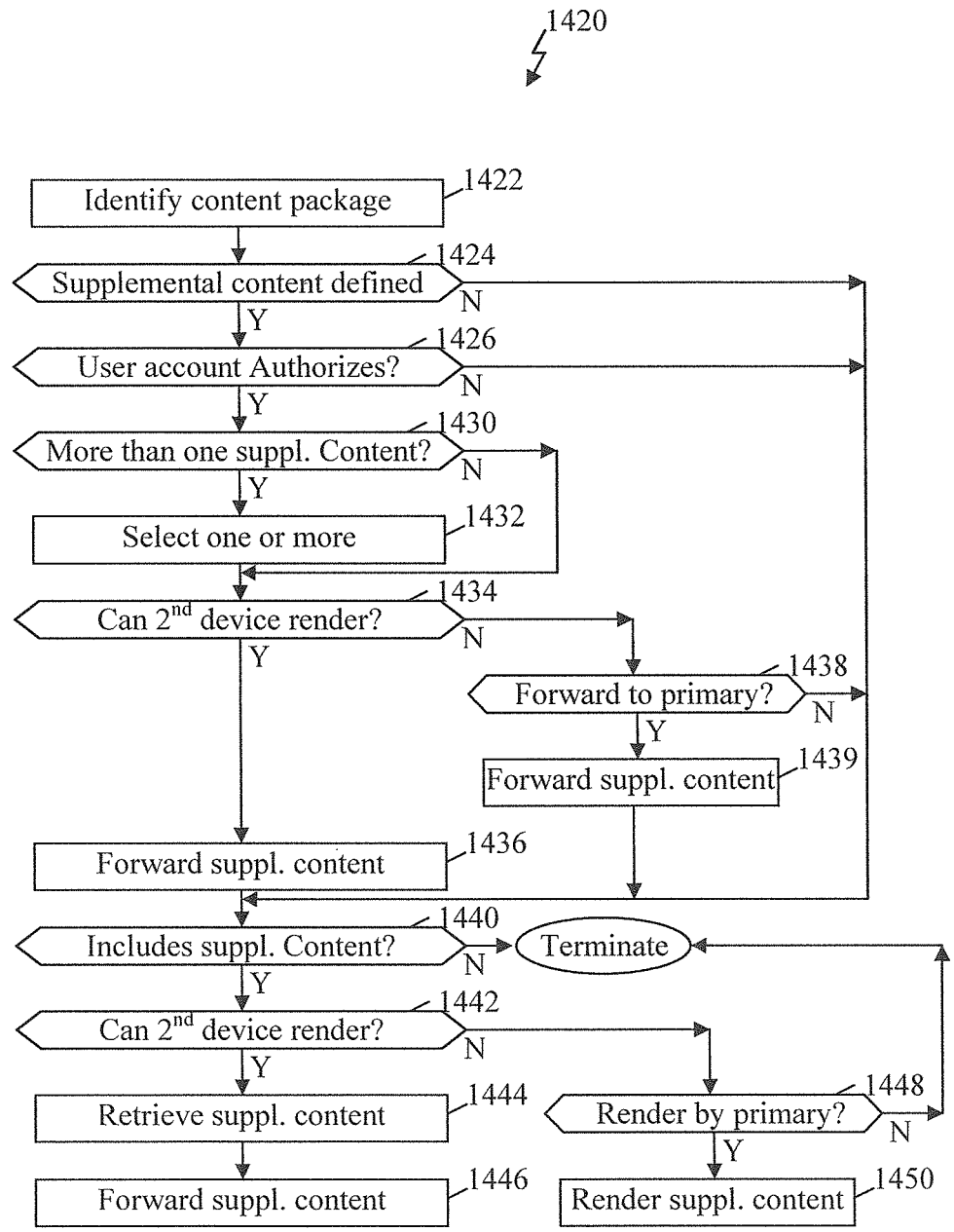
FIG. 14 depicts a simplified flow diagram of a process regarding the forwarding of supplemental content to the secondary device that is linked with a primary device.

FIG. 14 depicts a simplified flow diagram of a process 1420 regarding the forwarding of supplemental content to the secondary device 124 that is linked with a primary device, where the supplemental content is specifically related to the content package 620 being utilized and/or played back through the primary device. As a result, the content accessed through the secondary device 124 is directly affected by the content package 620 accessed through the primary device 122, which can include the playback of multimedia content, menus, user interfaces and the like. In step 1422 the content package 620 and/or multimedia content 622 being accessed through the primary device 122 is identified. This identification is typically based on the content ID 626. In step 1424 it is determined whether supplemental content is defined as being associated with the identified content package 620 and/or multimedia content 622. In those instances where supplemental content is not associated with the content being accessed through the primary device the process skips to step 1440.

Step 1426 is entered when supplemental content is identified where it is determined whether the user account logged into authorizes supplemental content to be forwarded to the secondary device 124. For example, user accounts may have different levels of service (e.g., based on subscription fees or other factors), the supplemental content may require additional payment, whether the supplemental content is appropriate for a user (e.g., based on a user's age defined in the user account, or levels of access defined by a parent, such as G rated content verses PG, PG-13 or other ratings), whether the identified supplemental content was previously forwarded to the secondary device 124 or another device (e.g., some supplemental content may have restrictions on the number of accesses), user account defines a relevance date (where the supplemental content is not forwarded if the supplemental content is no longer relevant or is too old), and other such factors. In those instances where the user account does not authorize the transfer of the supplemental content the process 1420 skips to step 1440.

In step 1430 it is determined whether more than one supplemental content is identified. When only a single supplemental content is identified the process skips to step 1434. Alternatively, step 1432 is entered to identify which of plurality of supplemental content is to be forwarded to the secondary device. The selection of the supplemental content may be based on one or more factors such as, but not limited to, user account, level of service, device type of the secondary device 124, version of firmware 440 of the secondary device 124, identified previously forwarded content and/or supplemental content, date of supplemental content, appropriateness of the supplemental content and other such factors. Some embodiments, the evaluation of whether the user account authorizes whether the content can forwarded may be preformed for each identified supplemental content.

In step 1434 the process determines whether the secondary device 124 can render, playback and/or display the supplemental content. This can be based on the type of device, which may be defined upon logging in to the account (e.g., device ID), user input and/or other such determination. When the secondary device 124 cannot accurately provide access to the supplemental content the process 1420 skips to step 1440 or optionally may continue to step 1438 to determine whether the supplemental content is to be played back by the primary device 122. In those instances where the supplemental content is to be displayed by the primary device step 1439 is entered where the supplemental content is forwarded to the primary device to be displayed. Alternatively, step 1436 is entered where the supplemental content is forwarded to the secondary device 124.

In step 1440 it is determined whether the content package 620 at the primary device 122 contains supplemental content 640 that is to be displayed by the secondary device 124. In those instances where the content package does not include secondary device supplemental content 640, the process 1420 terminates. Alternatively, step 1442 is entered to determine whether the secondary device 124 can render, playback and/or display the supplemental content. In those instances where the secondary device 124 cannot render the supplemental content 640 from the content package 620 the process may terminate or optionally may continue to step 1448. When the secondary device can render or otherwise provide access to the supplemental content 640 step 1444 is entered and the supplemental content 640 is retrieved from the content package 620 at the primary device 122. In step 1446 the supplemental content 640 from the content package 620 is forwarded to the secondary device 124. In optional step 1448 the process determines whether the supplemental content is to be played back by the primary device 122. In those instances where the supplemental content is to be displayed by the primary device step 1450 is entered where the supplemental content is forwarded to the primary device to be displayed. Alternatively, the process terminates.

Figure 15:
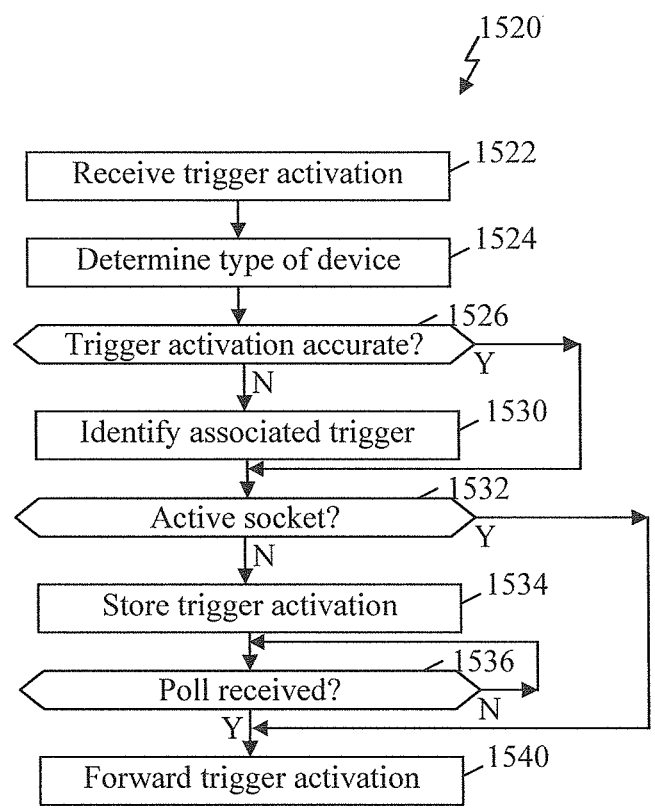
FIG. 15 depicts a simplified flow diagram of a process that is employed in some embodiments in cooperating and/or synchronizing the playback of content at the primary device with the access and/or playback of different or supplemental content at the secondary device.

FIG. 15 depicts a simplified flow diagram of a process 1520 that is employed in some embodiments in cooperating and/or synchronizing the playback of content at the primary device 122 with the access and/or playback of different or supplemental content at the secondary device 124. In step 1522 the server 130 receives a trigger activation, typically from the primary device 122, however, the trigger event in some instances may be received from the secondary device 124. In step 1524 a type of device of the secondary device is determined. This can include determining versions of firmware 440, software 442, scripts 448 and the like that may have an affect on rendering or otherwise utilizing commands received.

In step 1526 it is determined whether the trigger activation is accurate for the device type of the secondary device 124 and/or that the secondary device can accurately utilize the trigger activation. In those instances where the trigger activation is accurate the process skips to step 1532. Alternatively, step 1530 is entered to identify an associated trigger activation specific for the device type of the secondary device 124 and that corresponds to the trigger activation from the primary device 122. In step 1532 it is determined whether an active socket is open with the intended receiving device. In those instances where an active socket is not established step 1534 is entered where the trigger activation or associated trigger activation is stored. Some devices are capable of maintaining an active socket providing substantially an open avenue of communication while other devices rely on polling and/or requests for communications. For example, Blu-ray players often support sockets while HD-DVD players rely on polling. Step 1536 is then entered to determine whether the device intended to receive the trigger activation polls the server or otherwise issues a request to the server to determine whether the server has communications for the device. The process 1520 waits at step 1536 until polling is received. When polling is received or when it is determined in step 1532 that an active socket is maintained the process continues to step 1540 where the trigger activation, or associated trigger activation when appropriate, is forwarded to the secondary device 124. The process 1520 is generally described as forwarding an appropriate trigger to the secondary device. As described above, however, a similar process can be implemented in the reverse direction to identify and forward appropriate triggers to the primary device 122 in response to commands or requests from the secondary device 124.

Figure 16:
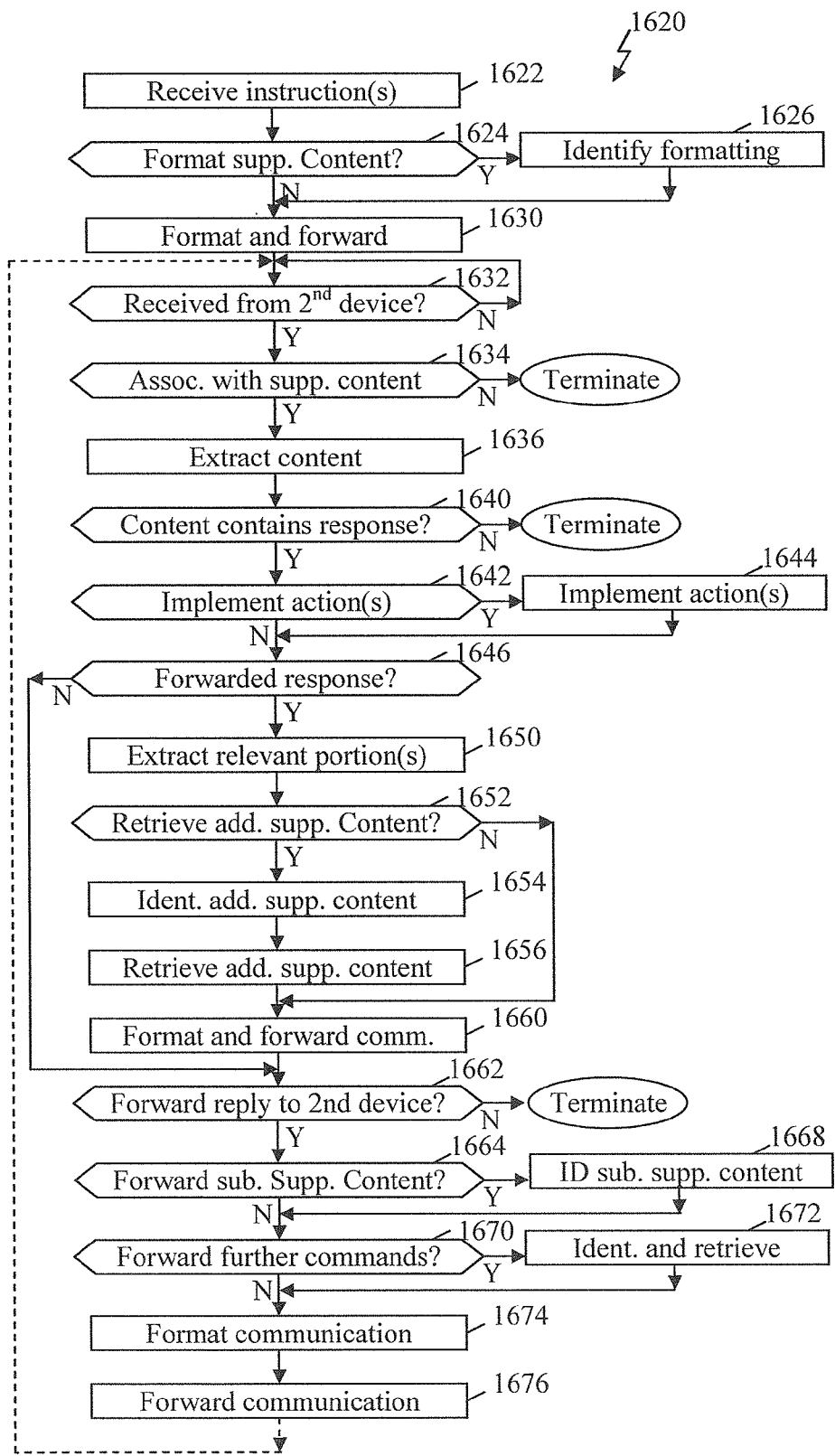
FIG. 16 depicts a simplified flow diagram of a process to interact with a secondary device in forwarding content and/or supplemental content to the secondary device through the server.

FIG. 16 depicts a simplified flow diagram of a process 1620 to interact with a secondary device 124 in forwarding content and/or supplemental content to the secondary device 124 through the server 130. In some embodiments, the process 1620 can be implemented as at least part of one or more of step 1436, 1446 and 1532 in forwarding content to the secondary device 124. Further, the process 1620 is implemented in some implementations when the supplemental content comprises a user interface 654, menus 652, or content with options, selections and/or fields through which a user can interact with the content. In step 1622 an instruction is received through the primary device 122 as issued through the implementation of one or more control scripts 628 and/or a script or functionality 646 of the content package 620 to forward user interactive content to the secondary device 124. In some instances, the instruction further identifies supplemental content associated with the multimedia content 622 of a content package 620 that includes a text entry field, a user interface or other user interaction functionality. In other instances, the instruction directs the server to identify supplemental content with user interaction functionality based on the content package ID 626, the multimedia content 622 being accessed, time codes, trigger activations and/or other such directions.

In step 1624 it is determined whether the supplemental content is to be formatted for use at the secondary device 124. The formatting can be based on a display size and/or resolution of the secondary device, an encoding scheme that is usable or unusable by the secondary device and other such formatting. For example, the supplemental content may be formatted for a full computer screen while the secondary device 124 may be a wireless phone with a small screen size and low resolution as compared with a computer screen. When no formatting is to be performed the process skips to step 1630.

In step 1626 an appropriate formatting is identified and the supplemental content is formatted in accordance with the identified formatting. The formatting is based the device type of the secondary device 124, the capabilities of the secondary device (e.g., display and/or audio capabilities), version of firmware 440 of the secondary device 124, and other such factors. These factors are determined based on information provided during registration and/or logging in. For example, when a secondary device initially accesses and logs into a user account the server may detect that the secondary device is not registered or associated with the user account and may query the secondary device and/or user for information about the secondary device. In step 1630, the formatted supplemental content is forwarded to secondary device 124. As a result, the content package 620 can, at least in part, control the content displayed through the secondary device 124, and that the content and/or user interfaces provided to the user through the secondary device 124 is dependent on the multimedia content 622 and/or state of access to the content package 620.

In step 1632 a determination is made whether a communication is received from the secondary device 124. When a communication is not received the process waits at step 1632, or optionally may terminate the process or returns to step 1622. When a communication is received, step 1634 is entered to determine whether the communication is associated with the supplemental content forwarded to the secondary device 124. The process 1620 terminates when the communication is not associated with the supplemental content and the server takes other appropriate action. In those instances where the communication is associated with the supplemental content, content is extracted from the communication in step 1636.

In step 1640 it is determined whether the extracted content contains a response, reply, selection or the like directly specified within the supplemental content forwarded to the secondary device 124. Again, the supplemental content can provide an interface, options for selection and/or fields for entering textual string data. As such, the extracted content can include a response to a poll or inquiry, a response typed in a text entry field, a reply to a question, selection of yes or no, selection of one of a plurality of options, selection of further supplemental content, chat room text entry, and other such responses, replies and/or selections. When it is determined in step 1640 that the extracted content does not include a response, reply or selection the process 1620 terminates. Alternatively, step 1642 is entered to determine whether one or more actions are to be implemented locally at server 130 based on the response, reply or selection (e.g., such as accessing additional or alternative supplemental content, verifying authentication or authorization, and other such actions). When an action is not to be implemented locally the process 1620 skips to step 1646.

In step 1644 the server implements the one or more appropriate actions. In step 1646 it is determined whether the response, reply, selection and/or the extracted content of the response is to be forwarded to the primary device 122. When the response or extracted content is not to be forwarded to the primary device 122 the process 1620 advances to step 1662. Alternatively in step 1650, a relevant portion from response, reply or selection is extracted when less than the full response, reply or selection is to be forwarded to the primary device 122. In step 1652 a determination is made whether to retrieve additional supplemental content to be played back as the primary device 122 based on the response, reply and/or selection. When additional supplemental content is to be forwarded step 1654 is entered to identify the additional supplemental content for the primary device 122, and the additional supplemental content is retrieved in step 1656.

Step 1660 is entered following step 1656 and following step 1652 in those instances where additional supplemental content is not to be forwarded to the primary device 122, and a communication is formatted for the primary device and forwarded. In step 1662 it is determined whether a reply is to be forwarded to secondary device 124. The process terminates in those instances where a reply is not to be communicated. Alternatively, step 1664 is entered to determine whether subsequent supplemental content based on response, reply or selection is to be forwarded to the secondary device 124. When subsequent supplemental content is not to be forwarded the process advances to step 1670.

In step 1668 the subsequent supplemental content is identified based on response, reply or selection. In step 1670 it is determined whether further commands are to be forwarded to secondary device 124 in addition to or in alternative to the subsequent supplemental content. The process skips to step 1674 when further commands are not to be directed to the secondary device 124. Alternatively, step 1672 is entered to identify and retrieve relevant command(s). In step 1674 a communication is formatted incorporating the subsequent supplemental content and/or command(s). In step 1676 the communication is forwarded to the secondary device 124. The process 1620, in some embodiments, returns to step 1632 to determine whether one or more further communications are received from the secondary device 124.

The process 1620 provide a method of forwarding content to the secondary device 124, according to some embodiments, and further allows interaction with the secondary device 124 and/or the user through the secondary device. Content and/or user interfaces displayed at the secondary device 124 is dependent on and/or can be dictated, at least in part, by the content package 620 being accessed by the primary device 120. The content package 620, and in some instances, the portion of the multimedia content 622 being accessed, affects what occurs at the secondary device 124 and can affect the control set that a user has access to at the secondary device. Further, responses can be received from the secondary device 124 to affect the playback at the primary device 122, to provide additional supplemental content to the primary device, and/or to provide subsequent supplemental content to the secondary device 124. As an example, a poll or question can be posed to the user through the secondary device 124, and based on the response received further actions can be performed at the server, commands can be issued or forwarded to the primary device 122 and/or content can be forwarded to one or both of the primary and secondary devices.

As an example, a registration form to register with the server can be displayed through the primary device 122, such as a TV and/or set-top-box. Due to the limited functionality of a TV and a remote control (limited number of buttons and control buttons), the secondary device 124 when cooperated can be utilized by the user to fill in the appropriate entry fields of the registration form. In synchronization with the primary device 122 the secondary device similarly displays the registration form or a portion of the registration form. For example, when the secondary device 124 has a limited display the full registration form is not shown, but instead a small portion or just a single entry field of the form is displayed, which can be implemented through, for example, formatting as described above. Upon typing or otherwise entering data into an entry field, the data (e.g., text) is forwarded to the server 130 to cache or record the entry and, in some instances can further be forwarded to the primary device 122 to be displayed incorporated into the displayed registration form. In some implementations, the entered text or data is not forwarded from the secondary device until a user enters data and/or hits an enter key or option. As such, the text is displayed on the primary device is substantially real time, where some minor delays may occur due to routing over the network and/or processing. Following the entry of data as the secondary device the server forwards a subsequent entry field of the registration form when such formatting is implemented. As such, a user does not have to perform navigation on or through the primary device. In some instances, however, the subsequent entry field may be specifically dictated by a field selected by the user at the primary device 122.

As described above, the linking and/or cooperation between the primary and secondary devices 122, 124 can provide functionality that is not necessarily available through the primary device 122, or that is not easily implemented at the primary device. For example, textual content may be difficult to enter through the primary device (e.g., TV or set-top-box) while the secondary device 124 may have a keyboard (e.g., computer) or keypad that is more appropriate for entering textual content (e.g., wireless phone). Similarly, in some instances a primary device may on its own be unable to implement upgrades to firmware or software. The secondary device, however, can in some instance be utilized to identify whether an upgrade is available and to forward the upgrade to the primary device with instructions to implement the upgrade.

Figure 17:
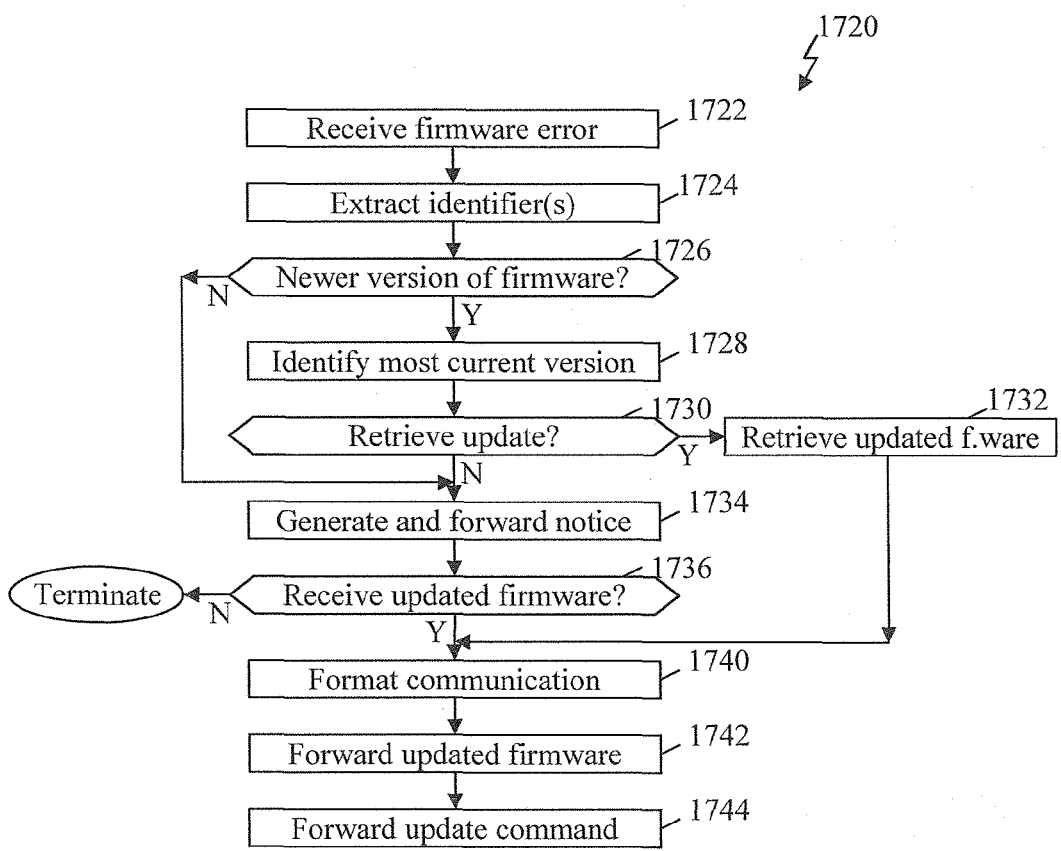
FIG. 17 depicts a simplified flow diagram of a process according to some embodiments to implement an upgrade to a primary device that, typically, is not capable of implementing an upgrade.

FIG. 17 depicts a simplified flow diagram of a process 1720 according to some embodiments to implement an upgrade to a primary device 122 that, typically, is not capable of implementing an upgrade, for example, because in part the primary device 122 is unable to determine a current version, such as a current version of firmware. The description of the process 1720 is presented below with respect to upgrading firmware of the primary device 122. It will be apparent that other upgrades can similarly be implemented. In step 1722 the server 130 receives a firmware error from the primary device 122 indicating that the primary device is incapable of playing back one or more multimedia content 622 of a content package 620, and/or the primary device 122 is incapable of providing some of the options available through the content package 620. In step 1724 one or more error identifiers are extracted. In step 1726 the server attempts to determine whether one or more newer versions of firmware for the primary device 122 are available. The version of firmware may be provided by the primary device 122 upon logging-in on to the server 130 and/or into the user account 554, be provided by the primary device 122 in response to a request from the server or other such methods. In attempting to identify newer versions of firmware the server, in some instances, can issue a request to the user through the secondary device 124 to implement a search for a latest version of firmware for the primary device 122. Additionally, or alternatively, the server can perform a search of a local database based on a device ID, instruct the secondary device 124 to implement a search of third party servers and/or databases over the distributed network 132, and/or request a third party search server to perform a search. In those instances where the server does not identify further upgrades for the primary device 122 the process skips to step 1734.

Alternatively, when one or more newer versions of the firmware 340 are identified step 1728 is entered to identify a most current or newest version of the updated firmware that can be implemented into the primary device 122 and that address one or more of the identified errors. In step 1730 it is determined whether the server 130 can retrieve the updated firmware. This determination can be based in part on whether other sources can be accessed, whether payment is needed, whether user authorization is needed, and other such conditions. When the updated firmware can be retrieved step 1732 is entered and the server 130 retrieves the updated firmware.

Step 1734 is entered in those instances where the server 130 cannot retrieve the updated firmware and a notification is generated and forwarded to the secondary device 124 of the error conditions and the version of the updated firmware that can address one or more of the error conditions. In step 1736 it is determine whether updated firmware is received from the secondary device 124. In those instances where the updated firmware is not received the process 1720 terminates, and in some instances the user is notified through the first and/or secondary devices 122, 124 that the updated is not available.

Following step 1732 where the updated firmware is retrieved and following 1736 when the updated firmware is received from the secondary device 124, the process 1720 continues to step 1740 where a communication is formatted incorporating the updated firmware. In step 1742 the updated firmware is forwarded in the communication to the primary device 122. In step 1744 a command is forwarded to the primary device 122 to implement an update to implement the updated firmware, which in some instances may include receiving user authorization through the primary or secondary device 122, 124.

Figure 18:
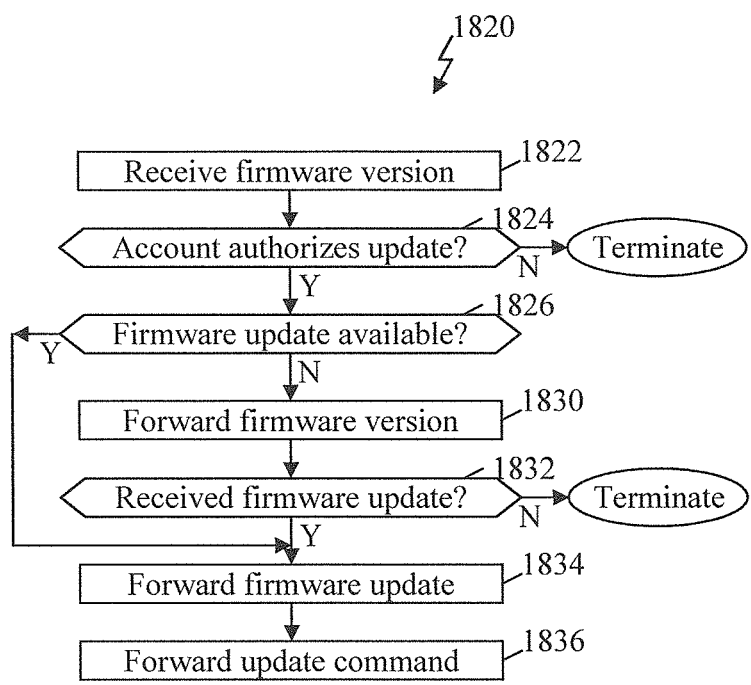
FIG. 18 depicts a simplified flow diagram of an additional process for use in implementing a firmware update of the primary device.

FIG. 18 depicts a simplified flow diagram of an additional process 1820 for use in implementing a firmware update of the primary device 122. In step 1822 a firmware version of the primary device 122 is received at the server 130. In step 1824 it is determined whether an accessed user account authorizes firmware updates. In those instances where the user account does not authorize firmware updates the process terminates. Alternatively, step 1826 is entered to determine whether a firmware update is available through the server 130 for the primary device 122. When the update is available the process 1820 skips to step 1834. Otherwise the process continues to step 1830 to notify the secondary device 124 of the firmware version of the primary device 122.

In step 1832 it is determined whether a firmware update is received from the secondary device 124. When a firmware update is not received the process terminates. Step 1834 is entered when a firmware update is received from secondary device 124 and/or is accessible by the server 130, and the firmware update is forwarded to the primary device 122. In step 1836, a command is forwarded to the primary device to implement a firmware update.

Figure 19:
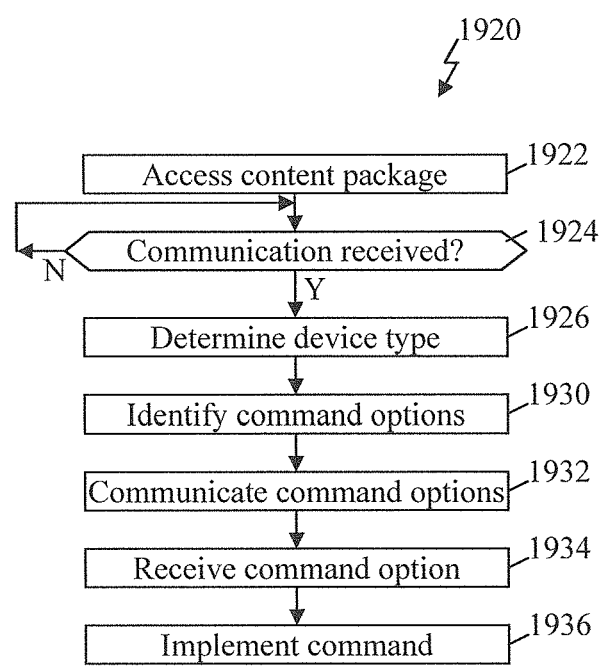
FIG. 19 depicts a simplified flow diagram of a process for cooperating two devices in association with access to and playback of content from a content package.

FIG. 19 depicts a simplified flow diagram of a process 1920 for cooperating two devices in association with access to and playback of content from a content package 620. In step 1922, a content package is locally accessed by a primary device 122. The content package, as described above, includes media content to be locally played back through the primary device 122. In step 1924, it is determined whether a communication is received from a secondary device 124 that has established a virtual link 134 or direct connection 224 with the primary device 122 as described above. When a communication is not received the process returns to step 1924 to await a communication or optionally terminates. In some instances, the process 1920 can be activated at step 1924 upon receiving communications.

In step 1926, a device type of the remote secondary device is determined. In step 1930 the content package is searched to identify command options defined within the content package that are configured to be implemented through the device type of the remote secondary device and that dictate control of local playback of at least a portion of the media content. In some instances, the identifying command options includes identifying one or more subsets of one or more command options that are configured to be implemented through the secondary device 124 and are command options that are generally not available through the primary device 122 and/or not available through, for example, a remote control that is in direct communication with the primary device 122. An one example, a first subset of command options may be identified that are configured to be implemented through the remote control, while a second set of command options can be identified that cannot be implemented through the remote control.

In step 1932, one or more of the command options are communicated over the virtual link 134 or direct connection 224 to the secondary device 124 (e.g., communicating the second set of command options that cannot be implemented through the remote control). In step 1934, a selection of one of the command options is received from the remote secondary device. In step 1936 the selected one of the commands is identified and implemented to control the playback of the at least the portion of the media content in accordance with the received selected one of the command options.

Figure 20:
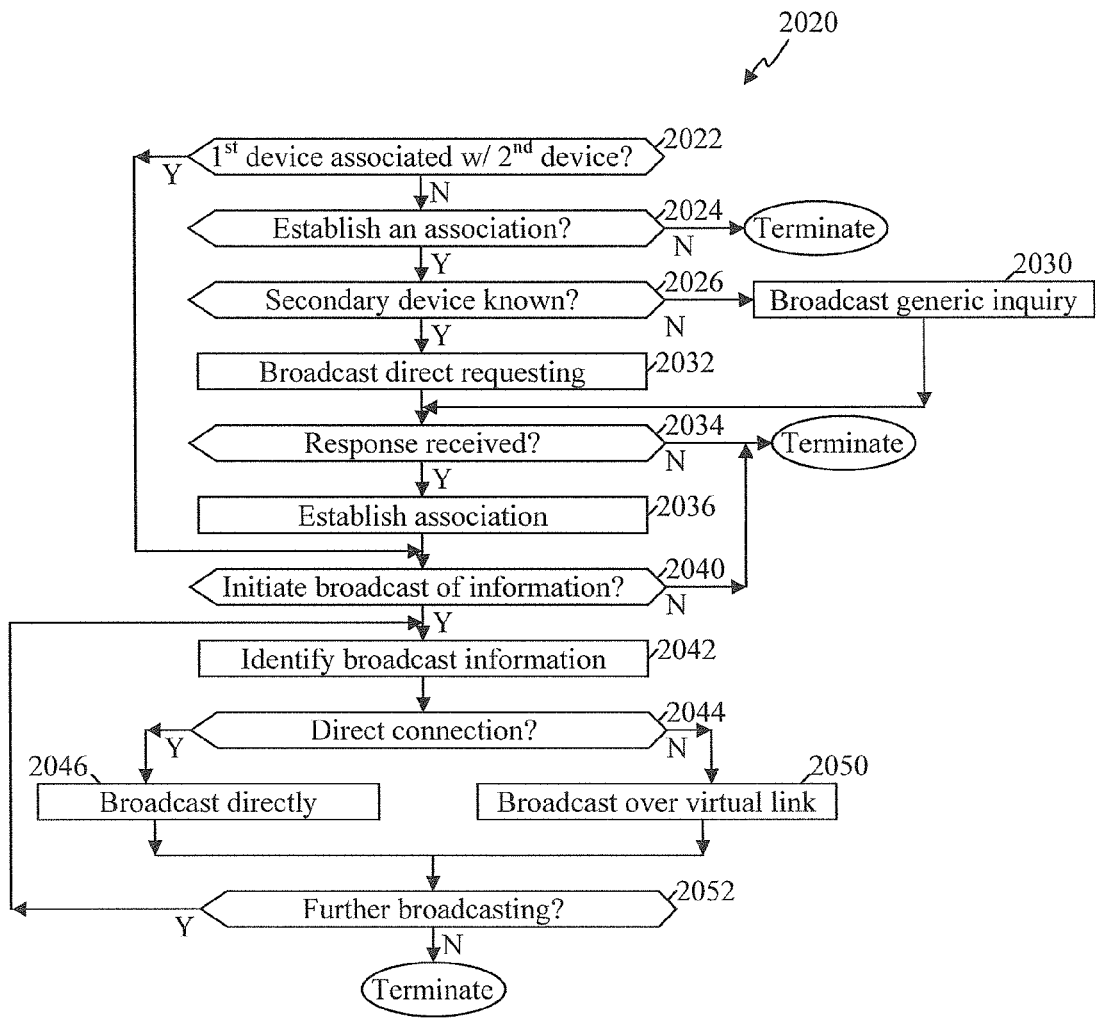
FIG. 20 depicts a simplified flow diagram of a process implemented by a primary device accessing a content package in broadcasting information to a secondary device.

FIG. 20 depicts a simplified flow diagram of a process 2020, implemented by a primary device 122 accessing a content package, to broadcast information to a secondary device 124. In step 2022, it is determined whether the primary device is associated with a secondary device. Again as described above, the association, connection and/or socket can be established with the secondary device allowing the primary device to communicate with the secondary device. In those instances where an association with a secondary device has not been established the process terminates, or optional step 2024 is entered where it is determined whether an attempt to establish an association should be implemented.

In those instances where an attempt should be implemented to establish an association or cooperation with a secondary device, step 2026 is entered to determine whether a secondary device is known to be available (e.g., connection established, authenticated and/or within range) or whether a general request is to be broadcasted searching for a secondary device. When a general broadcast is to be issued and/or in some instances when a secondary device is not known, step 2030 is entered where a generic inquiry is broadcasted attempting to establish an association with a secondary device. For example, the primary device 122 upon start-up or initial access to a portable storage medium may issue an announcement or broadcast that there is a service with which one or more secondary devices can connect. Similarly, the primary device 122 in some implementations can employ a multicast DNS announcement. Alternatively, when a secondary device is known step 2032 is entered where a broadcast is directed at the known secondary device requesting an association, such that the association can be established, in some instances without intervention by a remote source. As described above, secondary devices 122 can connect with a socket established by the primary device 122. In some embodiments, a secondary device can generate and send out a ping or ping command to determine whether a primary device 122 is available and with which the secondary device can connect. As such, the primary device 122 can respond to that ping in establishing a connection with that secondary device.

In step 2034 it is determined whether a response to the broadcast is received. Again, in many instances, the secondary device 124 has to be authenticated. As such, the broadcasts may be limited to one or more secondary devices 124 that have been authenticated. Similarly, some broadcasts may be limited due to the class or level of authentication and/or the functionality capabilities at the secondary device. When a response is not received and/or an authentication fails the process terminates, and in some instances prevents the establishment of the direct link in response to failing to authenticate the secondary device 124. Alternatively, when a response is received step 2036 is entered and an association is established.

Step 2040 is entered when an association has been established to determine whether a broadcast of information is to be initiated. This determination can be based on one or more triggers or identifiers in the content package, the presence of a broadcast application to be implemented by the primary device 122, whether a secondary device 124 is capable of utilizing broadcast information, whether the primary device is authorized to broadcast the identified information, or other such factors or combinations of factors. The process terminates when broadcasting is not to be initiated or cannot be initiated. In some implementations, the process does not terminate but instead identifies that one or more of the secondary devices do not have sufficient levels of access and/or do not have the functionality relative to a current broadcast and as such the process continues but restricts the subsequent broadcast to those secondary device with sufficient levels of access and/or functionality. Similarly, a broadcast may only be intended for a specific secondary device (or limited number of secondary devices) when multiple secondary devices are cooperated with a primary device (e.g., in a gaming situation a communication, such as a hint or a score, or based on timing (e.g., timing when a secondary device established a connection and/or issued a command or response) may only be directed to a first user and not to a second user), and as such the broadcast may be limited to that one or more specific secondary devices.

When broadcasting is to be employed, the process continues to step 2042 where broadcast information is collected. Again, the information may simply be a content identification, an application identification, a location in playback, a time code or other similar information, or the information may include combinations of information, applications, content and the like. In step 2044, it is determined whether a direct connection 224 is established with a secondary device. In those instances where a direct connection is established step 2046 is entered where the broadcast application is initiated and the broadcast information is broadcasted directly to the secondary device over the direct connection 224. When a direct connection is not available, step 2050 is entered where the broadcast application is initiated and the broadcast information is transmitted or broadcasted over the virtual link 134. In some instances, the broadcasting may include applying protection to the broadcast information (e.g., applying encryption), addressing may be applied (e.g., when multiple secondary devices 124 may detect the broadcast) and the like. The broadcast can be over wired or wireless communication. For example, the broadcast can be made wirelessly using radio frequency (RF), infrared (IR), cellular, Bluetooth, Wi-Fi, satellite or other relevant wireless communication. In some instances, the broadcast can use a combination of wired and wireless, such as communicating via a wired or optical fiber line to a transmitter on a LAN that in turn wirelessly transmits the information.

In step 2052, it is determined whether further broadcasting is to be implemented. This may be determined based on an indexing defined in the content package, knowledge that the broadcasting is to be implemented periodically or that further triggers are or may be defined (e.g., triggers later in the content package), or other such evaluations. When further broadcasting is to be preformed the process 2020 returns to step 2042 to identify a subsequent broadcast content. Alternatively, when no further broadcasting is to be implemented the process terminates. In some embodiments, some or all of the steps of the process 2020 can be repeated when the primary device 122 is associated with multiple secondary devices 124.

Figure 21:
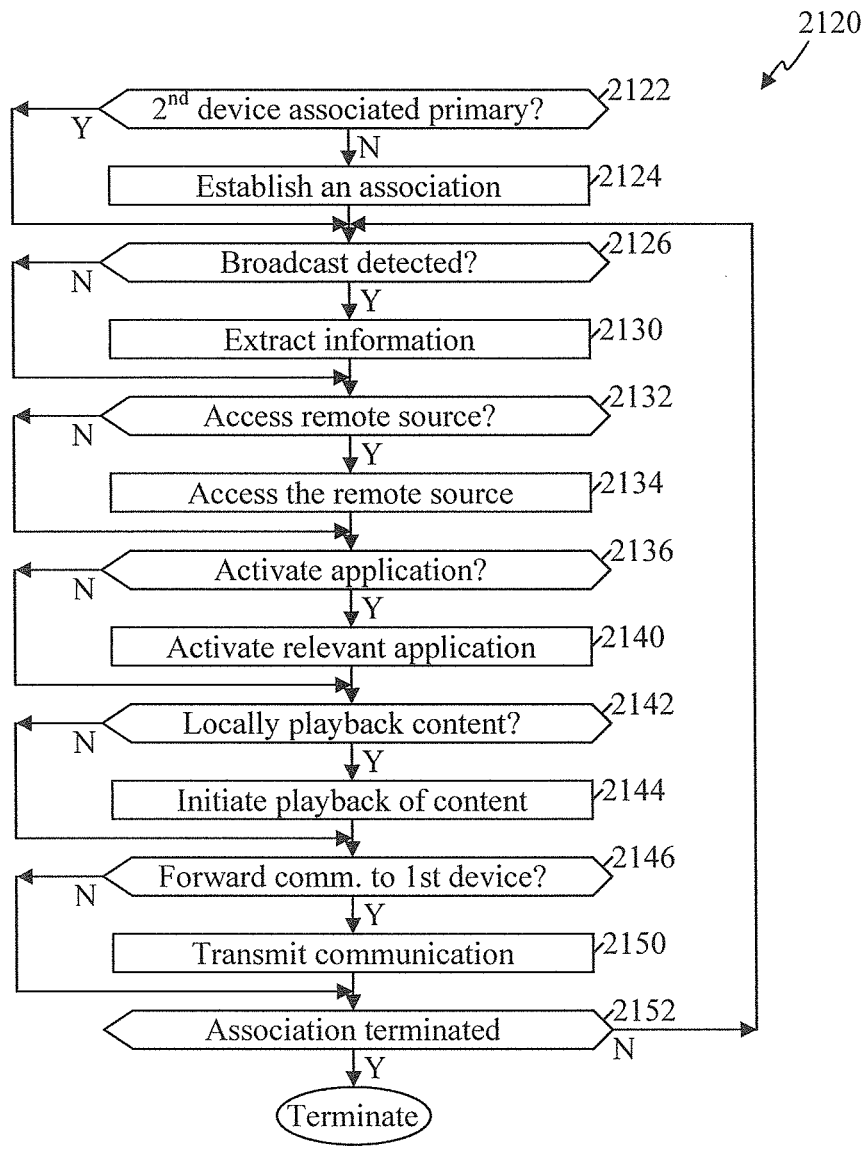
FIG. 21 depicts a simplified flow diagram of a process implemented by a secondary device to enhance a playback experience of a content package being accessed by a primary device.

FIG. 21 depicts a simplified flow diagram of a process 2120 implemented by a secondary device 124 to enhance a playback experience of a content package being accessed by a primary device 122. In step 2122 it is determined whether the secondary device 124 is associated with a primary device 122. This association can be established with a direct connection 224 or a virtual link 134 as described above. In those instances where the secondary device is associated with the primary device the process 2120 advances to step 2126.

When it is determined that an association is not established the process continues to 2124 to establish an association with the primary device 122. In some instances, the secondary device 124 transmits a request directly to the primary device 122, for example, over wireless communication, such as Wi-Fi, Bluetooth or other such wireless communication. The communication can employ a protocol recognized by the primary device with a request to establish a connection. In other instances, the secondary device 124 accesses a remote server 130 or other remote source and logs into a user account. In yet other instances, the secondary source 124 can wait and/or search for a request from the primary device 122 requesting that an association be established. Again, this request can be sent, for example, over a local area network, the Internet, over a wireless communication, or the like, and can be addressed to the secondary device 124 or can include a code or other designation recognizable to the secondary device.

As described above, the association may include some authentication or authorization between the primary device and the secondary device. For example, the association can be established when the primary device or secondary device receives a recognized code or password, when both devices provide the same password, when both devices provide the same authentication, or other such authentication. Still other implementations forward an identifier of the secondary device 124 to the primary device 122 so that the primary device can confirm the identity of the secondary device or request that the user confirm that the two devices are to be linked, and/or an identifier of the primary device 122 is forwarded to the secondary device 124 with a request that the user at the secondary device confirm that the two devices are to be linked.

The process continues to step 2126 to determine whether a broadcast or other communication is detected. Again, the communication can be over a direct connection 224 or over the virtual link 134. In some implementations, the communication may be relayed through an intermediate device. For example, an intermediate secondary device may establish a virtual connection 134 or direct connection 224 with the primary device while the intermediate secondary device does not have the capability to connect with the remote service or server 130. As such, the communication may be relayed from the intermediate secondary device allowing a destination secondary device to utilize the information, such as with a remote service or sever 130.

When a communication is not detected the process continues to step 2132. Alternatively, step 2130 is entered, when a communication is detected, to extract one or more pieces of information from the communication. In step 2132, it is determined whether a remote source, such as the server 130, database 140 or third party source, is to be accessed to acquire additional content, an application or other instructions. This determination can be based on user interaction (e.g., command to access a remote source) and/or the information extracted. For example, the information can include a command to initiation access to the remote source, it can include an identifier of a remote source (e.g., a uniform resource identifier (URI), uniform resource locator (URL), other such network address, network address designation, or other such source designation or combinations of designations), it can include an identifier of the content package or content within the content package being accessed by the primary device 122, it can include an identification of content to be acquired by the secondary device, it can identify an application to be activated by the secondary device 124 or a source where a desired application can be implemented and/or acquired, or it can include other such information or combinations of such information. As described above, in some implementations an application implemented at the secondary device 124 provides significant portions of the functionality to enhance the playback experience, which can allow the content package and primary device 122 to be relatively simple and generic with relatively little functionality to be implemented by the primary device 122. In those instances where a remote source 130 is not to be accessed the process advances to step 2136.

Alternatively, when a remote source is to be accessed the process continues to step 2134 to access the remote source. In step 2136 it is determined whether an application is to be activated. Again, this can be based on information provided from the remote source, instructions specified in the information supplied by the primary device 122 or the like. When an application is to be activated step 2140 is entered and the application is activated. In step 2142, it is determined whether content is to be played back locally at the secondary device 124. Step 2144 is entered when content is to be played back and playback of the content is initiated, which may include playing back the content is synchronization with the content package at the primary device 122, as described above. For example, the synchronization can include utilizing timecodes or other such information broadcasted from the primary device 122 that is used by the secondary to synchronize the playback of content at the secondary device.

In step 2146 it is determined whether a communication is to be forwarded to the primary device 122. Again the communication can include additional content, requested information, instructions, commands or other such communications.

When one or more communications are to be forwarded step 2150 is entered and the communication is transmitted with the appropriate information, instructions, content, commands and/or the like. In step 2152 it is determined whether the association between the secondary device 124 and the primary device 122 is terminated or is to be terminated. In those instances where the association is not terminated, the process 2120 returns to step 2126 to determine whether further communications are received. Alternatively, the process is terminated.

Again, by cooperating and/or linking two devices a first multimedia playback device, such as a HD-DVD player, that is not capable of implementing a firmware update on its own may utilize the secondary device 124 to obtain a firmware update. Similar functionality that is not provided through the primary device 122 can be utilized and capitalized upon through a secondary device 124 linked with the primary device.

Figure 22:
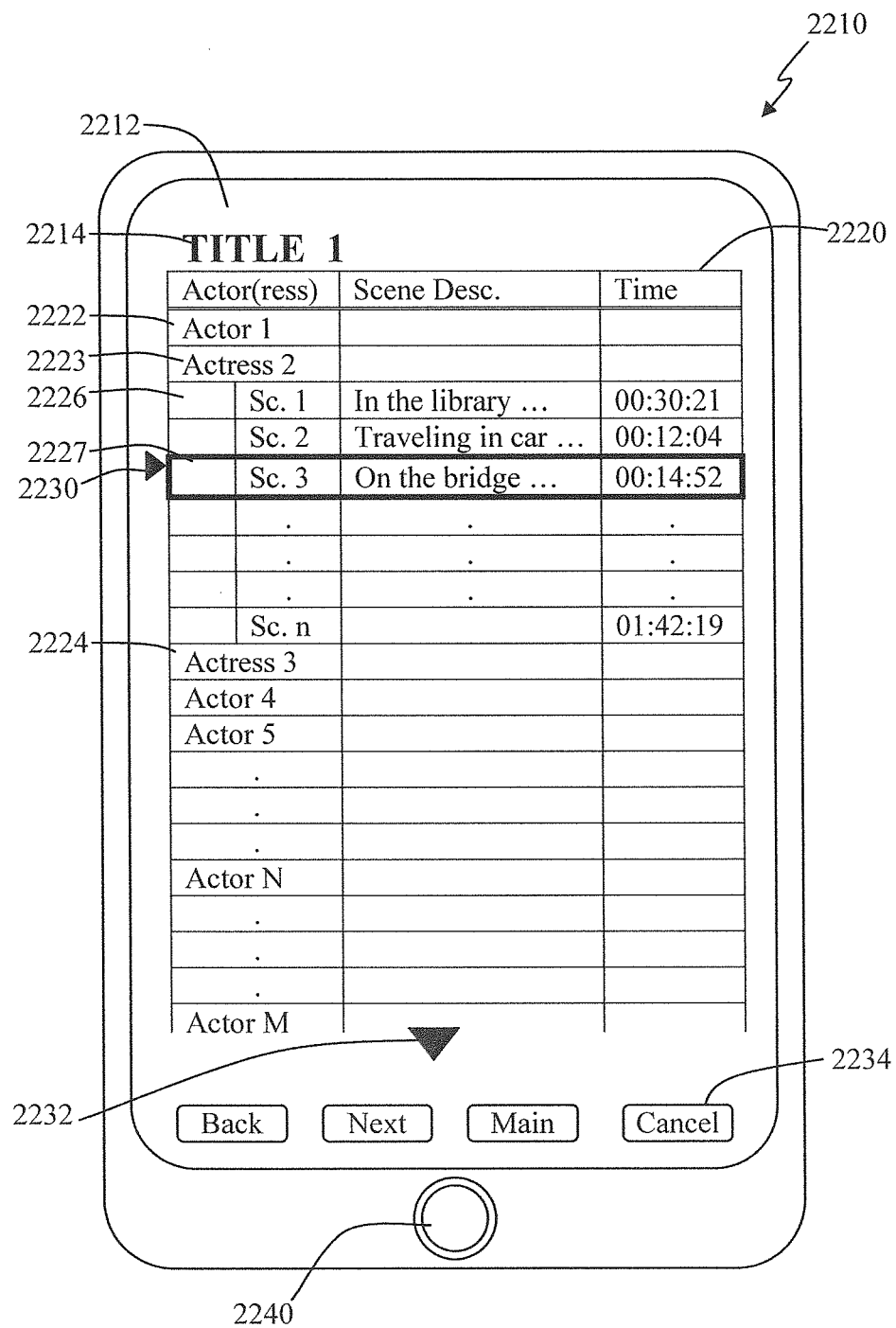
FIG. 22 depicts a simplified plane view of a secondary device, in accordance with some embodiments, displaying information and selectable features and/or options.

The present embodiments provide the ability to connect and cooperate, and in some instances synchronize, a secondary device (e.g., a personal computer, a mobile device, mobile phone) with a primary device (e.g., home entertainment system, TV, Blu-ray player, HD-DVD player or the like). This cooperation in part overcomes input limitations of many legacy primary devices (e.g., a traditional remote control), as well as interactive and/or display issues of a single display. Some embodiments further enable a user to use a secondary device 124 (such as a computer or mobile/handset device which is already designed for fast text entry) as an alternate method for text entry where, in some instances, the typed text can then immediately (or with minimal latency) appear on the primary device 122. Further, some embodiments enable a secondary device 124 to be used to remotely control and navigate the primary device 122 and/or content accessed or played back through the primary device (e.g., jump to specific scenes, set bookmarks, can receive navigation information from a friend, buddy list, etc.). Similarly, the secondary device 124 can display options to a user, such as listing a variety of content from the content package that can be played back or listing multiple scenes from a single content in the content package, and then allowing a user to select which is most interesting using the secondary device, where the secondary device may be more conducive to searching and/or browsing. For example, FIG. 22 depicts a simplified plane view of a secondary device 2210. In this example, the secondary device is a wireless phone that includes a display 2212, which may be a touch screen, and that displays information and in some embodiments selectable features and/or options. In this example, the secondary device 124 displays a title of a content 2214 and provides a table or listing 2220 identifying actors and actresses 2222-2224 within the titled content. A user can select a listed actor or actress to obtain a listing, for example, of the scenes 2226-2227 in which the actor or actress can be seen. Further, a user can select one of the scenes, for example scene 2227, and the secondary device 2210 can communicate that selection to the primary device 122 that in turn can initiate playback of the selected scene at the primary device. In some instances, an indicator 2230 can identify a selected entry, an indictor 2232 can identify that further entries can be viewed (e.g., by scrolling). Further, selectable options 2234 can be displayed allowing the user to navigate through information and options available through the secondary device. The secondary device 2210 may additionally or alternatively include one or more physical buttons and/or other controls 2240, as well as other features and/or functionalities, such as an audio output, audio input and other such features (not shown). It will be appreciated that the information displayed on the secondary device 124 in FIG. 22 is merely an example, and other information, graphics, content, multimedia content and the like can be displayed individually or in combination.

Selections by a user at the secondary device 124 can cause an action on the primary device 122. Additionally, some embodiments offer secondary or simultaneous experiences in concert with the content playing on the primary device 122. Still further, some embodiments enable different types of navigation or experiences on the primary device from a secondary device (e.g., not offered by a traditional remote control).

For example, a user input or interface to a primary device 122 (e.g., TV, set-top-box, or other consumer electronic device such as an HD-DVD or Blu-ray player) is a remote control with limited buttons. It can be very difficult to enter information (such as text) on such a primary device and/or implement some navigation through content. In some instances some primary devices 122 provide a "virtual keyboard" concept where an image of a keyboard is displays on the television screen, and then the user can use direction keys (up, down, left right) to select a letter and then click enter to select the letter. Entering text, such as email addresses, sentences or more, can be extremely tedious. Often this limited navigation via a remote control also restricts what is possible from a user (in entertainment) experience, as many more interactive or sophisticated experiences would benefit from navigation or controls that offer more than up, down, left right and then enter to select.

Some embodiment, however, enable users to employ a secondary device 124 (such as a PDA, computer or other mobile/handset device that is readily usable for text entry and/or already designed for fast text entry) as an alternate method for text entry.

As a user is accessing content (e.g., watching a movie) through a primary device 122 (e.g., a Blu-ray player) that is connected to a networked, the primary device can access a server 130 over the distributed network 132. The user accesses an associated account or profile with the primary device 122 via some form of identification of registration (e.g., using a user name and a password, token, pin or other relevant security). Therefore, when the primary device 122 is connected to the server 130 over the network 132, the server can properly identify the user interfacing with the primary device 122. Concurrently and/or while logged in through the primary device 122, the same user using a secondary device (e.g., laptop computer) can connect to the same server (e.g., this time using a web browser on the computer) to log directly into the same online account. Since the same account is used, the server 130 can automatically associate the primary device 122 and the secondary device 124 as the same user or consumer. Once the association has been defined, the online experience of the secondary device 124 (using, for example, a standard web browser) can be tailored based on the knowledge that the user is running the identified movie on the primary device 122. As such, the secondary device 124 can now be used, at least in some implementations, to enable text entry using, for example, a keyboard of the secondary device.

Further, the text typed by the user can then immediately (or with minimal latency) be displayed through the primary device 122. In some instances, each keystroke (or button push) of the keyboard (or other buttons) of the secondary device 124 could automatically be display through the primary device. In other instances, for example if latency is an issue, the user can type an entire word, phrase, sentence, or form, and then press <enter> such that the entered text is then communicated to the primary device such that the primary device displays the same information entered on the secondary device. Alternatively in some implementations, the text entered through the secondary device is not necessarily forwarded and/or displayed through the primary device. There may be situations that text entry on the secondary device is sufficient, and redisplaying the same information on the primary device may slow the process, and is often application dependent.

Examples where such text entry through a secondary device 124 may be advantageous can include, but is not limited to:

Entering registration and/or form information, where a user can enter text into a field using, for example, a computer keyboard, and when the user clicks tab or enter to go to a subsequent field, the entered data is forwarded to the primary device 122 to be display on the primary device (or automatically processed).

During an on-line chat session a keyboard of a secondary device 124 can be used for typing the chat text directed to another user, while movie content is displayed and watched by the user through the primary device 122, once a sentence or section of text is entered, clicking the enter key on the keyboard causes the text to be automatically delivered and displayed on the primary device 122 (in some instances, the full text of the chat can be displayed on the primary device 122, for example, where the primary device adjusts a size of the displayed content to simultaneously display the chat content). In another instance, the text is not displayed on the primary device 122, but instead is forwarded directly to another user. If this other user also has access to the same movie, the first user can now send information about the movie (because the secondary device 124 can know based on the established cooperation with the primary device 122 what is currently playing through the primary device) that is synchronized with the movie, or commands and/or navigation points associated with the movie (such as a link to a favorite scene).

Register and/or configure account and/or profile information (e.g., credit card number, e-commerce partners, friends list, etc.) using the secondary device 124, that can further be used in synchronizing with the primary device 122.

Some embodiments additionally or alternatively provide for navigation control on the primary device 122 through the secondary device 124. For example, the secondary device 124 can be used to remotely control and navigate the primary device 122 to implement a jump to specific scenes, set bookmarks, etc. Similarly, a secondary device 124 can receive navigation information from another, typically remote, user (e.g., friend, buddy list, etc.) and a selection of a desired or most interesting navigation can be implemented using the secondary device 124 (which may be more conducive to search, browsing), where the selection can be communicated to the primary device 122 causing an action to be implemented on the primary device. In part, this allows a third party user, not registered with the first user's account (while the third party user may or may not be registered with his/her own account), to provide control and/or commands that can be implemented by the primary media playback device 122 associated with the first user's account. In some instances, the third party user includes an identifier of the first user when forwarding communications and/or commands to the secondary device 124.

Further, a user can browse third party sources over the network 132 (e.g., browse YouTube) using the secondary device 124 as the secondary device may be more conducive and typically faster and intuitive in browsing the network than through the some primary devices 122 using a remote control. Once the user finds desired content a selection can be made using the secondary device 124, and the selected content is routed to the primary device 122 to be displayed and/or played back. The selection of content through the secondary device 124 to be played back on the primary device 122 can be extended to selecting streaming content (e.g., Netflix), including content that is purchased, such as pay-per-view content, downloaded content (e.g., Amazon Unbox) and other source of content. The user utilizes the secondary device 124 to browse potential content available over the network, and once selected the content is forwarded and played back through the primary device 122.

As described above, in some embodiments, the secondary device 124 can further be used to enable different types of navigation or control on the primary device 122 that may not be offered through the primary device 122 and/or by a traditional remote control. In some instances, a different type of user interface metaphor can be implemented on the secondary device 124, for example, when providing a poll, questionnaire, trivia game, user options or the like. Interaction by the user through the user interface then results in at least partially controlling the primary device 122. Further in the example of a poll or trivia game or other game, a right answer triggers a navigation change on the primary device 122. The navigation is a function of and controlled in accordance with the answer issued to questions.

FIG. 23 shows a simplified block diagram representation of an example navigation control on the secondary device 2210 that can cause actions at the primary device 2312. In this example, a model or image 2314a in a first orientation is initially depicted on the display 2212 of the secondary device 2210. The primary device 2312 similarly displays a corresponding model in the corresponding first orientation 2320. In response to a user interaction on the secondary device 2210, such as a user dragging a finger over the touch screen of the secondary device, the model is rotated and as shown FIG. 23 in a second orientation 2316. The primary device 2312 receives commands or instructions from the secondary device 2210 resulting from the user's rotation of the model, and the primary device implements the instructions to similarly rotate the model and display the model in the second orientation 2322. For example, the secondary device may be implementing an application that can spin, and in some instances may additionally provide for accelerate/decelerate and/or provide some inertia to the graphic. The application at the secondary device can then correlate the orientation, acceleration, deceleration, inertia or other parameter to a frame or plurality of frames that should be displayed by the primary device 122, for example, by converting angular velocity into distance and using the distance to identify one or more frame numbers that are to be displayed at the primary device. As such, a user can, in some embodiments, control a primary device 122 through the secondary device 124.

Further, the secondary device 124 can be used to offer secondary or simultaneous experiences in concert with the primary device 122, where alternative and/or supplemental content is accessed through and/or display on the secondary device 124. Based at least in part on the cooperation between the primary device 122 and the secondary device 124 the secondary device has knowledge of the content being played back through the primary device 122 (e.g., Blu-ray player). With this knowledge, the secondary device 124 can present a user with an experience that is relevant to and/or mimics the experience on the primary device 122. For example, when the primary device is a multimedia player, such as a Blu-ray player, the movie is played back on the primary device multimedia player (not the secondary device, e.g., computer). The movie and/or the menus and formatting of the content of the multimedia content (e.g., movie) may have a specific layout (e.g., look and feel). For example, if there is a chat capability, the chat window may display in the lower right hand corner of the movie screen. The experience at the secondary device 124 can correspond and/or mimic the layout of the primary device 122, by displaying a graphic representing or image of the movie (e.g., see FIGS. 7 and 8), and further providing a chat window, and in some instances displays the chat window in a same location on the display of the secondary device 124 as displayed on the primary device 122. A level of consistency can thus be established between the primary display experience and the secondary display experience, making the multi-device experience more consumer friendly and intuitive.

The example above provides a method for duplicating, mimicking or creating a consistency between the primary device interface and the secondary device interface. Other implementations and/or embodiments, however, utilize the secondary device 124 to display completely separate information from the content being display on the primary device 122. This separate information accessed through the secondary device, however, can be complementary, and synchronized with the content on the primary device. With knowledge of the content on the primary device 122, the secondary device 124 can be used, for example, exclusively for chatting without overlaying, interrupting or changing the display of the primary device 122. The secondary device 124 could also be used for functions such as bookmarking, viewing secondary data and/or supplemental content (e.g., metadata, ancillary graphics, behind the scenes, making of and other such data or content).

In some embodiments as described above, the primary device 122 forwards content, commands and/or trigger activations to the secondary device 124. Further, data or values entered or received into a set-top-box (representing a primary device 122 in this example) can be forwarded and used in a cooperated secondary device 124, such as a computer. For example, a set-top-box primary device and a computer secondary device can be cooperated through a user account 554. When a disc is inserted into a set-top-box (or broadcast content is received at the set-top-box), the set-top-box forwards authentication of that disc, BCA and the like to the server. Upon confirming that the set-top-box has a valid and authenticated content, the computer can be granted access to additional content based on the fact that the set-top-box has an authenticated disc and/or content to prove authenticity. The additional content to which the user is granted access through the computer can be substantially any relevant content, such as content regarding a promotional give away, a download of the movie that is available through the computer, or other such content based on the fact that the set-top-box has an authenticated disc (or content). In some instances, the secondary device (e.g., computer) would not have to be logged in to the user account at the same time the set-top-box is accessing the account and/or authenticating the disc or content. Instead, once the disc and/or content is authenticated a flag or other indicator can be added to the account 554 so that the secondary device can gain access to the additional content at a later time once the secondary device logs into the account. This scenario may be employed as a promotional feature to encourage consumers to purchase a disc or content, and as a bonus the consumer is provided additional content (e.g., a second movie or additional scenes, a director's cut version of a movie, or other such content).

In another example, a secondary device 124 is controlled through commands and/or trigger activations to activate a network browser 456 to access predefined sites or pages in response to content being displayed on a primary device 122. Additionally or alternatively, one or more keywords, terms or phrases can be forwarded from the primary device 122 to the secondary device 124 with instructions that the secondary device is to enter the keyword, term or phase into a search engine to search over the network 132 third party sources. Still other commands and/or instructions from the primary device 122 can active the secondary device 124 to initiate communications, such as transmitting an e-mail, instant message, text message or other messaging, in response to the commands and/or instructions from the primary device 122. Commands, key words, authentication information, a URL, and/or other such information can be pushed from the primary device 122 to the secondary device 124 in response, for example, to embedded information in content at the primary device (e.g., embedded in the multimedia content). The command, key word or other such data or information can be forwarded, for example, in response to content playback, menu selections made at the primary device 122 and/or other such events.

Again as described above, the communication between the primary device 122 and the secondary device 124 can be through a server 130 or through a direct link 224 (e.g., wire, RF, IR, Wi-Fi, Bluetooth, etc.), which may include direct communications such as cellular calls, instant messaging, text messaging and the like. Further, the secondary device 124 can be substantially any relevant device, such as a computer, wireless phone, a secondary set-top player (e.g., in a bedroom that is cooperated with a primary set-top player in a living room with a disc in it such that the secondary set top player is allowed access content based on something the set top player in the living room has done or content accessed), PDA, portable audio players, portable video players, a gaming console, a portable gaming device, a portable media player and other relevant devices.

Content provided to the secondary device 124 and/or content to which the secondary device is granted access can be substantially any relevant content, and in some instances can depend on the secondary device 124 and its functionalities. For example, a phone number can be forwarded to the secondary device 124 when the secondary device is a phone; a Vcard or other address information can be added to an address book when the secondary device is a computing device that maintains or accesses an address book; an appointment can be added to a calendar or a task added to a task list for secondary devices 124 that provide or have access to calendar and/or task lists.

Further, the initial information, commands, Internet site addresses and the like forwarded to the secondary device 124 can provide the secondary device with additional content. For example, upon receipt of a phone number at a phone secondary device the phone can activate a call to gain access to a special pre-recorded message, or interactive audio menu played. Still further, the secondary device 124, based on the additional content and/or input from a user based on the additional content, can forward back control signals to the primary device 122. Similarly, a web page accessed through the secondary device 124 that is loaded could have controls that trigger the secondary device to then send control signals to the primary device 122. For example, a secondary device 124 may provide a user with an opportunity to book a cruise, or make reservations for dinner after watching a movie based on a theme or company promotion (e.g., after watching a movie released by Disney Studios, the secondary device 124 may link the user based on a URL received from the primary device 122 playing back the movie to Disney site that shows a Disney cruise video or Disneyland/Disneyworld video; the secondary device 124 provides access, based on a URL received from a primary device 122 playing back a movie, to information about a sequel and may provide the user with an opportunity to buy theater movie tickets to the sequel after watching the movie; the secondary device 124 may provide the user with information about ordering another HD-DVD or Blu-ray movie based on other movies enjoyed by other viewers of a movie the user just finished viewing and/or a secondary device 124 can be forwarded instructions to establish and/or maintain a profile that can be develop over time that can be used in making recommendations to the user for other purchases; questions, a survey and/or a poll can be forwarded to the user through the secondary device 124 (e.g., "Did you like this film"); the secondary device 124 can be directed to a web site or information can be forwarded that invites the user to purchase a soundtrack or branded products, apparel or toys associated with content viewed through the primary device 122; a user may be provided with the opportunity to buy or download ring tones, MP3's, desktops, screen savers, etc.; and other such opportunities and/or access to information).

Furthermore as introduced above, the user experience associated with the access to content can be different when the primary device 122 is cooperated and/or linked with a secondary device 124, than when the primary device is not cooperated with a secondary device. For example, a survey could be varied based on knowledge or capability that a secondary device 124 is available such that in those instances where a secondary device is not available, the primary device 122 would display a simpler survey; whereas, in those instances when a secondary device 124 is detected and available, a more complex and/or comprehensive version of the survey is forward to the secondary device (e.g., now that a more sophisticated input mechanism offered by the secondary device 124 is available). In a more specific example, simple multiple choice options are provided to the user through the primary device 122 when a secondary device 124 is not cooperated, and text entry fields are provided to the secondary device 124 when the secondary device is available allowing the user to type in his/her answers.

In some embodiments, the content, data and/or information provided by the primary device 122 to the secondary device 124 is not utilized by the secondary device to gain access to other content, but instead is to be utilized by the user and/or the secondary device. For example, the secondary device supplemental content 640 can comprise scripts, software, upgrades, ring tones, video files (e.g., WMV files), electronic wallpaper, and/or other such content, information or data.

Again the additional content and/or supplemental content can be directed from the secondary device 124 to the primary device 122, and not just from the primary device to the secondary device. Some embodiments allow a user to create a user generated commentary through the secondary device 124 (e.g., a computer) based on content playing back through a primary device 122 (e.g., multimedia player). As a user is watching a movie on the primary device 122, the user can enter or create a new subtitle track, textual commentary of the movie, add or incorporate graphics, images or overlays, or other such entries. Because the user can employ the secondary device 124, the user can input this data instead of having to pause the movie and use an onscreen keyboard displayed through the primary device 122 every time the user wants to create an annotation, and because the secondary device 124 is cooperated with the primary device 122 the annotation can be displayed through the primary device while the movie is playing back in real time or with minimal delays. Further in some embodiments, the secondary device 124 (e.g., computer) can issue commands to the primary device 122, for example to pause the movie and then type in an annotation or subtitle that may be forwarded to the primary device to be displayed, and to issue a resume command to continue playback. The present embodiments, in part, take advantage of the features and functionality provided by secondary devices 124 that the primary device 122 does not have or that may be cumbersome to employ. As such, the use of the secondary device 124, such as a computer, can allow the user to utilize a keyboard of the computer, which is much easier and quicker than using an onscreen keyboard. Additionally, when the text is entered the current pause point can be retrieved (e.g., the secondary device 124 can issue a command to the primary device 122 to identify the pause point), and can be stored along with the entered text. It is noted, as described above, the movie does not have to be paused, but instead a user can type in the commentary through the secondary device as the movie continues to play back through the primary device, and instructions from the secondary device cause the primary device to capture time codes when text is entered, which can be saved with the text to be later played back.

Additionally, many of the examples described above relate to a secondary device 124 in association with a specific movie or piece of content in the primary device 122. These capabilities can also be extended and applied to devices that are not necessarily running entertainment content. For example, a secondary device 124 could be used for player-specific functionality such as setup, Internet protocol configuration, and the like.

Some embodiments as described above further provide the capability to allow more than one primary device 122 and more than one secondary device 124. Multiple devices provide added functionality and/or additional interaction with other users. For example, multiple secondary devices could be cooperated to enable applications such as interactive games with multiple participants.

Content, such as programming, code, executables and the like, defined within the content package, for example, recorded on an optical disc (e.g., Blu-ray disc) configures the primary device 122 to be cooperated with a secondary device 124 making the multi-device, multi-display experience possible. The cooperation provides the ability to extend and/or push the playback and/or user experience beyond a primary device 122 based on secondary device availability. The content package is authored with the capabilities or "smarts" to enable and/or trigger the cooperation functionality.

For example, the content package can trigger cooperation with social network applications on the secondary device (e.g., Facebook™, Myspace™). As a specific example according to some implementations, the content package, using a content package identifier (e.g., disc ID) in combination with a user's profile triggers a different experience on the social network (e.g., for chat, for personal expression, something that combines the experience with "my buddies" or other linked users).

Based on what happens on the social network (e.g., how many friends join, solving a game, etc.), the content package could then subsequently enhance or change the playback experience (e.g., movie experience) on the primary device 122 and/or supplemental content forwarded to the secondary device 124. As a further example, an online community attempting to solve a worldwide puzzle (e.g., advertising gimmick, requesting users to solve a puzzle, or trying a game recorded on a physical media with billboards and actual game elements that are placed around the world and actually require collaboration) can trigger alterations, variations and/or enhancements to the playback experience in response to a progress of the game (e.g., solving a portion or acquiring certain elements triggers the playback of enhanced content that could lead to yet addition portions in completing a game, reaching new levels of a game, providing additional functionality to a secondary device 124, or other such enhancements to the experience).

As described above, a communication connection and/or link is establishes between the primary device 122 and one or more secondary devices 124. An application implemented at the primary device 122, in some embodiments, may manage information and states relative to each of one or more secondary devices as part of establishing and maintaining a connection or communication link with one or more secondary devices. In these embodiments, when two or more secondary devices 124 are actively cooperated with a primary device 122, the application implemented at the primary device may manage information and states relative to each individual secondary device. This allows applications and/or services implemented through the primary device 122 to enhance the playback experience by, at least in part, providing appropriate information relative to individual secondary devices 124, such as feedback, status information, timing information, commands, and the like and take appropriate actions relative to individual secondary devices 124; as well as taking appropriate actions and forwarding relevant information that is relevant to two or more or all of the secondary devices. For example, some communications (e.g., broadcasts) from the primary device 122 may be limited to a single secondary device (e.g., a score during a game being played), while other communications may be directed to multiple secondary devices, while yet other communications may be directed to all the secondary devices that have established a connection. Further, the state information can be used to determine the type of information that can and/or cannot be forwarded, formatting information, capabilities of individual secondary devices and other such information. The state management can, in some embodiments, be implemented at least in part through one or more state management tables, listings, arrays or matrices that correlate relevant information with an identified user, session, and/or secondary device 124.

The state management allows the primary device 122 to collect, associate and track state information relevant to a users and/or secondary devices 124 and coordinate communications with the secondary devices based on this state information. Further, the state management enables multiple secondary devices 124 on a network to interact with the primary device 122 and portable storage medium 360, and may allow one or more secondary devices on the network to interact with one or more other secondary devices. By maintaining information about users, sessions and/or the secondary devices the state management allows greater and enhanced functionality between the secondary devices 124 and the primary device 122, including multiple secondary devices simultaneously interacting with the primary device and portable storage medium 360. The state management can organize the commands coming in to the primary device and identify them to quickly take action when action is needed or desired. Similarly, the action can be tailored to the user and/or secondary device, for example, based on user preferences, user restrictions and the like, as well as the type of device and/or the functionality of the secondary device.

In some instances, the state management provides mapping of established sockets (over which communications and/or commands are being received) to one or more addresses and identifying streams or sessions. Similarly, the management can provide a quick way to map a specific connection to a player created on the primary device. The management can provide organization based on users or network addresses and track information about the secondary devices corresponding to the users, established socket connection or addresses. Again, the management can further maintain additional information associated with that user such as secondary device type and/or capabilities, information regarding how to configure communications for that device and/or limit what is sent based on the authentication and/or capabilities of that device, and other such information. In some instances the management may maintain and/or access information (e.g., over the network 132) about prior interactions with the same user and/or secondary device (e.g., user profile; age appropriate information; user's prior scores; initiating playback of a game based on a prior place where the game was interrupted; and the like).

The applications on the portable storage medium 360 implemented through the primary device 122 can take advantage of the management information to tailor a playback experience for an identified user and/or secondary device. In some instances, the primary device in implementing applications can use a network address or session identification to identify a particular user and utilize knowledge of a platform of the secondary device the user is using so that the feature sets and/or capabilities of the secondary device can be taken advantage of and utilized (e.g., not sending content that the secondary device cannot display, and not requesting interaction using an input that the secondary device does not have).

Some embodiments can adapt interaction with one or more secondary devices based on capabilities of another secondary device 124. In some instances, it may be beneficial to limit secondary device capabilities and/or functions that can be use to a lowest common denominator. For example, in a gaming scenario with multiple secondary devices simultaneously interacting with the primary device 122 it may be beneficial to restrict more advances secondary devices from utilizing functionalities available on those more advances systems in attempts to provide a more level playing environment for users utilizing secondary devices with less functionality. As such, the functionality of all of the secondary devices simultaneously interacting can be limited to a lowest common dominator of the secondary device with the lowest functionality. For example, if a first secondary device interacting with the primary device only has arrow keys, while another secondary device interacting at the same time with the secondary device has an accelerometer, the primary device may restrict interaction to require every player to user arrow keys because the arrow keys are the least common denominator in terms of relevant inputs.

Further, by managing state information the primary device 122 can track and recognize interactions from specific secondary devices 124 when multiple secondary devices are interacting with the primary device. This can include tracking timing information regarding communications, commands and/or communications from or to the secondary devices, information and/or content being accessed at secondary devices, states of playback of content at secondary devices, commands applied to the secondary device, and other such information, as well as similar information at the primary device. Timing of responses on the network can become important, for example, with multi-user game capabilities. Therefore, the information and/or state management provides the primary device and/or applications implemented through the primary device to allow multiple secondary devices 124 to cooperate with the primary device while maintaining accurate control over the interactions with these secondary devices.

Some embodiment further provide a connection or link application that is implemented on the primary device 122 allowing connections with secondary devices to be maintained, for example, while a portable storage medium 360 is actively being utilized at a primary device. In some implementations, when an application on the portable storage medium 360 is implemented by the primary device 122 and that application provides a service over a network, the service registers its service over a local network or the distributed network 132 to allow one or more secondary devices 124 to cooperate with that service. In some instances, when there is a transition from one application on the portable storage medium 360 to a second application on the portable storage medium the first application shuts down its connection with the one or more secondary devices 124 and the second application similarly registers its service on the network and establishes a connection with the one or more secondary devices 124.

As introduced above, however, some embodiments provide a cross-title or multiple service registration application. This multiple service registration allows a secondary device 124 that has established a connection with the primary device 122 and/or portable storage medium 360 (through the primary device) to maintain that connection when there is a transition at the primary device from one content on the portable storage medium to another content on the portable storage medium. The multiple service registration can be implemented as a background application, applet, xlet or the like that operates while the primary device is accessing the portable storage medium 360 so there is no need to disconnect or lose connection between the primary device 122 and the secondary device 124 when changes of applications occur. As such, the multiple service registration application allows awareness across multiple applications available from a portable storage medium 360, and generally is not specific to a single application or a particular content on the portable storage medium and maintaining connections with the one or more secondary devices 124.

In some instances, a title-unbound application, such as a BD-J service application, is utilized to manage network connections to one or more secondary devices 124. These connections can persist across application changes (e.g., jumping from a menu to a game, jumping from a menu to audio/video content, or other such transitions from one content to another content where typically a different service is associated with each content) and do not force the secondary devices to reconnect to the player upon such a switch. For example, the service application can, in some embodiments, communicate with a current client application through an Inter-Xlet Communication. Communications between the primary device 122 and the secondary devices 124 can occur through this multiple service registration application (e.g., through Inter-Xlet communications) providing a single title-unbound application for the service, which is referenced by multiple service applications (e.g., Blu-ray Disc Java Objects (BDJO)) so that network connections can persist when jumping between different applications or content on the portable storage medium 360 (e.g., between different BD-J applications on a disc).

As introduced above, a connection library and/or plug-in library may also be provided or defined. Similarly, additional properties may be specified and/or provided in implementing a communication application (e.g., connectivity enable, title.stop providing a stop script as defined in an index table, and other properties). In some instances, the libraries and/or properties are incorporated directly on to the portable storage medium 360 and referenced by applications implementing communication connections (e.g., through pocket BLU). The title unbound application can work in cooperation with these libraries and communication applications.

As stated above, the functionality to at least initiate and/or establish the cooperation between the primary device 122 and one or more secondary devices 124 is defined within the content package. As such the content package is pre-authored to take advantage of a one or more secondary devices 124, or the content package is pre-authored to be updated over, for example, the Internet to take advantage of one or more secondary devices 124 to expand the experience associated with the content package beyond the primary device 122, and in some instances, beyond the user associated with or purchaser of the content package. The connectivity functionalities provided by the content package allows the content package to associate with a secondary device 124. This connectivity can be achieved over a network 132 (the Internet, a local area network, etc.) or a direct connection 224. The connectivity can be established through some password, a shared key, both cooperated devices accessing a single user account, a virtual connection when both devices are connected to a single service or server (e.g., through a user account or established authorization to cooperate the devices) or other such authentications. Further, the content package establish a direct connection 224 with a secondary device, without requiring a third party intermediary (e.g., a network server 130), through some shared password, device ID, key or the like to extend the content package experience beyond the primary device. For example, the content package can be authored to take advantage of BD Touch to allow a direct connection 224 between a primary device 122 and one or more secondary devices 124. Further, a primary device 122 may establish one or more direct connections 224 with one or more secondary devices 124 (e.g., using BD Touch), and simultaneously establish one or more virtual connections 134 with one or more other secondary devices 124.

The cooperation enabled by the content package allows the experience to be extended beyond the primary device 122. For example, through the connection (virtual or direct) established between the primary and secondary devices content, such as enhanced content, previews, portions of a movie or a movie, or a game, can be forwarded from the primary device 122 to the secondary device 124; forwarding identifiers of the content package and/or content within the content package to the secondary device 124 to be maintained in a listing or collection of users content; receiving at the primary device 122 from the secondary device 124 enhanced content, recommendations based on an identifier of a content package or content within the content package, enhanced content and other multimedia, data, etc.; forwarding to the secondary device 124 games from the content package and/or providing authorization for the secondary device to access games or content associated with the content package; and other such capabilities.

The content package is authored with the capabilities or "smarts" to enable and/or trigger the cooperation functionality. Again, the programming can be burned onto a distributable and/or portable storage medium or other digital recording medium, or streamed or otherwise delivered. For example, when the content package is accessed from a Blu-ray disc, the device cooperation functionality or "smarts" is stored in code, such as BD-Java code, on the disc that establishes communication with a secondary device 124 or with a server 130 to determine availability of secondary device, and then "controls" the experience on primary and secondary devices to extend the experience beyond the primary device. In some instances the content package controls the secondary device 124 by communicating with server to dictate secondary device experience. Similarly, BD-Java code, for example, can be downloaded from a server 130 that provides for the cooperation functionality. In some embodiments, a server 130 can dynamically generate the multi-device extended experience, whether the content package is accessed from disc and/or online, based on available criteria. In this scenario, the above described functionality or "smarts" is on the server, and either the primary device 122 or secondary device 124 can trigger changes in the experience (arbitrating between inputs).

While the invention herein disclosed has been described by means of specific embodiments and applications thereof, numerous modifications and variations could be made thereto by those skilled in the art without departing from the scope of the invention set forth in the claims.

What is claimed is:

1. A method of playing back multimedia content from a content package, the method comprising:
  accessing, locally at a primary device, a content package, where the content package comprises multimedia content and instructions to broadcast a first information relevant to the multimedia content;
  determining whether the content package instructs that the first information should be broadcasted;
  extracting, from the content package and in response to determining that the content package instructs that the first information should be broadcasted, the first information to be broadcasted;
  implementing the instructions from the content package to broadcast the first information;
  broadcasting, from the primary device in accordance with the instructions of the content package, the first information to a remote first secondary device;
  establishing a communication link with the first secondary device and a remote second secondary device where the second secondary device is different than the first secondary devices;
  maintaining distinct state information for at least each of the first secondary device and the second secondary device;
  identifying the first information to potentially be communicated by the primary device, where the first information is relevant to playback of the multimedia content;
  determining, in response to identifying the first information, a first current state of the first secondary device and a first current state of the second secondary device; and
  wherein the broadcasting the first information comprises broadcasting, in response to determining the first current state of the first secondary device, the first information to the first secondary device, and not broadcasting the first information to the second secondary device in response to determining the first current state of the second secondary device.

2. The method of claim 1, further comprising:
  identifying a second information to potentially be communicated, where the second information is relevant to the playback of the multimedia content;
  determining, in response to the identifying the second information, a second current state of the first secondary device and a second current state of the second secondary device; and
  broadcasting, in response to determining the second current state of the first secondary device and the second current state of the second secondary device, the second information to the first secondary device and the second secondary device.

3. The method of claim 2, further comprising:
  detecting a first trigger corresponding to the playback of the multimedia content;
  wherein the identifying the first information comprises identifying the first information in response to detecting the first trigger and where the first information is relevant to the first trigger.

4. The method of claim 1, further comprising:
  initiating a service from the content package on the primary device;
  announcing the service over a local network; and
  receiving, over the local network and in response to the announcement of the service, a reply from each of the first secondary device and the second remote secondary device;
  wherein the establishing the communication link comprises establishing, over the local network and in response to the reply to the announcement of the service, a direct communication link with each of at least the first secondary device and the second secondary device.

5. A method of playing back multimedia content from a content package, the method comprising:
  accessing, locally at a primary device, a content package, where the content package comprises multimedia content and instructions to broadcast a first information relevant to the multimedia content;
  determining whether the content package instructs that the first information should be broadcasted;
  extracting, from the content package and in response to determining that the content package instructs that the first information should be broadcasted, the first information to be broadcasted;
  implementing the instructions from the content package to broadcast the first information;
  broadcasting, from the primary device in accordance with the instructions of the content package, the first information to a remote first secondary device;
  implementing, locally at the primary device, a multiple service registration application from the content package;
  establishing, through the multiple service registration application, a communication link with the first secondary device;
  implementing, locally at the primary device, a first service application from the content package where the first service application provides a first service to the secondary device and comprises the instruction to broadcast the first information;
  terminating the first application while maintaining a connection with the first secondary device through the multiple service registration application; and
  implementing, locally at the primary device, a second service application from the content package that provides a second service to the secondary device; and
  broadcasting, through the connection maintained by the multiple service registration application and in response to an instruction in the second service application, a second information to the first secondary device.

6. A method for use in extending a playback experience of multimedia content, the method comprising:
  establishing, through a secondary device, a cooperation and connection with a remote primary device accessing a content package, wherein the content package comprises multimedia content, and wherein the connection provides a communication path between the secondary device and the primary device;
  receiving, at the secondary device, a broadcast broadcasted from the primary device;
  extracting, from the broadcast, an instruction to be implemented by the secondary device, where the instruction is defined in the content package, and where the instruction instructs the initiation of an application;

identifying the application instructed to be initiated;

activating, at the secondary device, the application where the application corresponds to the content package, and wherein the application corresponds to the multimedia content of the content package;

extracting, from the broadcast, an identification of the multimedia content;

accessing, over a distributed network, a first remote source;

communicating, over the distributed network, the identification of the multimedia content; and acquiring, from the remote source and over the distributed network, the application, in response to communicating the identification of the multimedia content.

7. The method of claim 6, wherein the activating the application comprises:

accessing, over the distributed network, a second remote source;

acquiring, from the second remote source and over the distributed network, additional content directly associated with the content package; and playing back, locally at the secondary device, the acquired additional content.

8. The method of claim 7, wherein the acquiring the additional content comprises communicating, over the distributed network and to the second remote source, the identification of the multimedia content.

9. The method of claim 6, wherein the content package comprises a non-transitory, tangible, portable, computer readable storage medium, wherein the content package instructs the broadcast from the primary device.

10. The method of claim 9, wherein the establishing the cooperation and the connection with the remote primary device comprises establishing the cooperation and the connection with the remote primary device in response to receiving the broadcast.

11. A method of expanding a playback experience beyond a primary device, the method comprising:

accessing locally at a primary device a content package comprising: multimedia content to be played back at the primary device, and a broadcast application;

determining whether a communication link is known to be established between the primary device and a remote secondary device;

playing back a first portion of the multimedia content in response to determining that the communication link is established;

implementing the broadcast application and broadcasting information to the secondary device, where the information is specific to the first portion of the multimedia content and directs the secondary device to provide access to a first additional content that is dependent upon the information;

preventing the broadcasting of the information to the secondary device in response to determining that the communication link is not established;

initiating playback of a second portion of the multimedia content that is different than the first portion of the multimedia content when the communication link is not established;

establishing, after the initiating playback of the second portion of the multimedia content, a communication link with the remote secondary device;

altering playback of the multimedia content as a result of the established communication link;

wherein the altering the playback of the multimedia content comprises initiating playback of a third portion of the multimedia content that is not available to be playback back without the communication link being established.

12. The method of claim 11, wherein the altering the playback of the multimedia content comprises providing additional functionality to the secondary device to control the playback of the multimedia content, where the additional functionality is not available directly through the primary device.

13. The method of claim 11, further comprising:

broadcasting further information specific to the playback of the first portion of the multimedia content to the secondary device, where the further information synchronizes playback of the first additional content at the secondary device with the playback of the first portion of the multimedia content.

14. The method of claim 13, further comprising:

receiving instructions from the secondary device; and altering playback of the first portion of the multimedia content in accordance with the instructions received from the secondary device.

15. The method of claim 11, further comprising:

implementing, locally on the primary device, an application from the media package;

issuing from the primary device an announcement over a network of a service provided by the application being implemented on the primary device;

receiving, over the network, a reply from the remote secondary device in response to the announcement;

establishing a communication link with the remote secondary device in response to the reply to the announcement; and altering playback of the multimedia content as a result of the established communication link.

* * * * *

UNITED STATES PATENT AND TRADEMARK OFFICE
CERTIFICATE OF CORRECTION

| | | |
|---|---|---|
| PATENT NO. | : 8,775,647 B2 | Page 1 of 1 |
| APPLICATION NO. | : 12/842001 | |
| DATED | : July 8, 2014 | |
| INVENTOR(S) | : Collart et al. | |

It is certified that error appears in the above-identified patent and that said Letters Patent is hereby corrected as shown below:

In the CLAIMS:
Claim 11, column 70, lines 17-18, delete "playback back" and insert --playback--.

Signed and Sealed this
Sixth Day of January, 2015

Michelle K. Lee
*Deputy Director of the United States Patent and Trademark Office*